United States Patent [19]

Plonczak

[11] Patent Number: 5,204,793
[45] Date of Patent: Apr. 20, 1993

[54] REMOVABLE CARTRIDGE DISK DRIVE WITH AN INTEGRAL HEAD LOADING RAMP, AIR FILTER AND REMOVABLE CARTRIDGE DOOR SAFETY STOP

[75] Inventor: Garold Plonczak, Livermore, Calif.

[73] Assignee: Syguest Technology, Fremont, Calif.

[21] Appl. No.: 724,388

[22] Filed: Jun. 28, 1991

[51] Int. Cl.⁵ .................. G11B 5/012; G11B 17/00; G11B 17/08; G11B 5/54
[52] U.S. Cl. .................... 360/97.01; 360/98.06; 360/99.06; 360/105; 360/133
[58] Field of Search ............. 360/97.01, 98.04–98.06, 360/105, 99.01–99.07, 137, 133

[56] References Cited

U.S. PATENT DOCUMENTS 4,965,685  10/1990  Thompson .................... 360/105

Primary Examiner—A. J. Heinz
Attorney, Agent, or Firm—Fliesler, Dubb, Meyer & Loverjoy

[57] ABSTRACT

A disk drive (50) having an integral apparatus (280) for ensuring that the door (68) of a removable cartridge (52) is properly opened, that the heads (286) of the disk drive (50) are properly unloaded onto the disk (256) in the cartridge (52) and that air filters (296) are appropriately positioned. The integral apparatus (280) includes an integral member (300) which provides a door safety stop (302) for ensuring that the door (68) of the cartridge (52) is properly opened should the door position reach a predefined threshold, and for preventing the further reception of the cartridge (52) into the disk drive (50) should the door position not reach the predefined threshold. The integral apparatus (280) further includes a ramp device (304) for receiving the actuator arm (282) onto which a head (286) is fixed and for unloading the head (286) onto the disk (256) and a base (294) for holding an air filter (296) relative to the door safety stop (302) and the ramp device (304) apparatus.

33 Claims, 32 Drawing Sheets

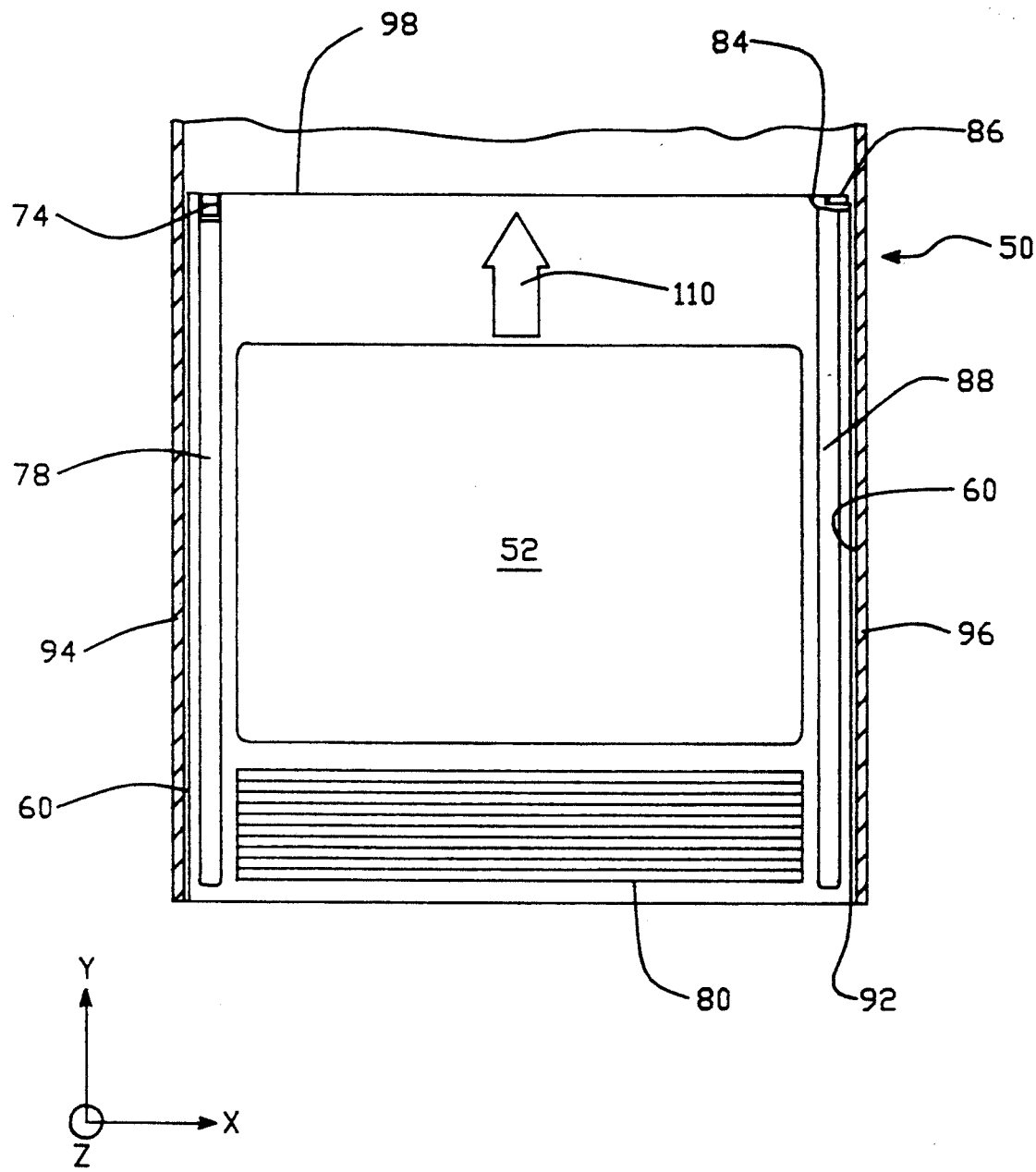
FIG.−5

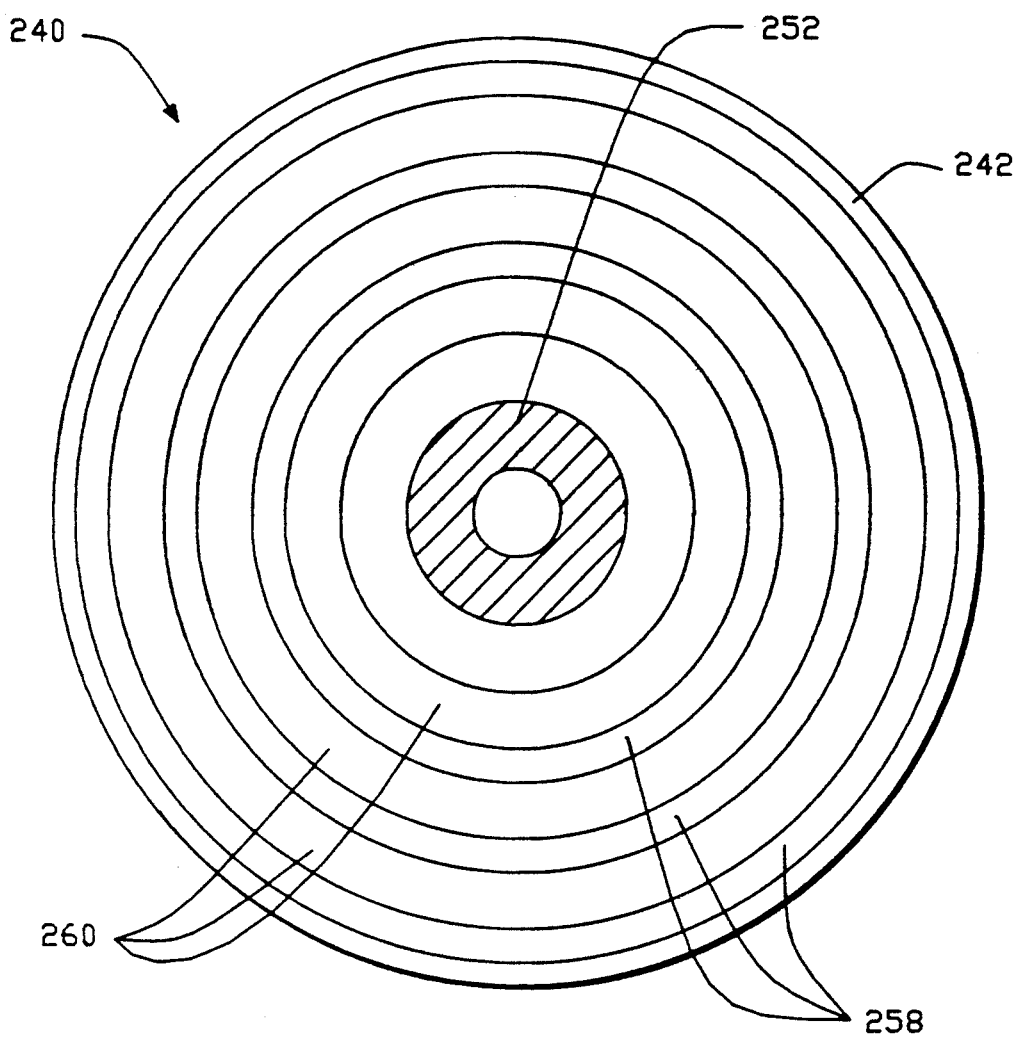
FIG.−13a
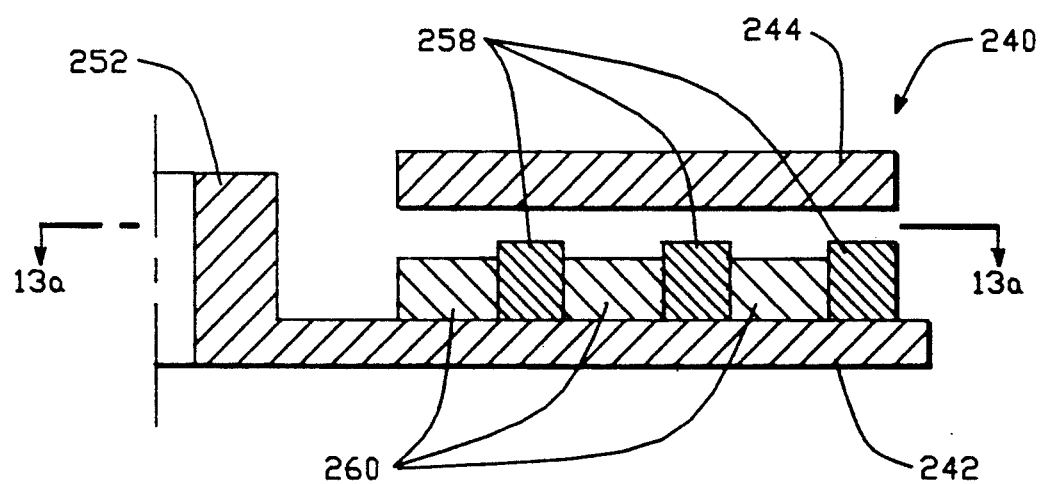
FIG.−13b

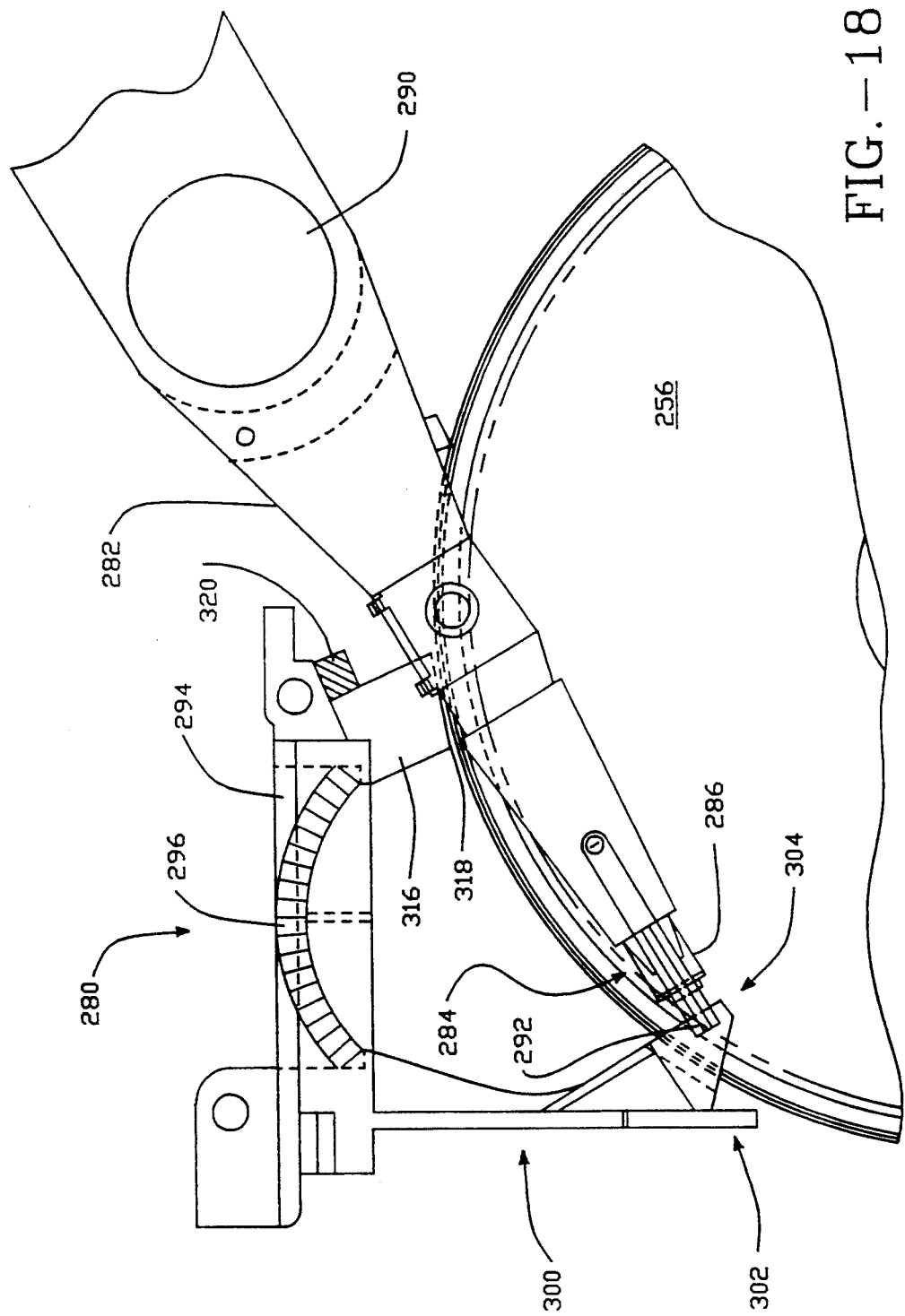

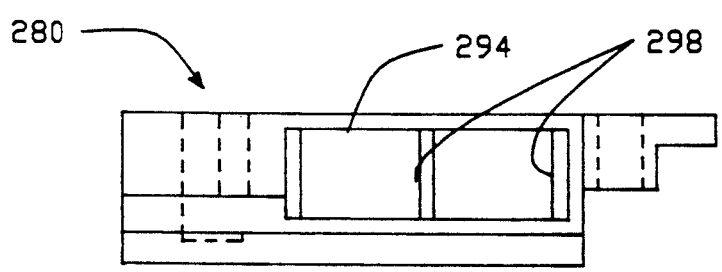
FIG.-19d
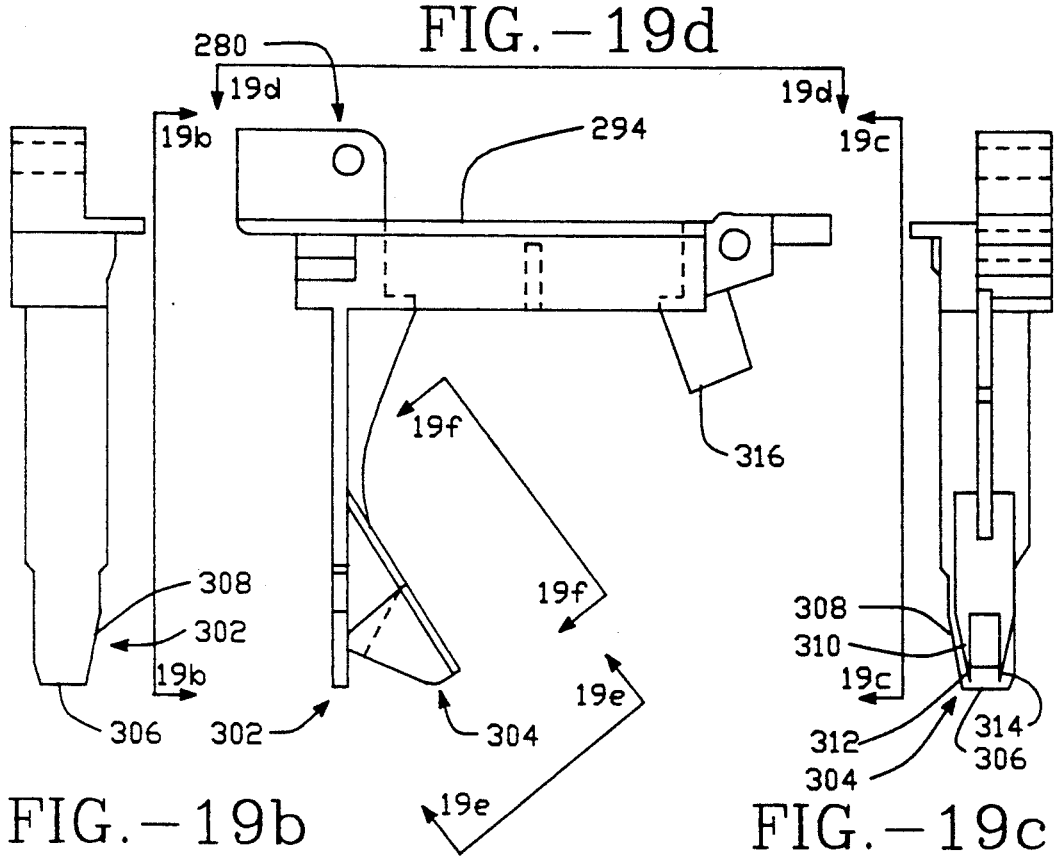
FIG.-19b
FIG.-19c
FIG.-19a
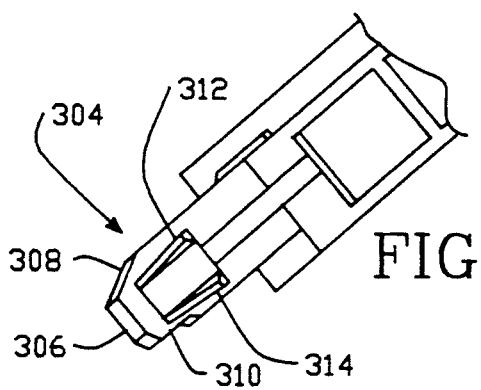
FIG.-19e
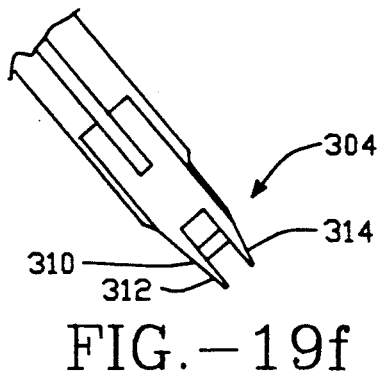
FIG.-19f

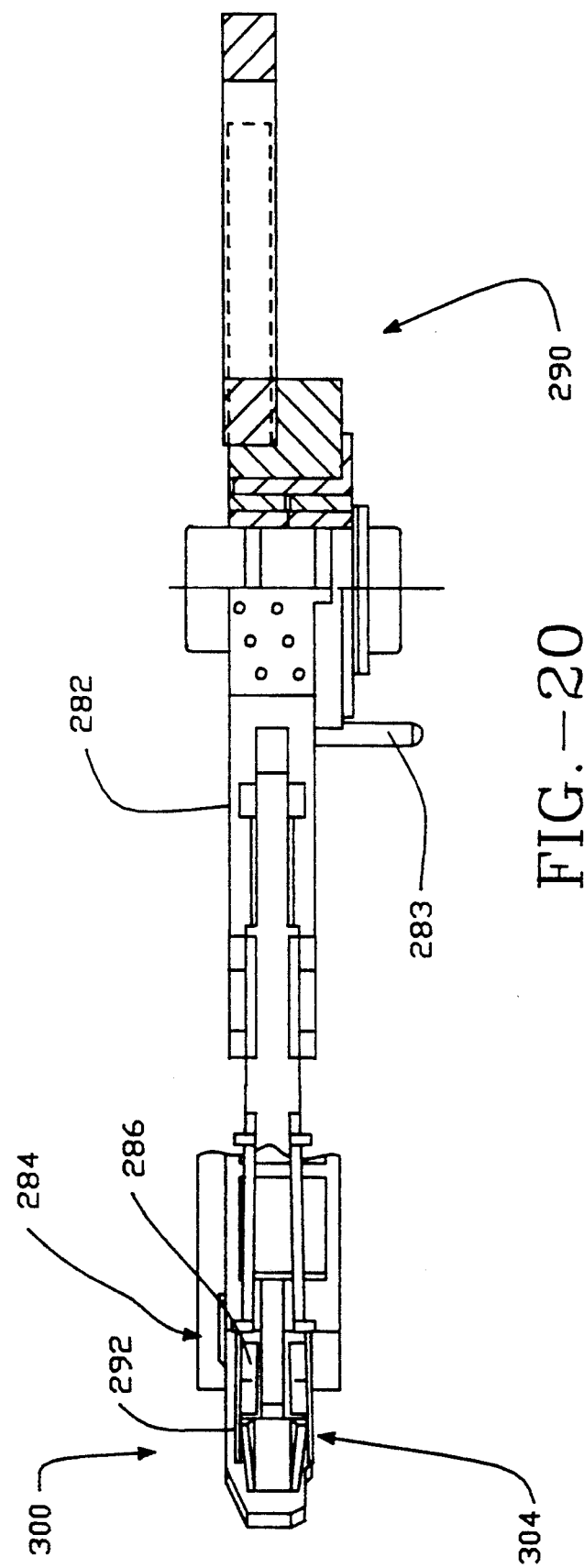
FIG.—20

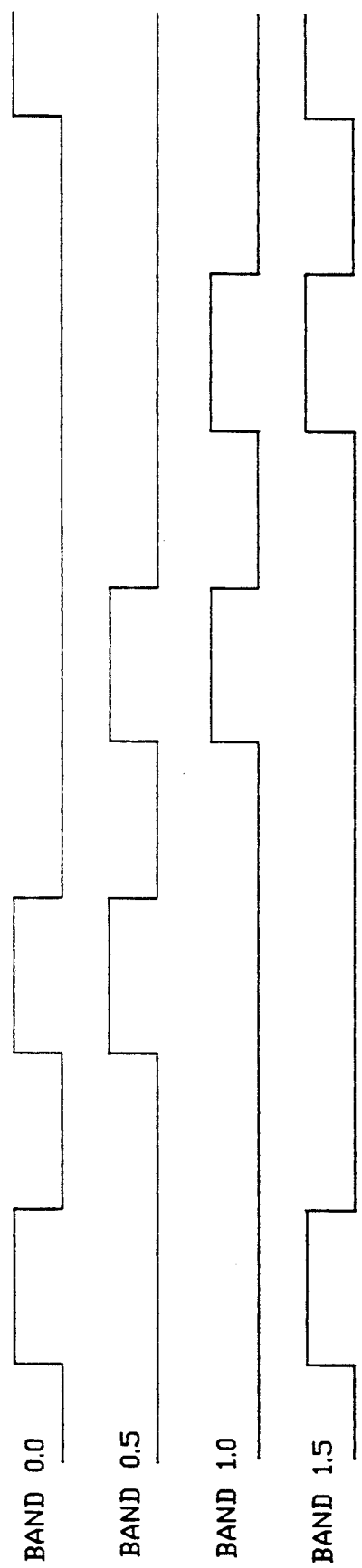
FIG.-32 WRITE CURRENT
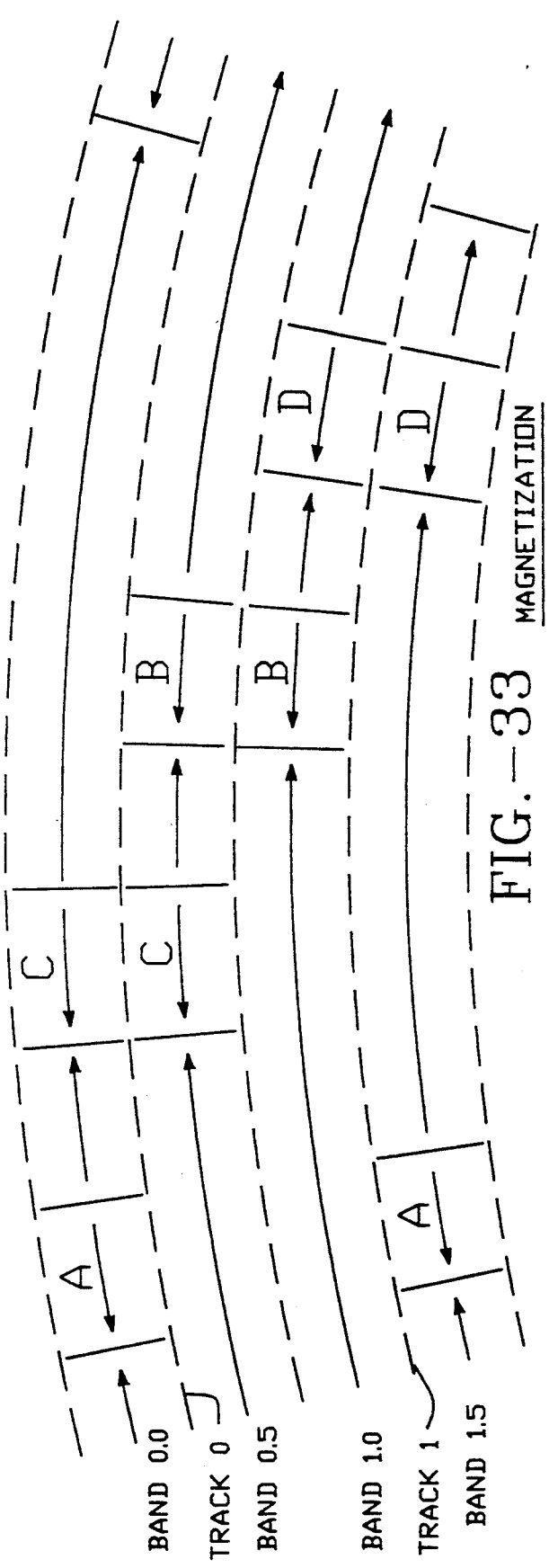
FIG.-33 MAGNETIZATION

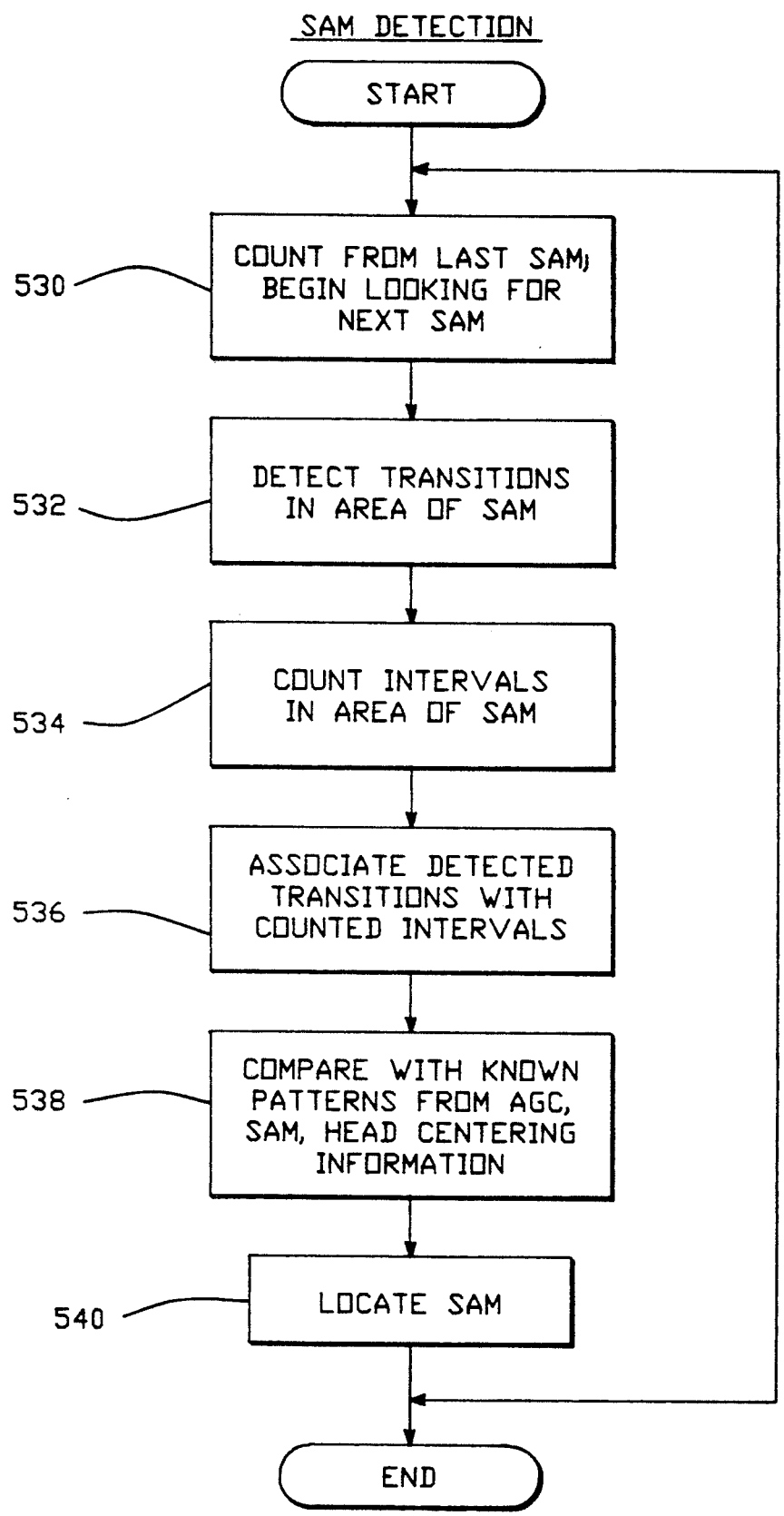
FIG.—35b

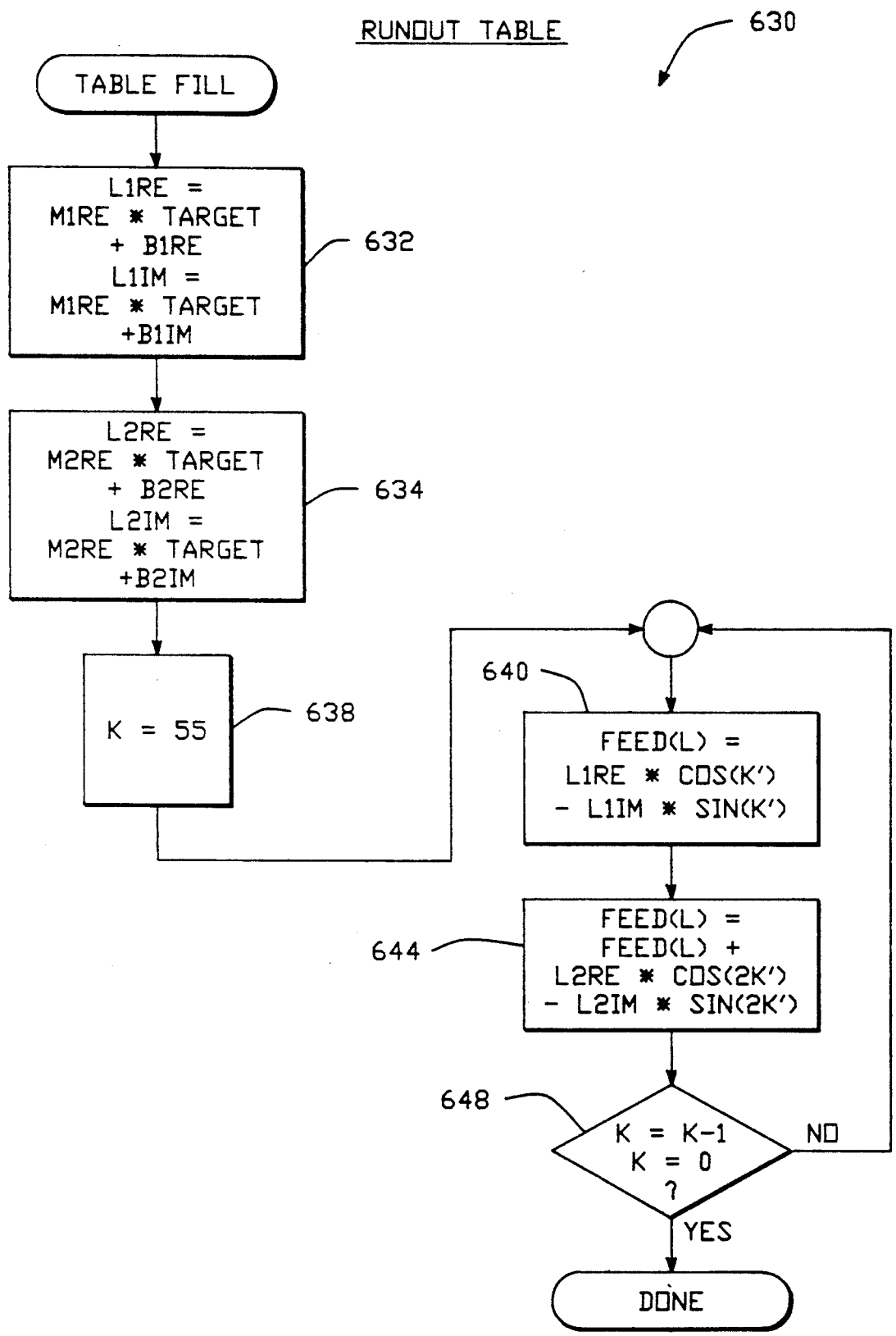
FIG.—37d

REMOVABLE CARTRIDGE DISK DRIVE WITH AN INTEGRAL HEAD LOADING RAMP, AIR FILTER AND REMOVABLE CARTRIDGE DOOR SAFETY STOP

FIELD OF THE INVENTION

The present invention is directed to a disk drive and in particular a disk drive which will accept a removable cartridge which houses memory media for communication with the disk drive.

BACKGROUND OF THE INVENTION

At present the industry trend is to provide for greater memory capacity in a reduced form factor at a lower cost with a lower energy consumption. This trend is driven by the increased demand for portable, lap top, notebook and palm top computer configurations which can be easily transported to a desired work site. The desired memory configuration would include, for example, a magnetic or optical hard disk drive as such drives store a considerably higher amount of data than a floppy disk drive and can access that data at a rate substantially in excess of that of a floppy disk drive.

With respect to hard disk drives, there are two major types. The first is a hard disk drive with the memory media or magnetic disk permanently fixed therein. The second is a hard disk drive which can accept interchangeable and removable cartridges containing the memory media.

The removable cartridge hard disk drives have several significant advantages over the fixed disk hard disk drives. These include the ability to interchange the number of cartridges and thus provide the disk drive with an infinitely large memory capacity. A second advantage is that any information stored on the disk or the memory media in the cartridge can, along with the cartridge, be removed and placed in a secure location should the information be of a confidential or secret nature. This can be accomplished without having to store the computer or the disk drive itself. Additionally, large amounts of data can be transferred between computers and locations by removing the cartridge from one computer and transporting it to a second computer at a different location. Such portability of large amounts of information stored on cartridges has become more necessary, for example, due to the data requirement for graphic presentations.

SUMMARY OF THE INVENTION

Accordingly, the present invention is directed to providing a removable cartridge disk drive which meets and significantly exceeds the industry trend. The disk drive and removable cartridge of the present invention provides for a disk drive which is configured into a form factor having about a 2.5 inch disk or smaller and having a total disk drive height of about 0.75 inches (19 millimeters) or less. In this form factor, a removable cartridge can be inserted, which removable cartridge has a memory capacity of 40 megabytes or larger. The configuration further affords a reduced power consumption due to among other things, the design of the cartridge receiver mechanism which does not require electrical power for its operation. Accordingly, the present invention provides for the desired form factor for the newest generation of portable, lap top, notebook, and palm top computers while affording infinite memory capacity. Further the removable cartridge disk drive has the advantage that the cartridge can be removed and locked in a secured facility in order to protect confidential and secret information contained on the hard disk. Additionally, large amounts of data can be transferred from location to location as required, for example, for graphic applications by transporting the cartridge to the desired location.

It is also to be understood that while the present invention is highly advantageous for the above form factor, that the present invention can be incorporated into disk drives having a disk larger than about 2.5 inches and a height larger than about 0.75 inches.

It is also to be understood this the present design configuration with the cartridge being removable provides for much higher shock immunity at a lower cost compared to systems where the entire disk drive must be removed and stored in order to secure the data contained on the disk. In addition, the present invention provides for the ability to create a backup of information for each cartridge by merely copying the information to another cartridge.

Accordingly, the present invention provides for a disk drive which can accept cartridges containing a disk having a diameter of greater than and less than about 2.5 inches and preferably having a diameter of about 2.5 inches to about 1.8 inches. The cartridges of the disk drive contain a disk which in conjunction with the disk drive can store 40 megabytes and greater amounts of data. The disk drive includes a spindle motor for engaging and causing the disk in the cartridge to spin at the appropriate speed. Further, a mechanism is provided for movably mounting the spindle motor to the drive housing so that the spindle motor is telescopable movable from a first position out of engagement with the disk to a second position operably engaged with the disk. This mechanism allows the cartridge to be inserted into the drive, without the disk drive having to physically reposition the cartridge onto a spindle motor. Thus, without the need of a cartridge receiver mechanism for repositioning the cartridge onto a spindle motor, the configuration of the present invention can be more compact, and fit within the desired form factor which includes the drive height of about 17.5 millimeters and less.

In the present inventive configuration, the cartridge remains on the same plane on which it is inserted into the drive. This allows the cartridge to be received in and more tightly conformed to the dimensions of the disk drive cartridge receiver and thus affords a more accurate positioning of the cartridge in the cartridge receiver of the disk drive. Further, due to the fact that there is a tight fit between the cartridge and the cartridge receiver of the disk drive and due to the fact that there is a long distance between the door of the disk drive and the door of the cartridge as inserted into the disk drive, environmental contamination of the disk inside of the cartridge is greatly diminished due to the long distance which the contamination must travel in order to reach the disk.

Further, due to an inventive interlocking mechanism, if a cartridge is not properly seated within the disk drive, the actuation mechanism which positions the heads will not be unlatched and enabled, the heads will be not be unloaded, and the spindle motor will not be enabled. The above interlocking mechanism of the drive also ensures that the cartridge cannot be removed from the cartridge receiver while the spindle motor is engaging the disk, while the head is unloaded onto the disk, or while the head actuator mechanism and spindle motor are enabled.

The disk drive of the invention includes an ejecting mechanism, which is part of the above interlocking mechanism, for engaging and lockingly holding the cartridge in place in the cartridge receiver of the disk drive and for ejecting the cartridge from the cartridge receiver. The ejecting mechanism engages another proprietary interlocking mechanism or recess in the cartridge which is directed essentially across the direction of insertion of the cartridge into the drive. These interlocking mechanisms ensure that the cartridge is held in the drive and prevented from being withdrawn.

The drive further includes a guide rail which extends into the cartridge receiver and mates with a guide groove in the cartridge, both of which are disposed along the direction of insertion of the cartridge into the drive. The tolerances of the guide rail and guide groove are tight in order to accurately position the cartridge across the direction of insertion of the cartridge into the disk drive.

The cartridge receiver of the disk drive provides for guide strips for accurately positioning the cartridge along a direction which is substantially aligned with the height of the cartridge.

In another aspect of the invention, the disk drive includes an integral apparatus which provides for a mechanism for ensuring that the door of the cartridge is appropriately opened and able to accept the head actuator arm and heads. If the door is not appropriately opened, the mechanism halts further introduction of the cartridge into the drive. This integral apparatus further includes a ramp mechanism upon which the actuator arm and heads can be loaded and therefrom unloaded onto the disk. Additionally, this integral apparatus includes a mounting mechanism for mounting air filters for the disk drive.

In another aspect of the invention, the spindle motor has an inventive magnetic clamp for seating of an armature plate of the hub of the cartridge onto the spindle motor. This magnetic clamp includes in one preferred embodiment, a single uniform pole magnet with a single flux path ring. With this configuration, it is advantageous for the cartridge armature plate to be premagnetized or otherwise acquire a magnetic pole which is attracted by the polarity of the magnetic clamp. This magnetic clamp includes, in another of the preferred embodiments, a plurality of magnetic rings spaced by a plurality of magnetic flux transmitting rings. Such a configuration ensures that there is an adequate magnetic field for properly seating the hub and the armature of the cartridge onto the spindle motor while ensuring that the field is sufficiently weak so that it will not damage any data stored on the magnetic disk of the cartridge.

In another aspect of the invention, a proprietary hub chuck is provided for ensuring accurate positioning of the cartridge hub and chuck relative to the spindle motor. The chuck includes a one piece, integral apparatus which includes datum and a spring mechanism for accurately positioning the chuck onto the shaft of the spindle motor. Further, there is provided an appropriate configuration on the internal surface of the housing of the cartridge which insures that during the process of mating the hub and chuck to the spindle motor, that the disk does not become cooked in the cartridge. In a preferred embodiment, this includes a raised ring which projects on the inside of the housing towards the hub.

In further aspect of the invention, the cartridge door is removable from a closed position to an open position as a member of drive engages a cam fixed to the door and urges the cam and the door to the open position. The cartridge door is configured with a spring which is imbedded into the door in order to maximize clearance with the door open to ensure that the actuator arms and heads can be positioned through the door opening and unloaded onto the disk without interference between the actuator arms and heads, and the cartridge or door. The door further includes a stiffener for preventing the door from bowing and for also retaining the spring embedded in the door, thus also ensuring that there is appropriate clearance so that there is no interference between the actuator arms and head, and the cartridge and door as the heads are unloaded onto the disk.

In another aspect of the invention, a servo pattern embedded in the servo sector of the disk includes a servo address mark (SAM) that is distinguishable and detectable in the presence of media defects.

A further aspect of the invention includes improved repetitive runout correction for the disk drive with a removable cartridge having an imbedded servo sector.

Other inventive aspects of the disk drive and removable cartridge of the invention can be obtained from a review of the specification, claims and the appended figures.

BRIEF DESCRIPTION OF THE FIGURES

FIG. 5 depicts a cutaway and sectioned view of an embodiment of the removable cartridge of the invention inserted into an embodiment of the disk drive of the invention.

FIG. 13a depicts a plan view of an alternative magnetic clamp for the spindle motor of FIGS. 10 and 13b depicts a cross-sectioned view of FIG. 13a at line 13b—13b.

FIG. 18 depicts a view similar to FIG. 17 but with the heads moved toward the disk of the cartridge preparatory to the heads being unloaded onto the disk.

FIGS. 19a through 19e depict the indicated views of an integral apparatus for ensuring that the cartridge door is fully opened, for loading the heads onto the disk, and for mounting an air filter.

FIG. 20 depicts a side view along lines 20—20 of FIG. 17.

FIG. 32 depicts a current wave form used to encode some of the servo information onto a servo sector on the disk of the cartridge of the invention.

FIG. 33 depicts magnetized transitions on the servo section on selected tracks of a disk of the cartridge of the invention formed by the current wave form of FIG. 32.

FIG. 35b is a block diagram showing the method of detecting the SAM of FIG. 35a.

FIGS. 37a-37d are block diagrams for the repetitive runout correction of the invention.

DETAILED DESCRIPTION OF THE PREFERRED EMBODIMENT

With reference to the figures and in particular FIGS. 1 through 4, the disk drive 50 and the removable cartridge 52 of the invention are depicted. In a preferred embodiment, the housing of the disk drive 50 can have a height of about 0.748 inches or 19 mm, a width across the front of 2.76 inches and a length of about 4.0 inches. In an alternative embodiment, the height can be 17.5 mm. The cartridge 52, in a preferred embodiment, can have a height of about 0.263 inches, a width across the front of the cartridge of about 2.66 inches and a length of about 2.70 inches. The disk contained in the cartridge is about 2.55 inches or 65 m in diameter. As noted herein, other embodiments of the invention can have other dimensions and come within the spirit and scope of the invention.

Figure 2:
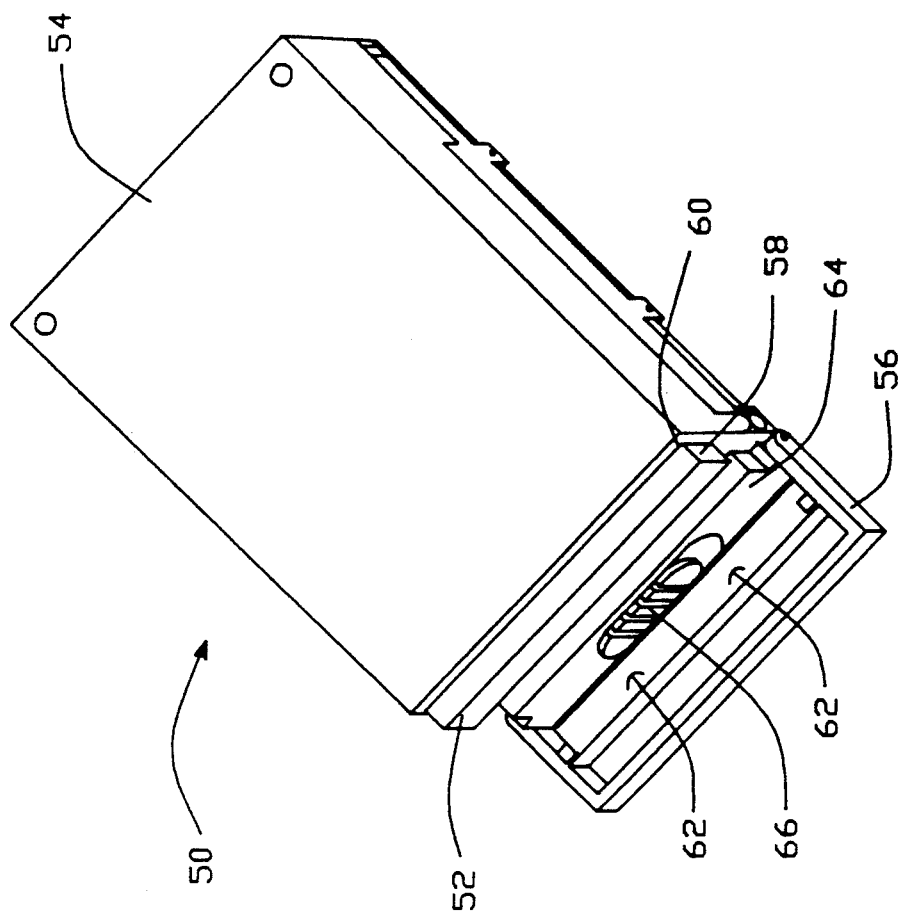
FIG. 2 depicts a perspective view similar to FIG. 1 with the door of the disk drive moved to the open position.
Figure 1:
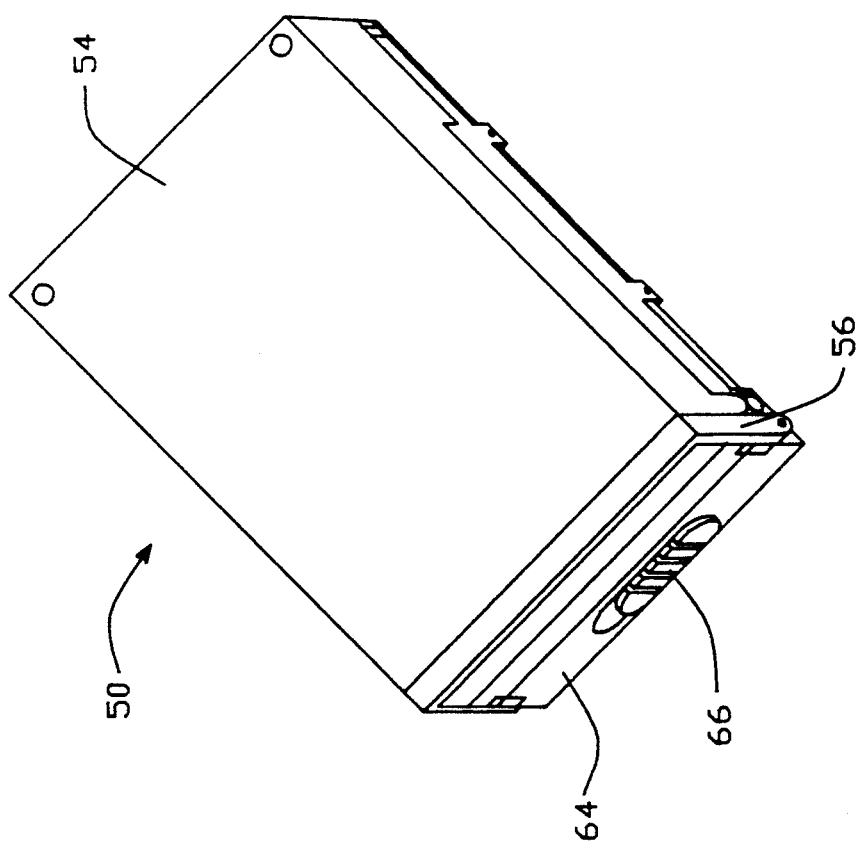
FIG. 1 depicts a perspective view of an embodiment of the removable cartridge disk drive of the invention.

As can be seen in FIGS. 1 and 2, the disk drive 50 includes an outer housing 54 and a door 56 which is movable between a closed position as shown FIG. 1 and an open position as shown in FIG. 2. In the open position, the removable cartridge 52 can be inserted through a port 58 into the cartridge receiver 60. The door 56 includes a spring 62 which, in a preferred embodiment, can be comprised of an elastic form material or other resilient material or a variety of mechanical spring mechanisms, such as for example a leaf spring or a bowed spring retained in a recess of the drive door 56, to ensure that the closing of the door 56 further urges the cartridge 52 into the drive 50 in order to lockingly position the cartridge 52 as will be more fully explained hereinbelow.

Extending from the front panel 64 of the disk drive 50 is a slide 66 which is movable from the first position shown in FIG. 1 to a second position shown in FIG. 2. This slide 66 operates in conjunction with the interlocking mechanisms, which will be described hereinbelow, that ensures, among other things, that unless the cartridge is properly locked in the drive, that the spindle motor and the motor which positions the head relative to the disk and cartridge will not be enabled. Slide 66 also ensures, among other things, that before a cartridge can be removed from the drive that the heads are removed from the disk and that the motors are disabled.

Figure 4:
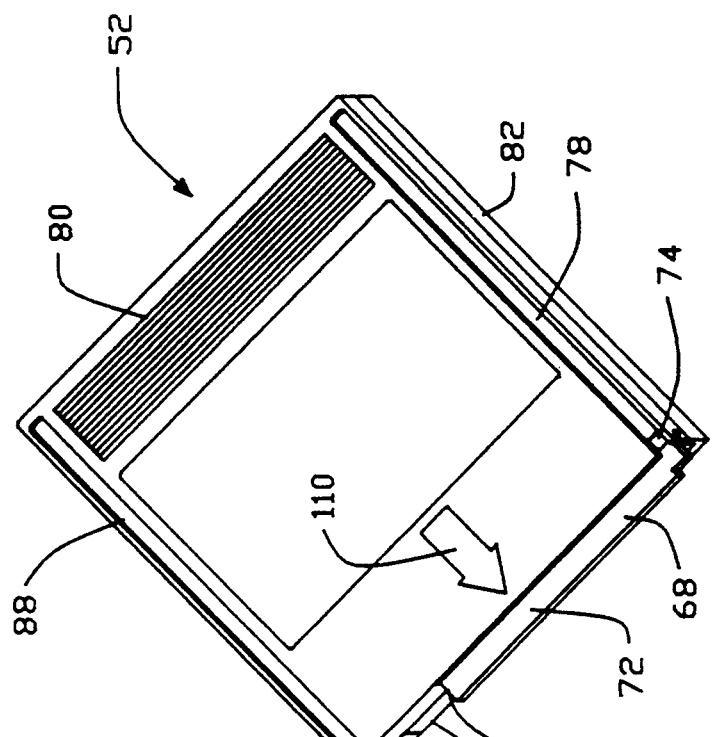
FIG. 4 depicts a perspective view similar to FIG. 3 with the door of the cartridge moved to an open position.
Figure 3:
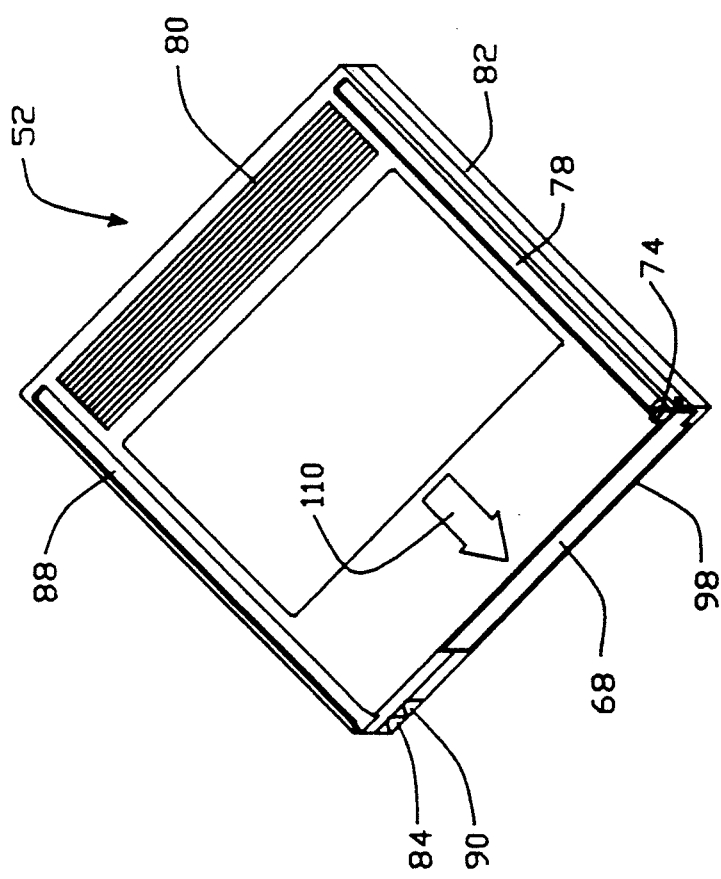
FIG. 3 depicts a perspective view of an embodiment of the removable cartridge of the invention.

As can be seen in FIGS. 3 and 4, the cartridge 52 includes a cartridge door 68 which is movable from a closed position, shown in FIG. 3, to an open position shown in FIG. 4. The cartridge door 68 is pivotedly mounted to the housing 70 of the removable cartridge 52 and includes a main door portion 72 and a cam or tab 74. The main door portion 72 provides a closure for the port or opening 76 in the housing 70 of the removable cartridge 52 through which the heads and actuator arm (described below) are provided in order to load the heads onto the disk contained in the cartridge. The cam 74 extends in a direction opposite to the main portion of the door 72 and is disposed at the beginning of a door opening groove 78 provided in the housing 70. In a preferred embodiment, the housing 70 includes an upper half 80 and a lower half 82. The door opening groove 78 is located in the upper half 80 of the cartridge housing 70.

As will be described more fully hereinbelow, the disk drive includes a door opening projection or rail (354 in FIG. 28) which upon insertion of the cartridge 52 into the drive 50 comes into contact with the cam 74 of the door 68 causing the cam 74 to rotate from approximately zero degrees to approximately 90 degrees with the door 68 rotating from approximately 180 degrees to approximately 270 degrees, both in a clockwise manner. The door opening rail then proceeds to travel along the door opening groove 7B as the cartridge 52 becomes fully seated in the disk drive 50.

FIG. 5 depicts a cutaway view of the disk drive 50 with the top of the housing 54 removed in order to reveal the cartridge 52 in a fully seated positioned. In this view, it can be seen that a recess 84 defined by the lower half 82 of the housing 54 of the cartridge 52 is received against a stop 86 defined by the cartridge receiver 60 of the disk drive. The stop 86 is upstanding from the base plate 92 of the cartridge receiver 60. When the door 56 of the disk drive 50 is closed, the spring 62 mounted on the door 56 of the disk drive 50 urges the cartridge 52 against the stop 86 in order to lockingly position the cartridge 52 in the disk drive receiver 60 in a "Y" direction or the direction of insertion of a cartridge into a disk drive.

As can be seen in these figures, the cartridge 52 further includes a guide groove 88 (FIG. 5) and an interlocking recess 90 (FIG. 22) which as will be described hereinbelow, are used to accurately position and hold the cartridge in the disk drive. In a preferred embodiment, the cartridge housing and door are molded from one of the high impact and durable plastics which are well known in the industry such as by way of example only, a polycarbonate plastic. The disk drive housing 54 in a preferred embodiment is comprised of a one of a number of metals (such as aluminum) or plastics (such as polycarbonate plastic) which are known in the industry suitable for such housings.

As can be seen in FIG. 5, the cartridge 52 is received on a base plate 92 which is the floor of the cartridge receiver 60 and separates the cartridge from the various linkage mechanisms and the spindle motor (described hereinbelow). Also it is noted that the cartridge 52 is tightly received within the cartridge receiver 60. It is evident from FIG. 5 that the spaces between the sides 94, 96 of the drive housing 54 and the cartridge are quite small. This being the case, and given the length of the cartridge and the fact that the cartridge door 56 is located, when inserted in the drive, distally from the drive door ensures that there is a substantially long, narrow path which environmental contamination must follow in order to go through the door 56 of the disk drive 50 and arrive at the cartridge door 68 before potentially contaminating the disk therein. That being the case, the present embodiment provides for a design with a greatly enhanced environmental contamination prevention scheme.

Cartridge Interlocking and Spindle Motor Telescoping Mechanisms

Figure 6:
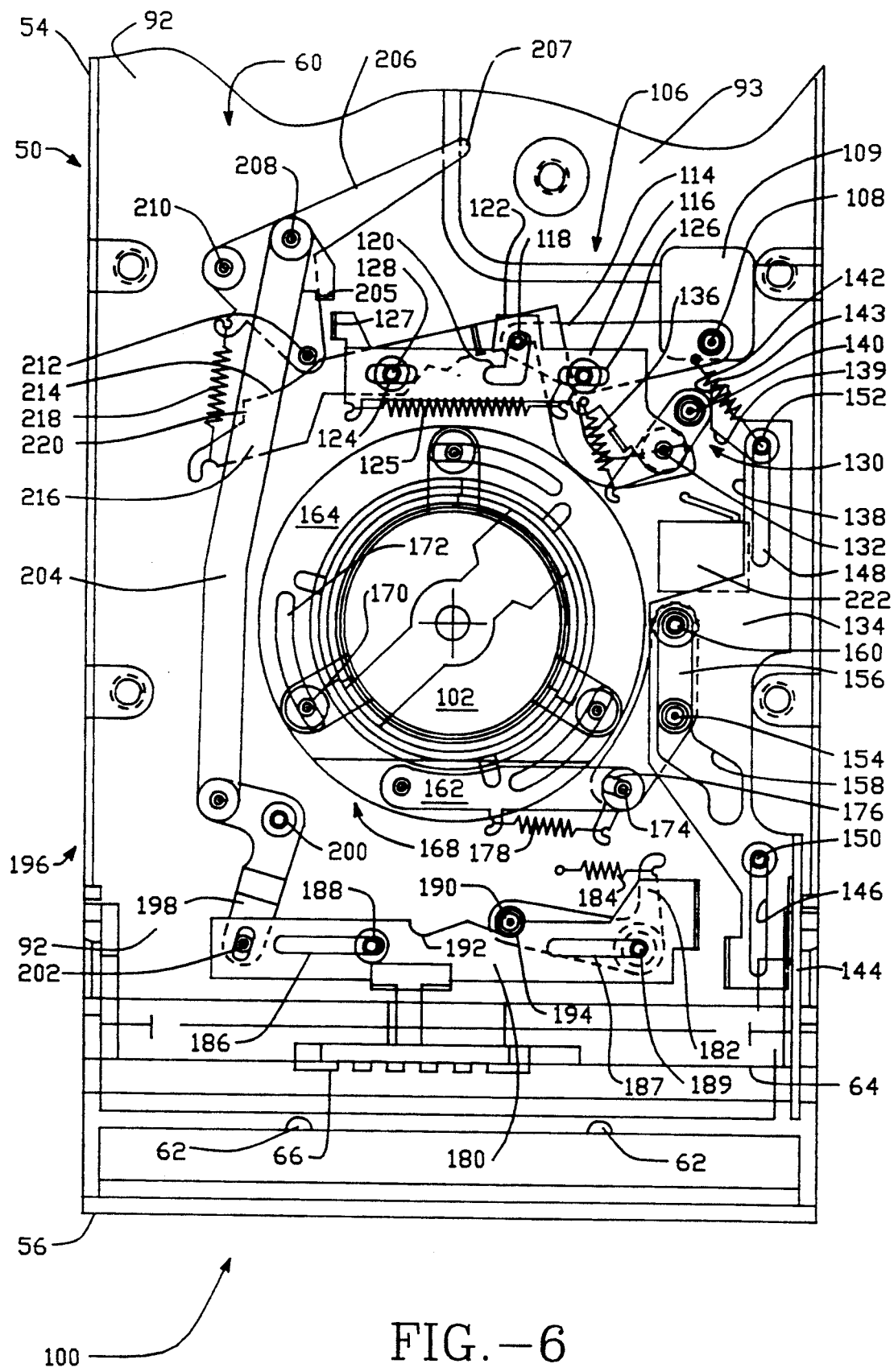
FIG. 6 depicts a cutaway and sectioned view of the disk drive of FIG. 1 with the cartridge receiver removed and some of the base plate cutaway in order to depict the position of the spindle motor and the various mechanisms, and with the door of the disk drive in an open position.
Figure 7:
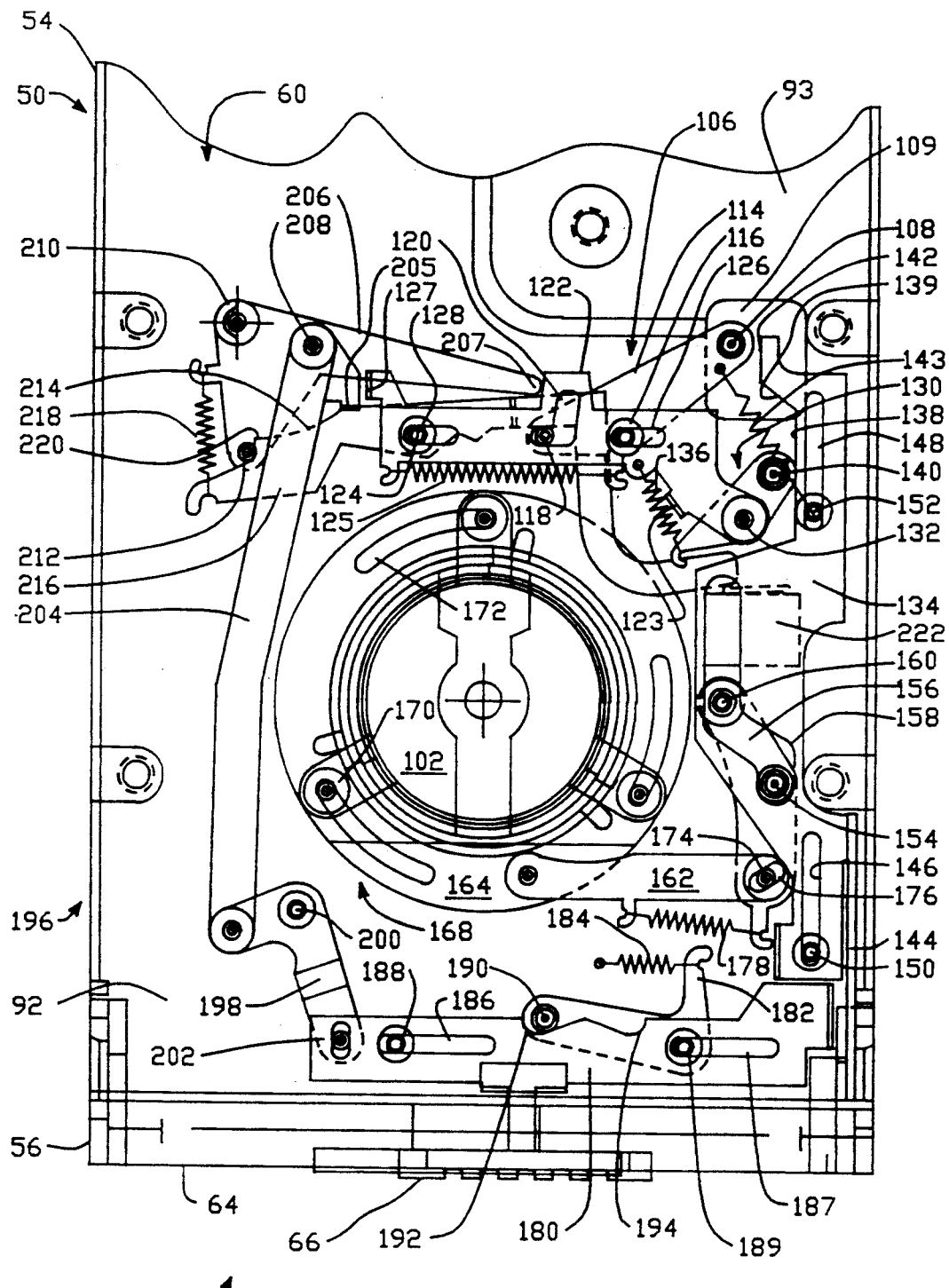
FIG. 7 is a cutaway, sectioned view similar to FIG. 6 with the door of the disk drive in a closed position and the various mechanisms repositioned.

FIGS. 6 and 7 depict the cartridge interlocking and spindle motor telescoping mechanisms 100 of the invention. Mechanisms 100, which along with the rest of the drive, afford the ability of the disk drive to store 40 megabytes or greater of information in the above specified desired form factor of a disk drive with about a 2.5 inch diameter disk with a drive height of about 19 millimeters and less.

FIG. 6 depicts the mechanisms 100 which resides in the lower portion of the disk drive 50 below the base plate 92, which base plate 92 has been removed in part to better reveal the mechanisms 100. FIG. 6 depicts the disc drive 50 with the door 56 provided in the open position and the mechanisms 100 as they would be preparatory to a cartridge being received in the receiver. FIG. 7 depicts the disk drive 50 with the door 56 in the closed position and with the mechanisms 100 positioned in the manner that they would be positioned where a cartridge 52 received in the disk drive 50.

The mechanisms 100 provides for the interlock functions necessary for the insertion and removal of the cartridge into the disk drive.

It is noted mechanisms 100 allow the cartridge to be inserted substantially on a horizontal plane and remain in that plane while the disk is spun by the spindle motor and the heads are loaded on the disk in order to read and write information. This design is highly advantageous with respect to other designs where the cartridge itself has to be physically lowered and set down on the spindle motor, whether through mechanical linkages or mechanical linkages in combination with solenoids. Thus, the present design affords for a more compact and reliable design for positioning the cartridge in the disk drive.

As the functions of the mechanisms 100 are performed mechanically, the present disk drive is highly suitable for use in a portable computer. There is no electrical power requirement and thus mechanisms 100 do not drain the battery of the portable computer. This allows the portable computer to function for a longer time than would be possible were the mechanism of the disk drive which afforded engagement and seating of the cartridge electrically operated. Further, should there be a power failure, in a solenoid system, it would be difficult to remove the cartridge and secure it. However in a mechanical system provided by the present invention, the cartridge can be removed at any desired time in order to secure or transport it.

Figure 10:
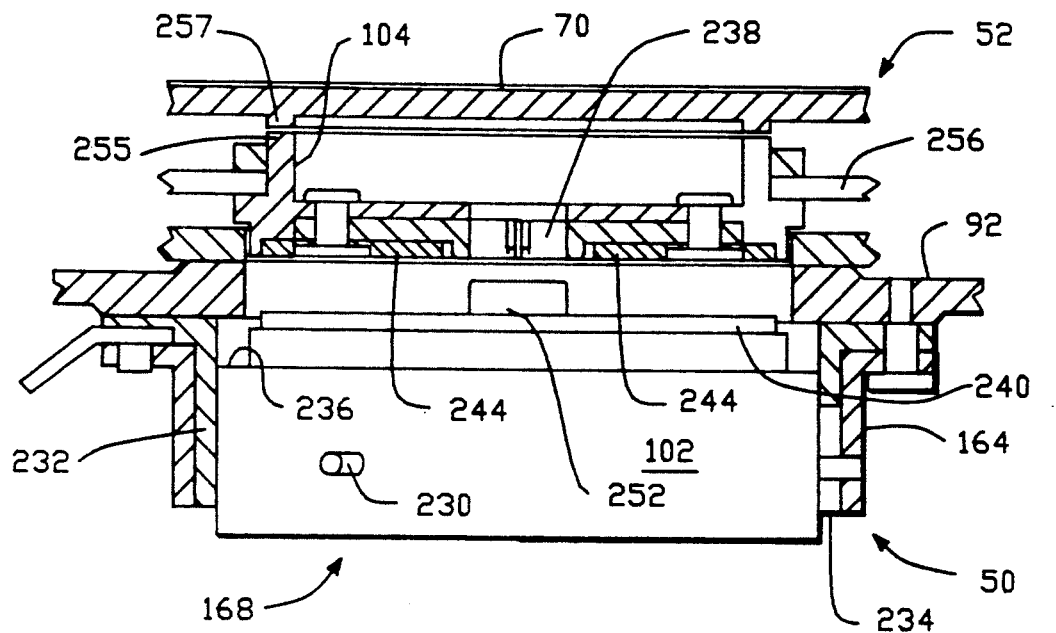
FIG. 10 depicts a cross-sectioned and cutaway view of the hub of FIG. 8 of the cartridge of the invention positioned above the spindle motor of FIG. 9 of the invention.
Figure 11:
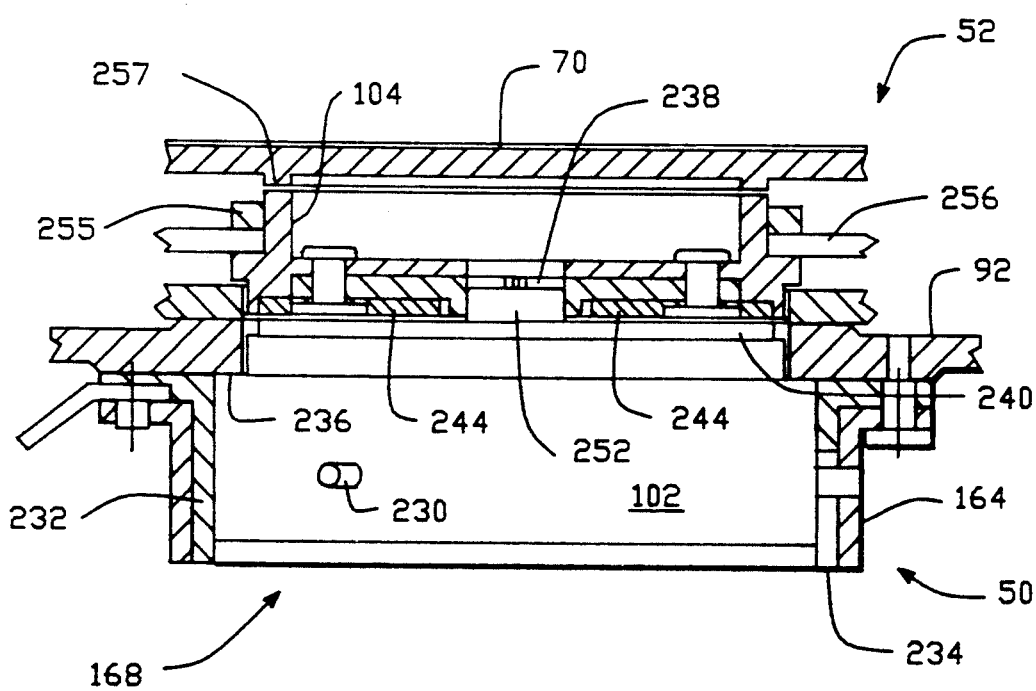
FIG. 11 depicts a view similar to FIG. 10 with the hub of the cartridge seated on the spindle motor of the invention.

In general, one of the main features of the mechanisms 100 include the spindle motor 102 being telescopably mounted so that it can move from a lower positioned as depicted in FIGS. 6 and 10 to an upper position as depicted in FIGS. 7 and 11 in order to engage the hub 104 of the cartridge 52. Further the mechanisms 100 includes an ejector mechanism 106 which has an ejector pin 108 which is used to lockingly receive and hold the cartridge 52 in the cartridge receiver 60. Ejector pin 108 projects through port 109 defined in base plate 92 into the cartridge receiver 60 in order to engage the cartridge 52. More specifically, the ejector pin 108 acts in a direction which is across, and in a preferred embodiment generally perpendicular to, the direction of insertion of the cartridge into the drive, which direction of insertion is shown by the arrow 110 on the cartridge in FIG. 5.

The cartridge interlocking and spindle motor telescoping mechanisms 100 perform four separate operations. These include (1) insertion of the cartridge into the drive, (2) enabling of the drive, (3) disabling of the drive and (4) removal of the cartridge from the drive. During the insertion operation, certain elements (described below) are interlocked so that cartridge cannot be removed while the drive is still in use. Further the interlocking elements provide that the drive cannot be enabled if a cartridge is not inserted into the drive. With no cartridge received in the disk drive, the interlocking elements will not allow the heads to be loaded onto the disk or the head arm actuator motor (which in a preferred embodiment is a voice coil motor) to be unlatched and enabled. Additionally, the spindle motor cannot be enabled without the cartridge properly inserted and seated in the cartridge receiver.

1. Insertion of Cartridge:

As the cartridge 52 is inserted into the disk drive, a cam detail or interlocking recess 90 (FIGS. 3, 22) on the underside of the housing of the cartridge 52 (discussed hereinbelow in greater detail) is engaged by the ejector pin 108 of the ejector mechanism 106. The ejector mechanism 106 further includes an ejector arm 114 which pivots about pivot pin 116 with an ejector arm follower pin 118 following an L-shaped cam slot 120 of an index bar 122 until the ejector arm follower pin 118 is lodged in the lower most portion of the L-shaped cam slot 120. This movement allows the spring 125 which is secured between the index bar 122 and the ejector arm 114 to cause the index bar 122 to move rightwardly to the position as shown in FIG. 7. The motion of the index bar 122 is guided by the slots 124 and 126 which are defined by the index bar 122. The previously identified fixed pivot pin 116 and the fixed pivot pin 128 are disposed through slots 126 and 124, respectively and according guide and limit the motion of the index bar 122.

As the index bar 122 moves to the right from the position in FIG. 6 to the position in FIG. 7, the follower arm assembly 130 which is pivotally mounted at pivot point 132 to index bar 122 is displaced toward the actuating arm 134. As this occurs, the follower 140 located on the end of follower arm assembly 130 remains in contact with the extended ledge or land 142 of the actuating arm 134 as shown in FIG. 6 and spring 136 which links assembly 130 to index bar 122 is stretched with the pivot point 132 located on index bar 122 being projected into a recess 138 of the actuating arm 134 as shown in FIG. 7. This action holds the index bar 122 in the rightward position of FIG. 7. At this point, with the ejector pin 108 moved to the more rearward position as shown in in FIG. 7 and engaging the cam detail or interlocking recess 90 of the cartridge 52, the cartridge is lockingly positioned or held in the cartridge receiver 60 and cannot be withdrawn. This process also stretches spring 143 which is mounted between actuating arm 134 and ejector mechanism 106. So stretched spring 143 can aid in ejecting cartridge 52. The reverse of this process causes the cartridge to be ejected from the drive as described hereinbelow.

The index box 122 includes an ear 137 located at an extreme leftward position thereon. Ear 127 along with an ear 205 of retract link 204 (described below) form an interlock that prevents (1) heads from unloading onto themselves, (2) the head actuator arm and actuator motor from moving and being enabled, and (3) the spindle motor from being enabled should a cartridge not be seated into the drive so as to cause index bar 122 to be repositioned rightwardly as ejector pin 108 is displaced from the position of FIG. 6 to the position of FIG. 7.

The actuating arm 134 is connected to the door 56 by a door linkage 144. As the door 56 is moved to the closed positioned as shown in FIG. 7, the door linkage 144 and the actuating arm 134 move rearwardly as guided by slots 146 and 148 which slots are constrained by fix pins 150 and 152 provided through slots 146, 148. During the first half of the motion of the actuating arm 134, the ejector mechanism 106 is armed for ejection of the cartridge 52 from the disk drive 50. This is accomplished due to the displacement of the follower 140 rightwardly into the now moved recess 138 of the actuating arm 134 shown in FIG. 7 with the accompanying contraction of spring 136 which is connected between an end of the follower arm assembly 130 and the index bar 122. Thus, follower 140 is now placed in the path of ramp 139 of recess 138. For ejection, ramp 139 urges follower 140 and thus index bar 122 leftwardly (as actuating arm 134 is pulled forwardly, by the drive door opening) to the position of FIG. 6, freeing pin 118 from the bottom of the L-shaped cam slot 118 and allowing spring 125 to rotate ejector pin 108 clockwise in order to eject the cartridge.

During the second half of the motion of the actuating arm 134 in a rearwardly direction, a follower roller 154 on the spindle motor actuating arm 156 follows the slot cam detail 158 on the actuating arm 134 causing the motor actuating arm 156 to rotate in a counterclockwise direction. As this occurs, the spindle motor actuating arm 156 pivots about fixed pivot pin 160. Fixed pivot pin 160 is disposed in the slot cam detail 158 of the actuating arm 134 in order to assist in directing the actuating arm 134 in a rearwardly direction.

As the spindle motor actuating arm 156 rotates, it pulls the motor drag link 162 to a rightward position as shown in FIG. 7. The motor drag link 162 is attached to the outer rotating barrel 164 of the motor lifting or telescoping mechanism 168 (more fully described hereinbelow). The spindle motor 102 is accordingly raised into contact with the cartridge and base plate 92 as the rotating barrel 164 is rotated in a counterclockwise direction from the position of FIG. 6 to the position of FIG. 7. The rotation of the outer rotating barrel 164 is guided by fixed pins 170 which are disposed within curved slots 172 which are defined by the outer rotating barrel 164. As rotation of barrel 164 occurs, the follower pin 174 affixed to the motor drag link 162 moves in the slit 176 defined in the spindle motor actuating arm 156. A spring 178 is connected between the motor drag link 162 and the spindle motor actuating arm 156 in order to encourage the motion of the follower 174 in the slit 176 thus ensuring the appropriate freedom of motion between the motor drag link 162 and the spindle motor actuating arm 156.

At this point, the spindle motor 102 has been telescoped upwardly into contact with the hub 104 of the cartridge 52 and also the bottom of base plate 92.

2. Enabling the Drive:

The disk drive 50 is now enabled by moving the slide 66 rightwardly from the position of FIG. 6 to the position of FIG. 7. The slide 66 is connected to an interlock bar 180 which slides across the path of the actuating arm 134 when and only when the actuating arm 134 is fully disposed in a rearward position as shown in FIG. 7. Thus, it can be appreciated that with the disk drive door 56 open, that the slide 66 cannot be moved fully rightwardly as the interlock bar 180 would come into contact with the actuating arm 134 and thus the drive cannot be enabled.

A detent arm assembly 182 held by a spring 184 provides positive location of the interlock bar 180 in the first position shown in FIG. 6 and the second position shown in FIG. 7. The motion of the interlink bar 180 is guided by the slots 186, 187 defined by the interlock bar 180 and by the fixed pins 188, 189 which are disposed in slots 186, 187. As interlock bar 180 moves between the first and second positions as shown in FIGS. 6 and 7, the roller follower 190, located on the detent arm assembly 182, moves between the first and second recesses 192, 194 on the interlock bar 180. With the assistance of the spring 184 the interlocking bar 180 causing the detent arm assembly 182 to pivot about the fixed pin 189, resulting in the interlock bar 180 being retained in either the position of FIG. 6 or FIG. 7.

Connected to the interlock bar 180 is a linkage assembly 196 which comprises a retract actuating arm 198. Arm 198 is pivoted about fix pivot pin 200 in a counterclockwise direction as the retract actuating arm 198 is directly connected to the interlock bar 180 by the pin and slot arrangement 202. The linkage assembly 196 further includes a retract link 204 which is pivotally pinned to the retract actuating arm 198. Retreat link 204 includes ear 205 which can interlock with ear 127 of index bar 122 to prevent operation of the drive should a cartridge not be properly inserted in the cartridge receiver 60. FIG. 6 shows how ears 127 and 204 interfere and prevent enablement of the drive and unloading of the heads onto themselves if a cartridge has not be received in cartridge receiver 60. FIG. 7 shows ear 127 moved out of the way of ear 205 as the cartridge has been properly inserted in the cartridge receiver 60, so as to move ejection pin 108 and thus causing the index bar 122 to move rightwardly. This action allows slide 66 to enable the disk drive motor and allows the heads to be unloaded onto the disk.

The retract link 204 is also pivotally connected to the retract arm 206 by pin 208. The retract arm 206 is pivotedly mounted about fix pivot pin 210. The retract arm 206 moves in a clockwise direction from the position in FIG. 6 to the position of FIG. 7 during the motion of the interlock bar 180 to the rightward position as shown in FIG. 7. This motion of the retract arm 206 takes it out of the path of the motion of the head actuator assembly and in particularly pin 283 of the actuator arm 282 (described below) and thus allows the heads under the control of a voice coil motor to be unloaded onto the disk. Motion of the slide 66 leftwardly to the position of FIG. 6 causes the retract arm 206 to move in a counterclockwise direction causing the heads to be removed from the disk and parked as described below, preparatory to the removable of the cartridge 52 from the drive 50. It is noted that portion 93 of base plate 92 onto which the voice coil motor and head actuator arm (FIG. 20) are mounted is lower than the rest of the base plate 92 and that the elongate end 207 projects through a port in base plate 92 and over the lower portion 93 in order to engage pin 283 (FIG. 20) of the actuator arm 282 and thus to remove and hold the head actuator arm 282 with the head parked off the disk.

The retract arm 206 includes a retract follower pin 212 which moves the down the curved camming surface 214 of the switch lever 216. The retract follower pin 212 is maintained in contact with the curved camming surface 214 by the spring 218 which is connected between the retract arm 206 and the switch lever 216. During the last portion of the motion of the retract follower pin 212, pin 212 drops off shoulder 220 of the curved camming surfaces 214 such that the switch lever 216 rotates in a clockwise direction about fixed pivot pin 124. The switch lever 216 rotates due to the contraction of spring 218. This clockwise rotation of the switch lever 216 depresses a switch arm of switch 222.

With the above arrangement, the disk drive 50 is not enabled if a cartridge 52 has not been inserted into the cartridge receiver 60. With no cartridge 52 in the cartridge receiver 60, the ejector arm 114 will not have been rotated in a counterclockwise manner from the position of FIG. 6 to the position of FIG. 7 and the index bar 122 would not have been moved to the right as shown in FIG. 7. With the index bar 122 in the position of FIG. 6, the ear 127, which is located on the index bar 122, blocks ear 205 on retract link 204 and thus blocks the rotation of the switch lever 216 during the rotation of the switch lever 216 in a clockwise manner and the switch 222 is not turned on and the motors and drive are not enabled. Further, end 207 cannot move sufficiently to allow the actuator arm to unload the heads onto themselves, there being no cartridge received in the drive.

All of the above described linkages and arms are positioned about the telescoping spindle motor 102 and are substantially tangential to the spindle motor. It is this configuration which also affords the present drive 50 the ability to perform all of the interlocking and safety functions while compactly configuring the disk drive 50 into the required form factor as specified about.

It is noted that in a preferred embodiment, that the various linkages are comprised of steel, with the rotating barrel being brass.

3. Disabling Drive:

The drive is disabled by moving the slide 66 to the leftward position as shown in FIG. 6. When this occurs, the above linkages and assemblies move directly opposite to that described above in order to move the switch lever 216 away from engagement with the switch 222 thus disabling the drive.

4. Removable of the Cartridge:

After the slide 66 is moved leftwardly to the position of FIG. 6, the door 56 can be opened as the interlock bar 180 is moved out of the way of the actuating arm 134, allowing the actuating arm 134 to move frontwardly toward the door as the door is opened. During the first half of the movement of the actuating arm 134 and thus the first half of the motion of door rotating to an open position, the motor is disengaged from the hub. This occurs as outer rotating barrel 164 is moved in a clockwise direction from the position of FIG. 7 to the position of FIG. 6 through the movement of the motor lifting or telescoping mechanism 168 which includes the spindle motor actuating arm 156 and the motor drag link 162. As this occurs, the spindle motor 102 is telescoped downwardly out of contact with the hub of the cartridge (as will be more fully described hereinbelow). During the second half of rotation of the door to the fully opened position, the cartridge is ejected from the drive due to the motion of the ejector pin 108 from the position of FIG. 7 to the position of FIG. 6 under the influence of the above described linkages and springs associated with the motion of the ejector pin 108. Essentially, as the actuating arm 134 moves forwardly towards the door 56, the follower 140 rides up on the cam surface 139 of the recess 138 until it reaches the extending ledge or land 142. This action urges follower arm assembly 130 against stop 123 of index bar 122, which urges the index bar 122 leftwardly allowing the spring 125 to rotate the ejector mechanism 106 in a clockwise direction ejecting the cartridge, as the ejector arm follower pin 118 is caused to follow the L-shaped cam slot 120 back to the original position as shown in FIG. 6.

Hub Telescoping Mechanism

Figure 8:
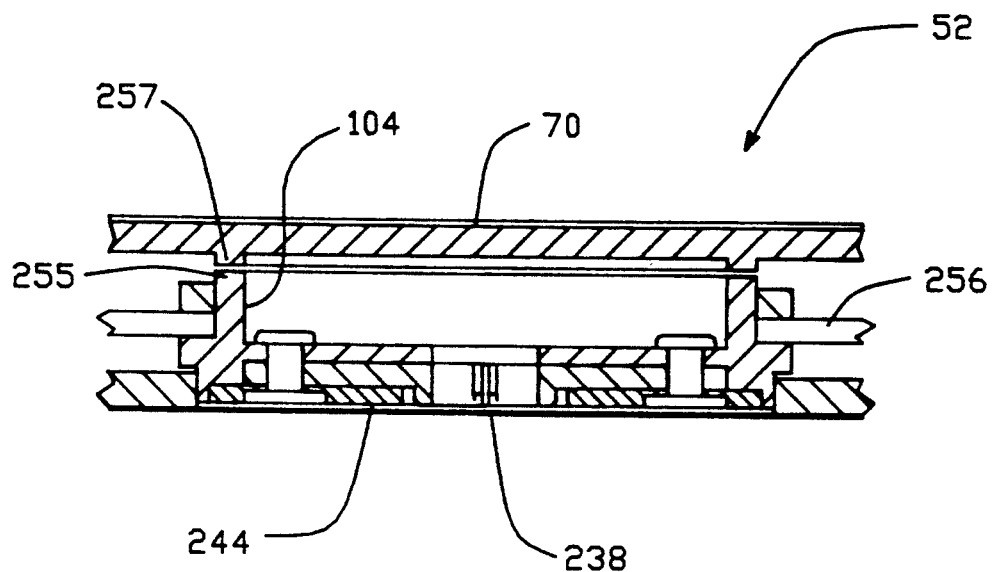
FIG. 8 depicts a cutaway and sectioned view of an embodiment of the cartridge with the cartridge hub.
Figure 9:
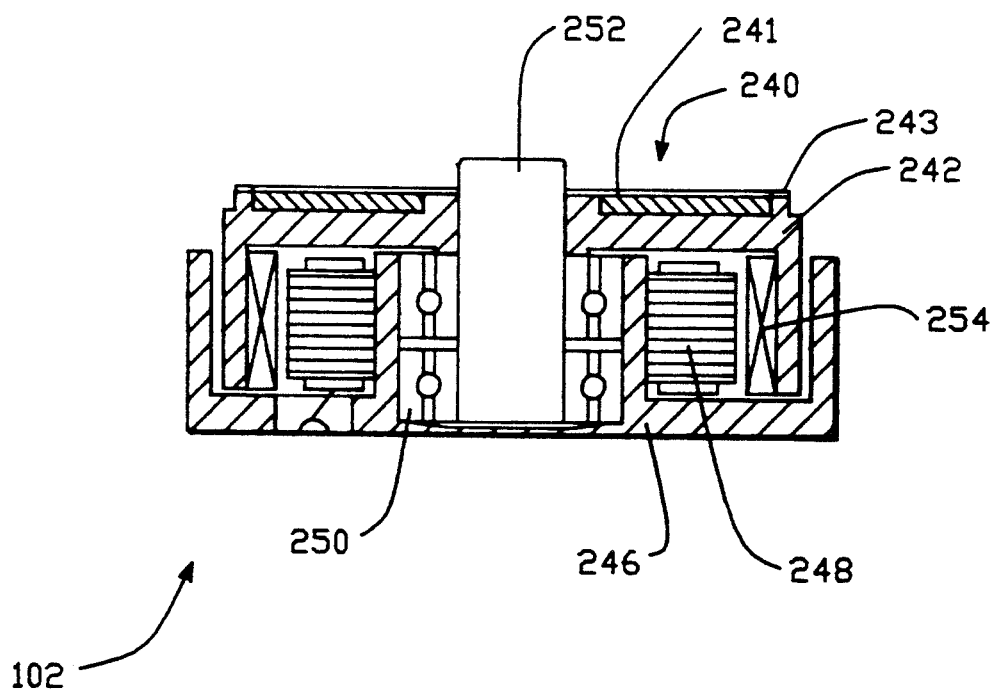
FIG. 9 depicts a cross-section view of an embodiment of the spindle motor of the disk drive of the invention.
Figure 12A:
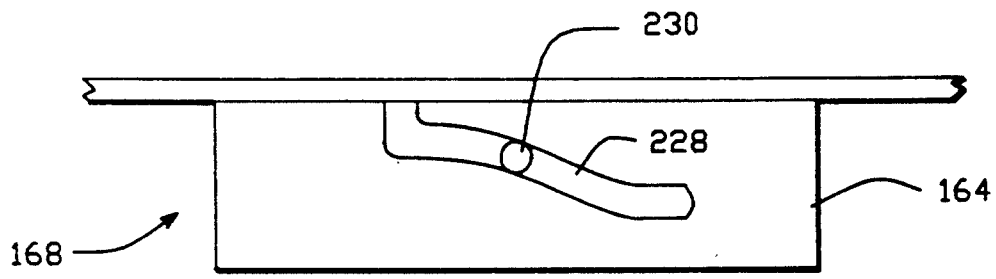
FIG. 12a depicts a side view of an embodiment of an outer housing or barrel for the spindle motor of FIGS. 4 and 10 of the invention with a cam profile.

FIGS. 8 and 9 depict the cartridge 52 and the spindle motor 102 of the disk drive 50. In particular in FIG. 8, the hub 104 of the cartridge is shown in cross-section with the rest of the cartridge 52 cutaway. FIGS. 10, 11 and 12 depict the spindle motor telescoping mechanism 168 which enables the spindle motor 102 to engage the hub 104. As can be seen in FIG. 10, the spindle motor is out of engagement with the hub 104. In FIG. 11, the spindle motor 102 has been telescoped into engagement with the hub 104.

Prior art designs for removable cartridge disk drives require that the cartridge be inserted into a cartridge receiver and that the cartridge receiver be then repositioned using various linkages and/or solenoids causing the cartridge hub to be seated generally downwardly onto the shaft or spindle of the spindle motor. Such an arrangement requires a larger form factor than is desirable and provided by the present invention. In the present invention, the cartridge 52 is received and maintained in the cartridge receiver 60 in a single plane, and remains in that single plane until the cartridge is again ejected from the disk drive 50. This being the case, the spindle motor must move and preferably telescope from a lower position to an upper position into engagement with the hub 104 of the cartridge 52. As will be described more fully below, the spindle motor 102 is free to move only axially from the lower position to the upper position into engagement with the hub 104. The spindle motor 102, as will be explained hereinbelow, is restrained from rotating in a clockwise or in a counterclockwise direction about the telescoping direction thereby eliminating the stress on any motor flexible cabling. In a preferred embodiment, spindle motor 102 moves substantially perpendicularly to the base plate 92 of the drive which base plate 92 forms the bottom of the cartridge receiver 60 upon which the cartridge is received (FIGS. 10 and 11).

Accordingly, this present design eliminates the need for a cartridge receiver which must move and set the cartridge down on the spindle motor and thereby affords the advantage of a removable cartridge disk drive which has a thinner form factor.

After the cartridge 52 is inserted into the cartridge receiver 60, the actuating arm 134 through the use of the spindle motor actuating arm 156 and the motor drag link 162 causes the outer rotating barrel 164 to rotate in a counterclockwise direction. The outer barrel has three identical cam profiles, such as profile 228 (FIG. 12), which engage three pins, such as pins 230, which extend from the spindle motor 102. An inner stationary barrel 232 has slots 234 in which the pins 230 are disposed. These slots 234 are in the preferred embodiment substantially perpendicular to the drive base plate 92 and prevent rotation of the spindle motor 102 as the motor is telescoped upwardly towards the base plate 92 with the pins 230 following the cam detail 228. To accomplish this, the inner stationary barrel 230 is rigidedly pinned to the base plate 92 while the outer rotating barrel 164 rotates relative thereto as described hereinabove. Accordingly, the motor is telescoped until shoulder 236 of the spindle motor 102 seats against the bottom of base plate 92. As this occurs, with the cartridge inserted in the cartridge receiver, the motor shaft 252 engages the hub chuck 238 (FIGS. 10, 11, 31a) of the cartridge. The magnetic clamp 240 on the spindle motor rotor 242 seats the armature plate 244, the hub chuck 238 and the hub 104 of the cartridge onto the spindle motor 102 by magnetically drawing the armature plate 244 into contact with the magnetic clamp 240. It is to be understood that the magnetic clamp 240 engages the armature plate 244, in a preferred embodiment, before the spindle motor 102 has been fully seated against the drive base plate 92. The spindle motor 102 is finally and fully seated against the drive base plate 92 with the movement of the motor drag link 162 and the spindle motor actuating arm 156 which continues to cause the outer rotating barrel 164 to rotate. The spring 178 secured between the motor drag link 162 and the spindle motor actuating arm 156 transmits force through the rotating barrel 164 so that the spindle motor 102 is positively loaded against the drive base plate 92 as shown in FIG. 11.

Figure 12B:
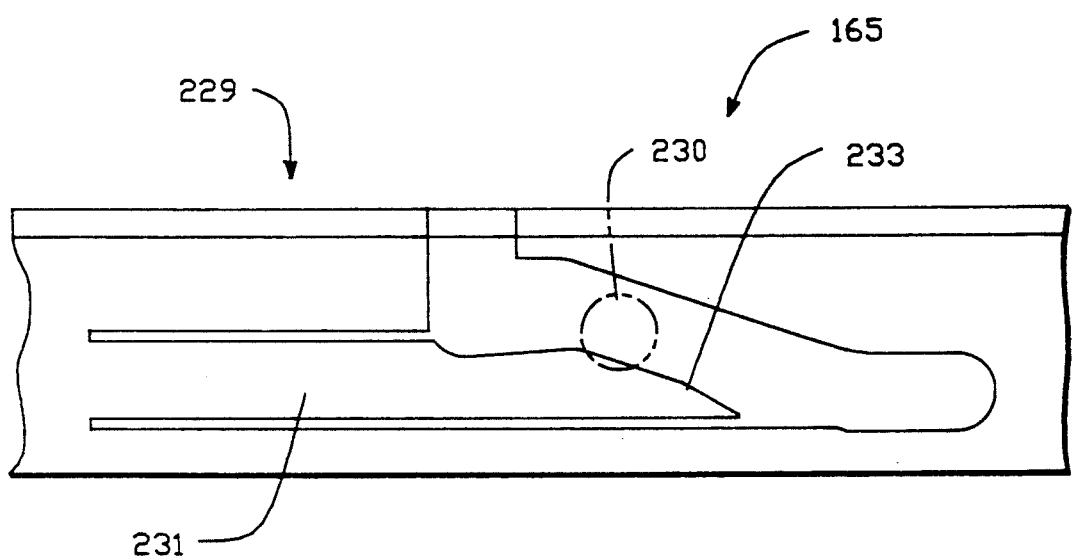
FIG. 12b depicts a view similar to FIG. 12a but with another cam profile.

An alternative embodiment for the outer rotating barrel 164 is shown in FIG. 12b. The outer rotating barrel 165 in FIG. 12b includes two cam details, such as cam detail 229 depicted and one cam detail 228 or alternatively three cam details such as cam detail 229.

As indicated, the spindle motor 102 has a down position (cartridge disk disengaged) and an up position (cartridge disk engaged). To assure that the motor is firmly pushed up against three pads on the underside of the base plate 92, at least two cam details 229 are used. Cam detail 229 includes an integral beam springs 231 with a cam surface 233 that is higher than that of the cam detail 228.

When the motor 102 is guided up the fixed cam detail 228 with one pin 230, the two other pins 230 deflect the beam springs 231 in a downward direction, which results in a upward force on the two pins 230 forcing the motor 102 upwards against the pads on the base plate 92.

Figure 12C:
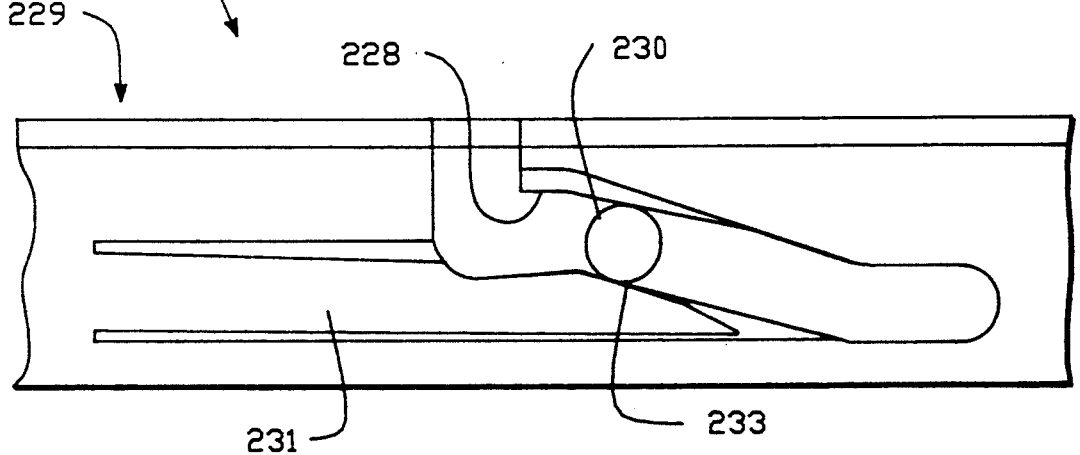
FIG. 12c depicts the cam profiles of FIGS. 12a and 12b superimposed in order to show the differences in profiles.

FIG. 12b show beam spring 231 with the cam surface 233 in an undeflected position and an outline of pin 230 where it would be positioned if it were disposed in cam detail 229. As seen, pin 230 would have displaced beam spring 231 downwardly. FIG. 12c shows cam surface 233 of beam spring 231 deflected downwardly, and superimposed thereover the cam detail 228 with pin 230 disposed therein. It is noted that cam surface 233 pushes pin 230 against the upper surface of cam detail 228 but that the upper surface of cam detail 229 does not contact or limit the motion of pin 230.

The above arrangement ensures that the spindle motor 102 makes contact with the three pads on base plate 102 resulting in accurate seating of the motor 102 and no system vibration that could result if motor 102 were not so seated.

Disk Drive Spindle Motor and Clamp Magnet

In a preferred embodiment, the spindle motor 102 is of the brushless DC spindle motor variety with the above identified clamp magnet 240. The spindle motor 102, in a preferred embodiment, is also of the radial gap, outer rotor configuration and includes the rotor 242 as well as the stator 246 (FIG. 9). The stator 246 includes the stator windings and lamination 248 and mounts the bearings 250 upon which the spindle shaft 252 and the rotor 240 rotates. The rotor 242 includes, in a preferred embodiment, permanent magnets 254 which cause the rotor 242 to rotate under the influence of the stator windings 248.

In FIG. 9, the combination of the clamp magnet 240 located on the back of the rotor 242 in a magnetic removable cartridge disk drive is a novel configuration. The clamp magnet 240 includes a single uniform pole magnetic ring 241 with a low reluctance magnetic flux path ring 243 positioned outboard thereof. The flux path ring 243 projects above the magnetic ring 241 and can contact the armature plate 244.

With the embodiment of FIG. 9, it is to be understood that great advantages can be obtained from the production of all of the clamp magnets 240 for all of the disk drives 50 having a single uniform pole magnetic ring 241 which always has the same polarity as seen from a cartridge 52 inserted into the disk drive. By way of example, the magnetic ring 241 could have a north pole facing away from the spindle motor toward the cartridge. The armature plate 244 could then either be premagnetized with a south pole extending away from the cartridge 52, and thus seen by the clamp magnet 240, or could be left unmagnetized. In the first arrangement, the south pole of the armature plate 244 would be attracted by the north pole of the clamp magnet 240. In the second arrangement, after several insertions of the cartridge into the drive, the armature plate 240 would acquire a south pole orientation extending in a direction away from the cartridge and thus be attracted by the north pole of the spindle motor. Alternatively, it is to be understood that the clamp magnets 240 can have a south pole directed away from the spindle motor and the armature plate 244 can have a north pole directed away the removable cartridge 52.

Such arrangements are highly advantageous as the flux lines in the armature plate take a preferred direction with respect to the flux lines in the clamp magnet and thus there is an increase in clamping force between the armature plate and the clamp magnet. Were the same poles outwardly projecting from both the clamp magnet and the armature plate, the clamping force between the two would be decreased. This might occur if some of the clamp magnets for the spindle motors were manufactured with a north pole facing up and some were manufactured with a south pole facing up. Thus, it is advantageous to have all of the clamp magnets, for all of the spindle motors for all of the disk drives manufactured with the same polarity facing up.

Alternative embodiments of the below discussed clamp magnet 240 have a novel design for magnetically drawing thereto and holding the armature plate 244 of the cartridge 52. The novel design meets two goals. First, the clamp magnets have been designed to have a sufficiently high force in order to draw and hold the armature plate thereto under shock loading, while secondly having a sufficiently weak leakage field that any data on the magnetic disk is not affected by or exposed to the leakage field from the clamp magnet as the disk is inserted over the clamp magnet. Thus, the clamp magnet must be designed to have sufficient force to hold the disk in place under shock loading and have a sufficiently weak field to obviate erasure of the data. Greater force requires a greater magnetic field. Hence the design of the clamp magnet provides for sufficient high force with a sufficiently weak leakage field.

FIGS. 13a, 13b depict a first alternative embodiment of the clamp magnet of the invention. In this embodiment, a clamp magnet 245 is comprised of three rings 258 which are comprised of a low reluctance magnetic flux material such as for example steel as well as three magnet rings 260. As can be seen in FIG. 13a, 13b the rings 258 and magnet rings 260 are interposed with each other with the outer most being the low reluctance magnetic flux path ring 258 followed alternatively by a magnet ring 260 and then a ring 258 and progressing inwardly towards the spindle shaft 252. In this configuration, the low reluctance magnetic flux path rings 258 extend further away from the rotor 242 than do the magnet rings 260. It is noted that the distance over the top of any of the magnets 260 between two steel rings 258 is relatively short. This decreased distance reduces the flux leakage which would normally occur in a magnetic clamp where there is only one magnet which essentially occupies the radial length of the three magnet rings 260 and the three steel rings 258. Further, as the three rings 258 come into contact with the armature plate 244, this contact provides a low reluctance flux path for the magnetic flux and permits the required binding force to be asserted upon the armature plate.

In a preferred embodiment, the magnetic rings 260 are comprised of HB061 material and the steel rings 258 are comprised ST461 material. The armature plate 244 in a preferred embodiment is comprised of magnetic stainless steel. With the configuration as shown in FIGS. 13a, 13b, the magnetic force on the armature plate is minus 10.7N (Newtons). The leakage level is $184 \times 10^{-5}$T (Tesla) at 4 mm.

In a similar configuration, with only two steel rings 258 and two magnetic rings 260 made of the same materials, the force on the armature plate is equal to a minus 8.5N with the leakage level being 20 G (2 mT) of 4 mm. In such a configuration the leakage is satisfactory but the force is to low for the present embodiment.

Figure 14:
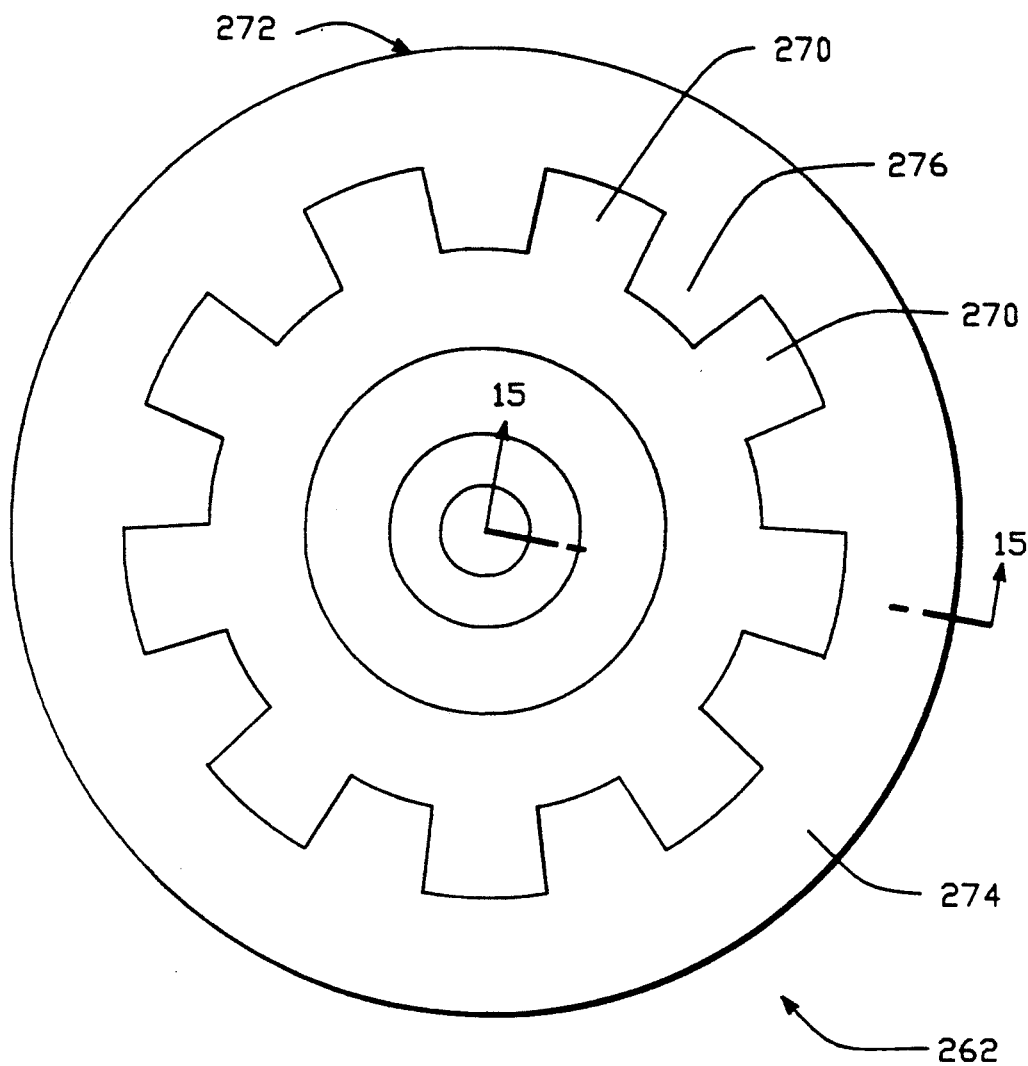
FIG. 14 depicts another alternative embodiment of the magnetic clamp.
Figure 15:
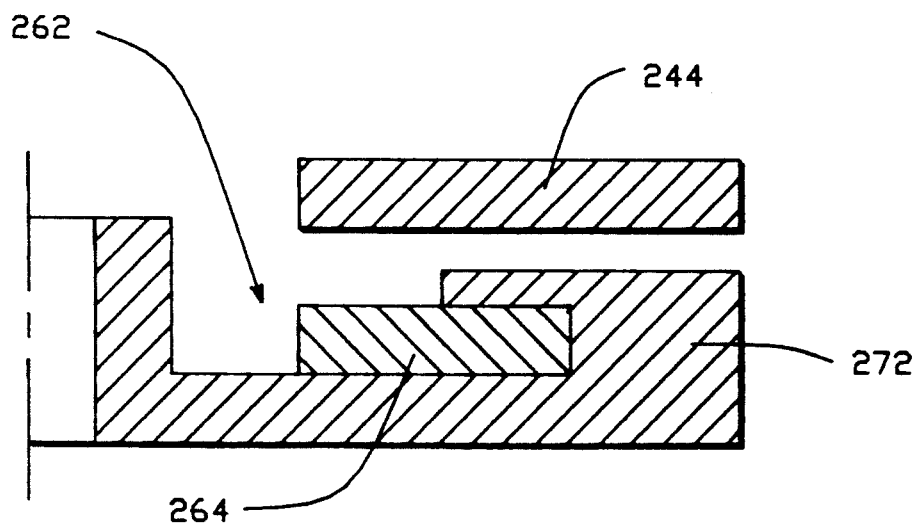
FIG. 15 depicts a cross-sectional view of FIG. 14 through line 15—15.

FIGS. 14 and 15 depict an alternative embodiment of the clamp magnet of the invention which clamp magnet is identified by the numeral 262. This clamp magnet is made of the same material of the prior clamp magnet but is less expensive to manufacture. This clamp magnet has the same properties of the prior clamp magnet of FIGS. 13a, 13b. In this embodiment, the magnetic element 264 is configured much like a gear with an inner ring 268 with a plurality of spaced radial projections 270 extending therefrom. The low reluctance magnetic flux path element 272 which is comprised of steel, in a preferred embodiment, is configured as an inwardly directed gear with an outer ring 274 with spaced radial projections 276 which are inwardly directed. It is noted that the spaced radial projections 270 of the magnetic element 264 alternate with the spaced radial projections 276 of the low reluctance flux path element 272. Such an arrangement gives a force and flux leakage which are comparable to the embodiment of FIGS. 13a and 13b. In an alternative embodiment for FIG. 14, the positions of the flux path element 272 and the magnetic element 264 can be switched.

Figure 16:
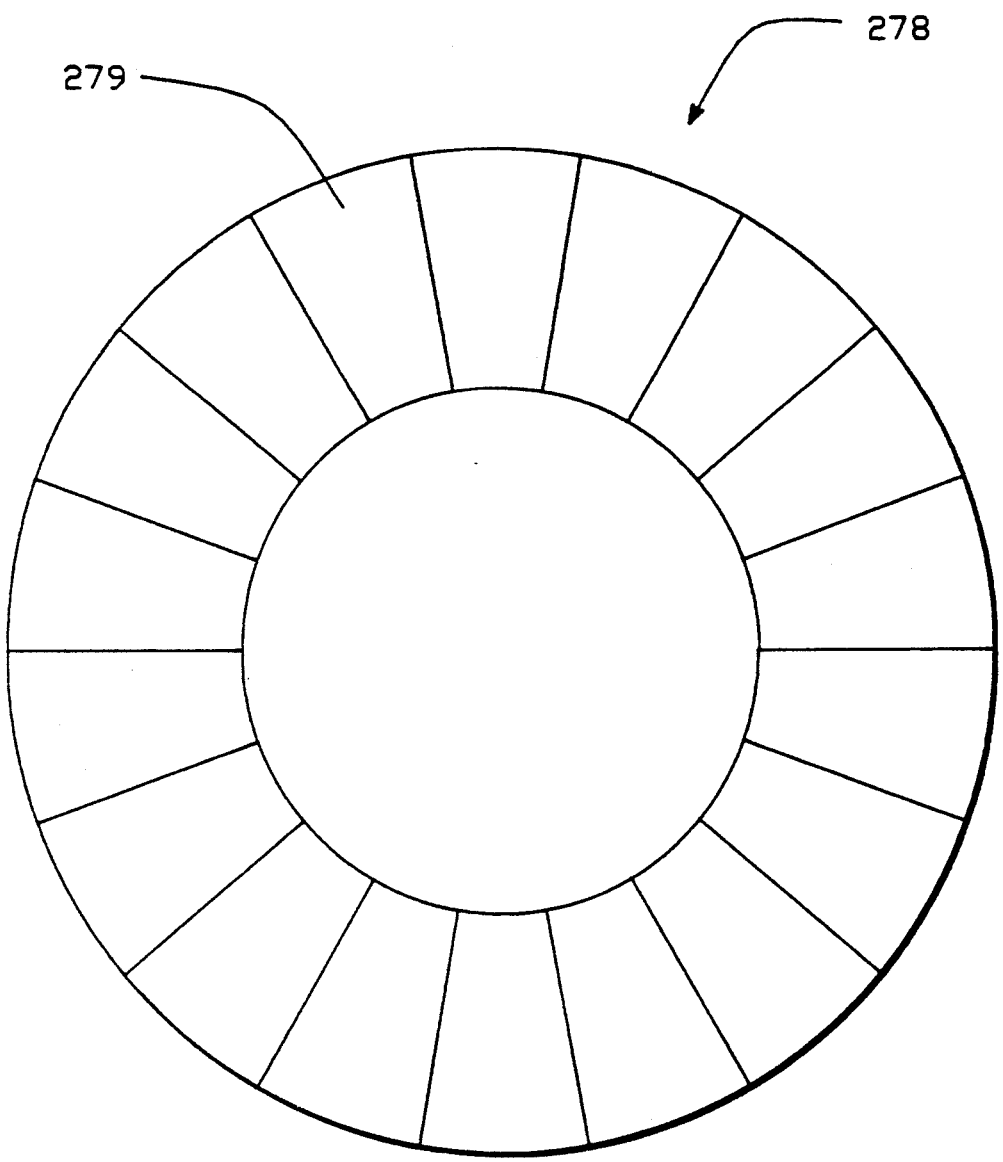
FIG. 16 depicts yet another alternative embodiment of the magnetic clamp.

FIG. 16 depicts yet another embodiment of a clamp magnet 278 of the invention. This clamp magnet 278 includes, in a preferred embodiment, eighteen individual magnetic poles 279 which alternate between north and south poles. The division of the magnetic clamp 278 into a plurality of alternating poles reduces the leakage flux, but has the desired magnetic force in order to pull down the armature plate of the cartridge. In such an arrangement, each of the poles is afforded about 20 degrees with the chuck force predicted to be about minus 5N and the leakage less than 3 mT at 4 mm distance.

Figure 17:
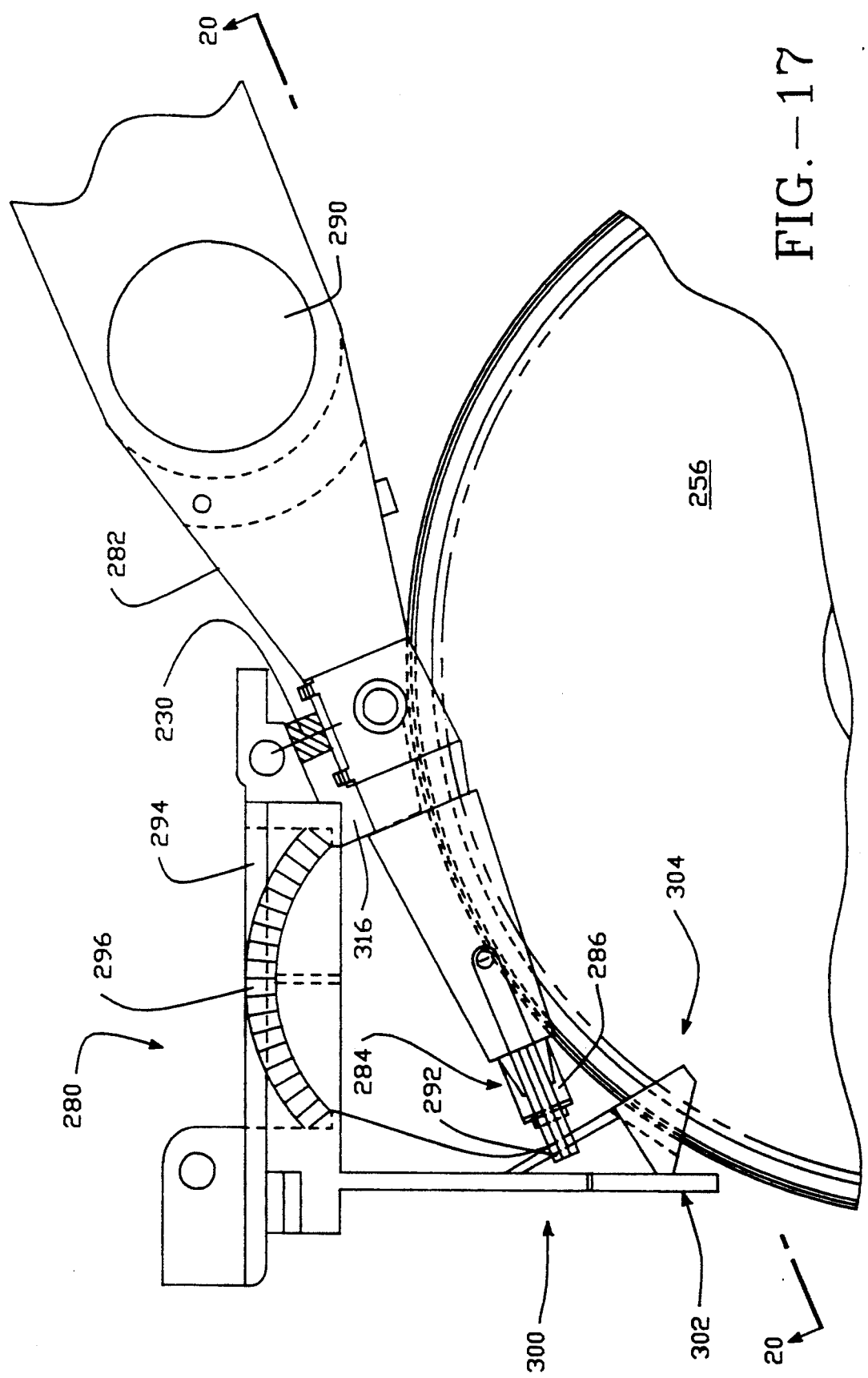
FIG. 17 depicts a plan broken-away view showing an embodiment of a transducer or head mounted on an actuator arm of the disk drive of the invention resting in a position away from the disk of the cartridge of the invention.
Figure 21:
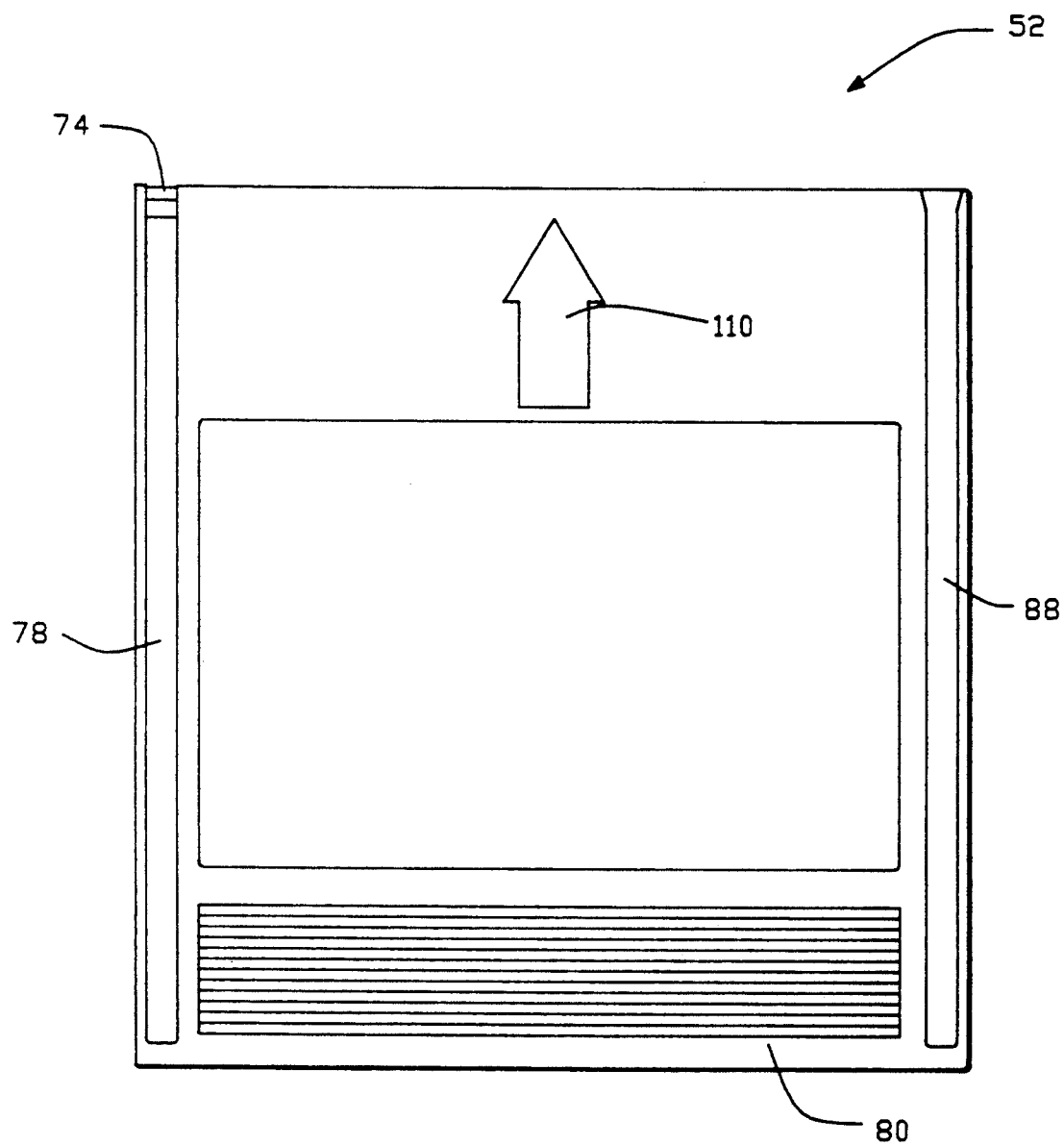
FIG. 21 depicts a plan view of the embodiment of the cartridge of the invention of FIG. 23.

Integral Head Loading Ramp, Air Filter and Removable Cartridge Door Safety Stop FIGS. 17, 18, 19 and 20 depict another aspect of the invention which includes an integral element 280 which performs among other things the functions of providing for dynamic head loading and unloading, housing a recirculating air filter, and providing for a cartridge door safety stop. Additionally through the proper selection of materials, the integral element can provide for an electro-static discharge drain for the cartridge. FIG. 19 depicts the integral element 280 by itself while FIGS. 17 and 18 depict the integral element 280 in conjunction with the disk 256 from the cartridge 52 as well as the actuator arm 282 upon which is mounted the head-gimble assembly 284 which includes the magnetic head or transducer 286. The actuator arm 282 is moved in a clockwise and a counterclockwise direction by the actuator motor 290 which in a preferred embodiment is a voice coil motor. As can be seen in the figures, outboard of the head-gimble assemble 284 is an extension 292 of the actuator arm 282 which rides on a ramp provided by the integral element 280 as will be described more fully hereinbelow.

FIG. 17 shows the extension 292 of the actuator arm 282 parked on the ramp of the integral element 280. FIG. 18 depicts the extension 292 of the actuator arm 282 positioned just before the transducer 286 would be unloaded onto the disk 256.

The integral element 280 which, in a preferred embodiment, is cast as a one-piece, integral, element, includes a base 294 which serves as a holder for an air filter element 296 which can be inserted therein. The base 294 as can be seen in FIG. 19d includes two rectangular shaped openings 298 which are placed side-by-side and allow air to flow through air filter elements 296. Extending from the base 294 is a projection 300. Projection 300 in a preferred embodiment is substantially perpendicular to the base 294. Projection 300 is bifurcated into a cartridge door safety stop 302 and a head ramp 304. The cartridge safety stop 302 (side profile of FIG. 19b) includes a projected end 306 which is substantially flat and perpendicular to the plane of the disk 256. Further as the integral element 280 is secured to the base plate 92 of the disk drive upon which the cartridge is received, the projected end 306 is perpendicular to the base plate 92. Extending rearwardly and upwardly from projected end 306 is a cartridge door ramping surface 308.

Additionally, the cartridge door safety stop 302 is disposed in a direction which is parallel to the direction of insertion of the cartridge into the drive and that it extends into the cartridge that is properly seated in the cartridge receiver.

As the cartridge is inserted into the disk drive and in particular into the cartridge receiver 60, the cartridge door 68 (as will be more fully explained hereinbelow) is caused to rotate by the cartridge receiver in order to allow the actuator arm 282 to transport the head-gimble assembly 284 to a position where it can be loaded onto the disk 256. The cartridge door 68 is opened by rotating it from zero degrees to approximately ninety degrees. Due to assembly and part tolerances, the cartridge door 68 may not reach a full ninety degrees of rotation. This being the case, there might not be enough clearance for allowing the head- e gimble assembly 284 to be inserted into the cartridge. Accordingly, the cartridge door safety stop 302 provides for the projected end 306 which will stop the further insertion of the cartridge into the drive if the door has not reached at least approximately a minimum of 80% of the required rotation from zero to ninety degrees. Further, if the cartridge door has reached a minimum of 80% of its full rotation, the cartridge ramp surface 308 will ensure that the door rotates 100% to a position of ninety degrees relative to its closed position, thus ensuring that there will be no interference between the door and the unloading of the head onto the disk.

The head ramp 304, as can be seen in the figures and in particular FIG. 19f includes a bifurcated end 310 which includes an upper ramp surface 312 and a lower ramp surface 314. As can be seen in FIGS. 17 and 18, with the cartridge inserted into the drive, the disk 256 is disposed between the upper and lower ramp surfaces 312, 314. The actuator arm 282 under control of the actuator motor 290 can then move the head-gimble assembly 284 from a parked position as shown in FIG. 17 to a position shown in FIG. 18 where the heads are at the end of the ramps 312, 314, preparatory to being immediately unloaded onto the disk 256. As can be seen from the figures, the extension 292 of the actuator arm 282 rides up on the upper ramp surface 312. A similar extension rides on the lower ramp surface 314 in order ramp the lower head away from the lower surface of the disk 256. In a preferred embodiment it can be seen that the bifurcated end 310 is directed so that it is substantially perpendicular to the actuator arm 282 and substantially along a radius of the disk 256.

The recirculating air filter element 296 as previously indicated, is secured to the base 294. The air filter element 296 is provided in a semi-circular configuration and is made out of materials which are known in the trade. In operation, a positive pressure field is maintained on the front or convex side of the air filter element 296, while a negative pressure field is maintained on the back or concave side of the element 296. The total difference between the positive and negative pressure is proportional to the relative flow of air through the air filter.

The integral element 280 additionally includes an air flow diverter 316 which extends from the base 294 at a location distal from where the projection 300 extends. The projection 300 extends from a position which is one end of the air filter 296 while the air flow diverter 316 projects from a position which is on the other side of the air filter 296. The diverter 316 is substantially a flat plane which projects outwardly in the plane of the disk 256 and has a curved edge 318 which substantially conforms to the portion of the disk 256 that is located adjacent thereto as shown in FIGS. 17 and 18. The air flow diverter 316 is used to maximize the pressure differential across the air filter element 296. With the disk 256 rotating in a preferred embodiment in a counterclockwise direction, the air flow diverter 316 assists the re-directing of the air rotating with the disk into the cavity which exists in front of the air filter elements 296 (convex side) in order to create a higher positive pressure.

Integral element 280 can have affixed thereto a stop mechanism 320 which in a preferred embodiment is comprised of an elastomer or other energy absorbing material or mechanism. The stop mechanism 320 is used to damp and stop uncontrolled rotary motion of the actuator arm 282 and thus the head-gimble assembly 284 and decelerate that motion should the actuator motor 290 attempt to park the heads on the bifurcated end 310 at too rapid a velocity.

Accordingly, the stop mechanism 320 prevents rapid deceleration of the actuator arm 282 and thus mechanical damage to the actuator arm 282 and the head-gimble assembly 284. The elastomer may be in a preferred embodiment, attached to the integral element 280 by a liquid or paste adhesive or pressure sensitive adhesive tape. Alternatively, the elastomer can be mechanically interlocked to the integral element 280 as the integral element 280 is itself being molded. In a preferred embodiment, the elastomer is a thermal plastic elastomer and it can be molded into a liquid crystal polymer plastic which comprises the integral element 280.

The integral element 280 further includes the function of providing for an electro-static discharge drain for the cartridge and drive to protect both the magnetic heads 286 and the disk 256 from damage. This function is performed by the specific material chosen for the integral element 280. Should the material be of conductive, metallic material, this function is automatically performed. However, in a preferred embodiment, the integral element 280 will be comprised of the above liquid crystal polymer plastic to which will be added a substantial volume, by percent, of a conductive fiber. The amount of conductive fiber, in a preferred embodiment, shall reduce the natural non-conductivity of the polymer to a surface conductivity of less than 5000 ohms. In such an arrangement, the integral element 280 will be able to discharge electrostatic charge built up on the heads and the disk.

It is noted that prior disk drives include similar types of ramp functions and recirculating air filter functions. However, none provide the integral element 280 which affords a compact design allowing the inventive disk drive 50 and removable cartridge 52 to fit within the form factor above specified. Additionally, the present design provides for a lower manufacturing costs.

Cartridge Receiver Mechanism

The present disk drive 50 includes a cartridge receiver 60 which can accurately position the cartridge 52 with respect to the disk drive 50.

It is to be understood that in prior art disk drives, which have removable oartridges, that the cartridge receiver is generally guided along its edges and lowers a cartridge to a rigidly mounted spindle motor. This configuration, while working well, requires large clearances between the inside of the cartridge receiver and the cartridge to prevent wedging due to a drawer effect (unfavorable length-to-width ratio). The present invention does not require the movement of the cartridge receiver (as in the present design, the spindle motor telescopes into contact with the cartridge) and thus clearances can be tighter with the overall form factor of the drive being smaller and preferably, as specified above. The design of the disk drive 50 has a favorable length-to-width ratio and is not susceptible to wedging due to the drawer effect.

Further, due to the small size of the form factor for this removable cartridge disk drive 50, the clearance allowed between the hub 104 of the cartridge 52 and the inside of the cartridge 52 are very small. Thus, very accurate positioning of the cartridge in the drive and the disk in the cartridge is required in order to prevent the rubbing of the disk which is mounted on the hub against the inside of the cartridge during operation. The present embodiment provides for accurate positioning as well as smooth insertion and ejection of the cartridge relative to the drive with low friction forces and without the danger of wedging.

These advantages are carried out in the present embodiment which provides for a guide rail 88 used in conjunction with a guide groove 332, and a fixed stop 86 (FIG. 5) along with a recess 84 in the cartridge, as well as a spring 62 mounted in the disk drive door 56. In addition guide strips 336, 338, 340 and 342 are provide for ensuring accurate cartridge positioning. In the present design, the manufacturing tolerances are advantageously smaller across the small width of the guide rail 88 and the guide groove 332 than over the total width of the cartridge and the inside of the cartridge receiver.

Figure 28:
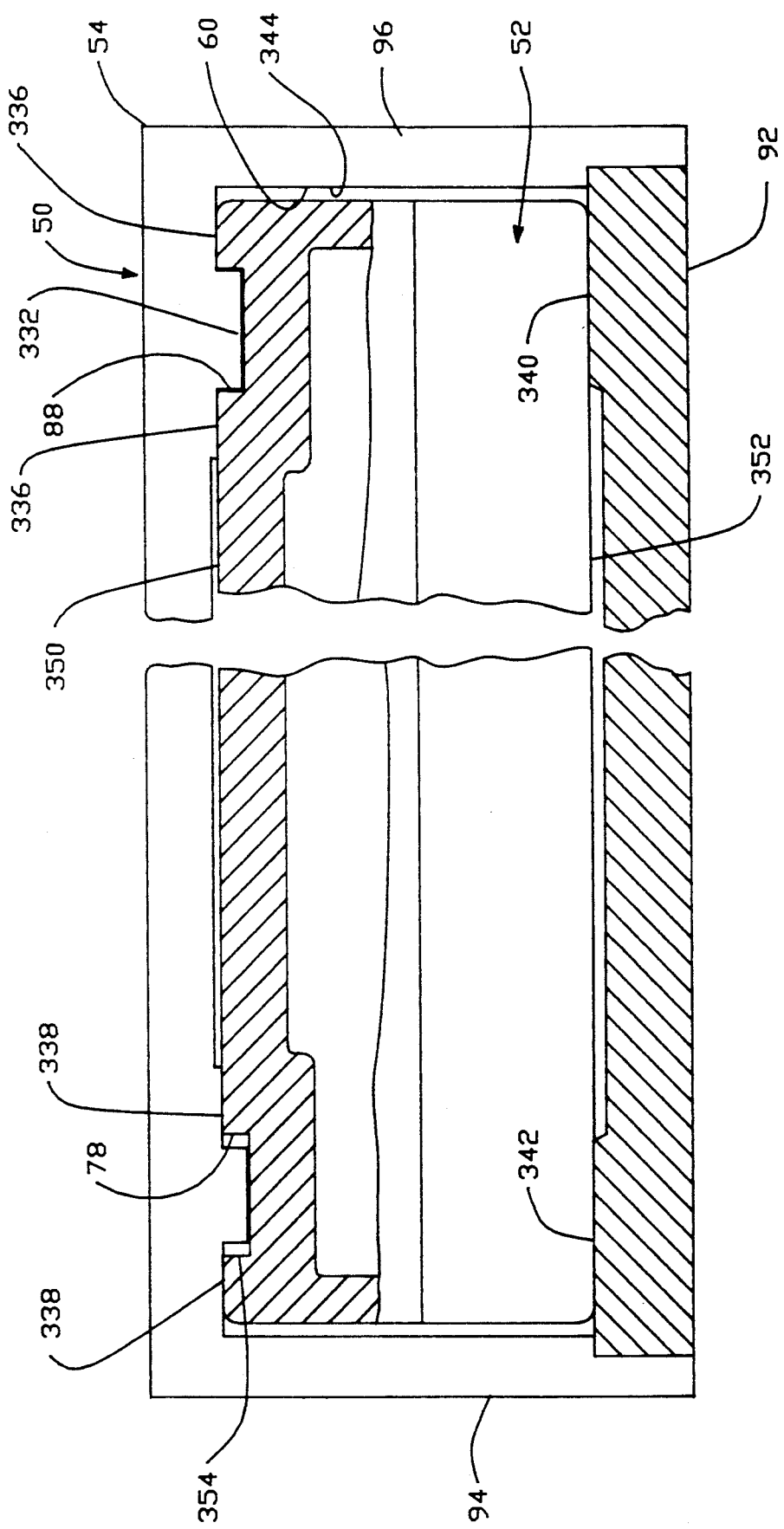
FIG. 28 depicts a cross-sectioned view of an embodiment of the cartridge receiver of the disk drive of the invention with an embodiment of the cartridge of the invention inserted therein.
Figure 29:
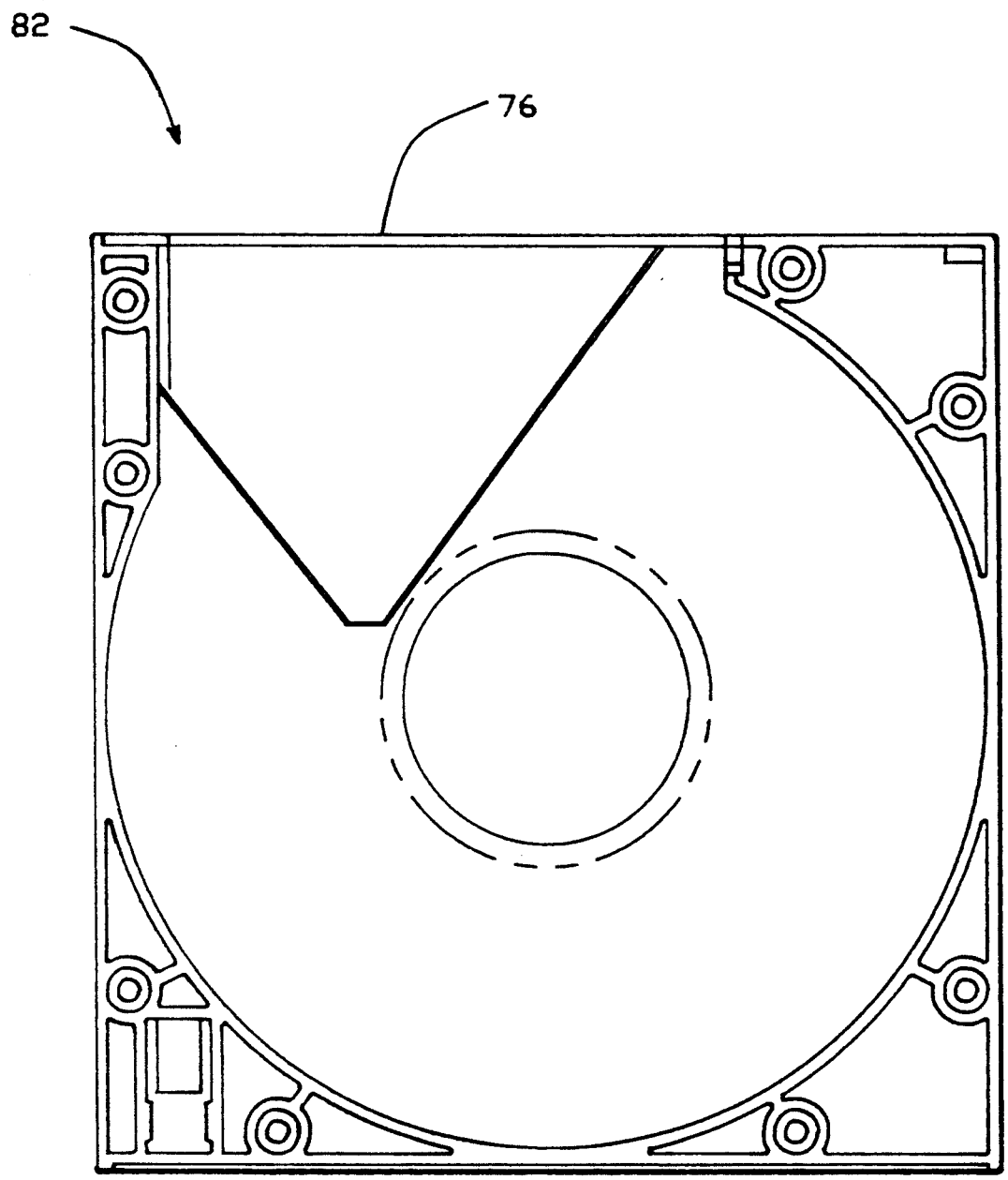
FIG. 29 depicts a plan view of the internal surface of a lower half of the cartridge housing of FIGS. 3 and 4 of the invention.
Figure 30:
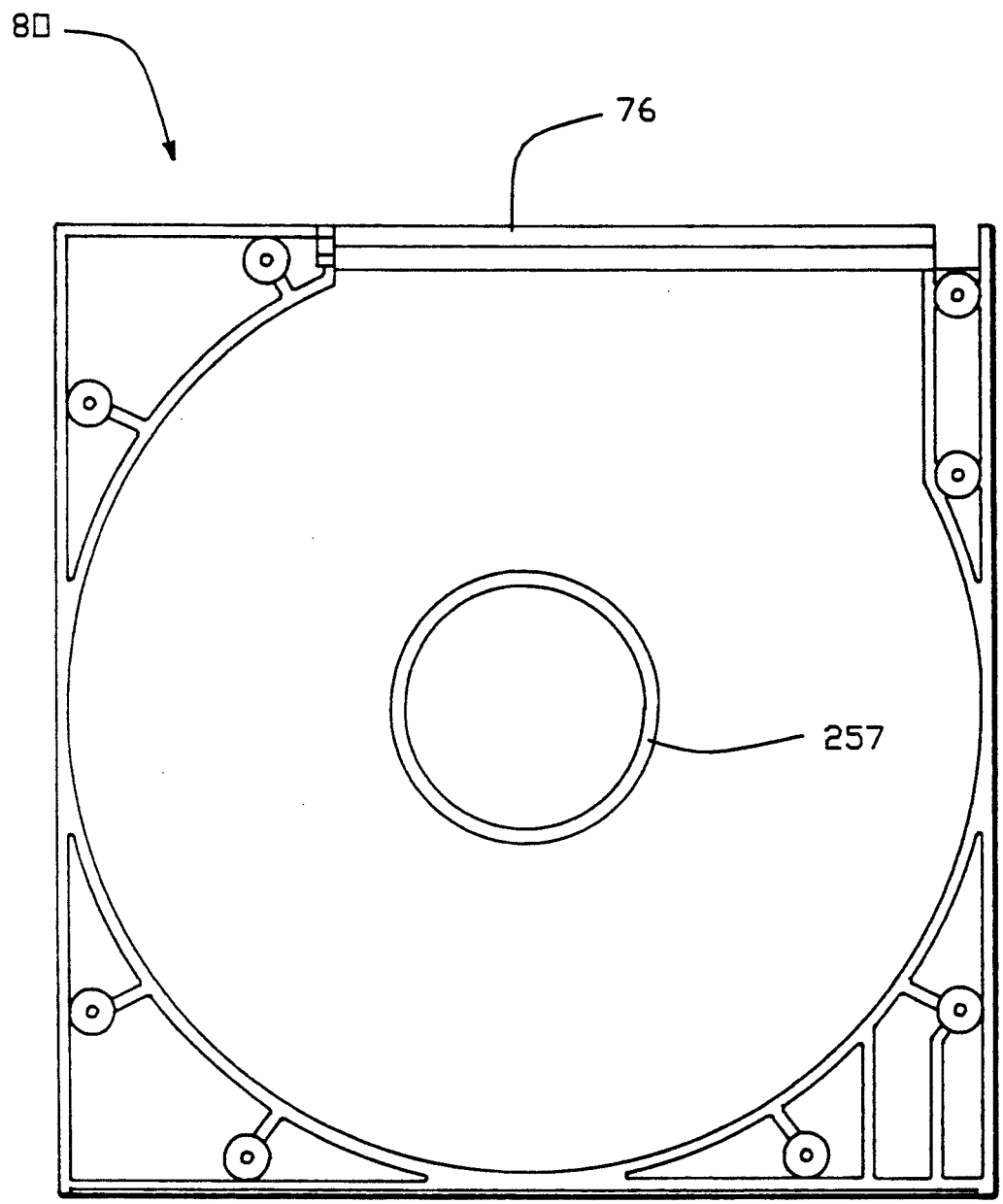
FIG. 30 depicts a plan view of the internal surface of the upper half of the cartridge housing of FIGS. 3 and 4 of the invention.

The above embodiment of the present invention is preferably implemented as follows. The guide rail 88 extends from the cartridge receiver 60 into the cavity 344 which receives the removable cartridge 52. The guide rail 88 is accurately machined and is received in a precisely molded guide groove 332 which is provided in the upper half 80 of the cartridge housing 70 (FIG. 28). The guide rail 88 and the guide groove 332 are disposed in a direction which is parallel to the direction of insertion of the cartridge into the drive. Using the convention shown in FIG. 5, the guide rail and guide groove are disposed in the "Y" direction. Thus, when the cartridge is inserted, the guide rail 88 and guide groove 332 accurately position the cartridge relative to the "X" direction or the direction which is perpendicular to or across the direction of insertion of the cartridge into the drive.

Although the guide rail 88 as shown has been provided in the cartridge receiver and the guide groove 332 as shown has been provided in the cartridge that equivalently the guide rail could be extending from cartridge with the guide groove provided in the cartridge receiver of the drive. This alternative embodiment would result in the same function of accurate positioning of the cartridge in the cartridge receiver in a direction which is perpendicular to or across the direction of insertion of the cartridge into the drive.

Additionally, for accurately positioning the cartridge in the drive in the "Z" direction or the direction of the height of the cartridge, between its upper and lower substantially parallel surfaces 350 and 352, guide strips 336, 338, 340 and 342 are provided extending into the cavity 344 from the cartridge receiver 60. As can be seen in FIG. 28, guide strip 336 is comprised of two longitudinal elements, one on each side of the guide rail 88. These guide strips 336 are provided along the direction of insertion of the cartridge into the drive and substantially parallel to the guide rail 88. Additionally, guide strip 338 is comprised of two longitudinal elements which again are extending from the cartridge receiver into the cavity and are substantially parallel to the direction of insertion of the cartridge into the cartridge receiver.

The guide strips 340 and 342 extend from the bottom of the cartridge receiver 60 and again are longitudinal in the direction of insertion of the cartridge into the drive. At the mouth of the cartridge receiver the guide rails and guide strips are slightly beveled to ease the insertion of the cartridge into the drive.

At the end of the insertion stroke of the cartridge into the cartridge receiver that is a rigid stop 86 (FIG. 5). The rigid stop 86 is upstanding from the base plate 92. This rigid stop 86 mates with a groove or recess 84 defined in the cartridge. As the door 56 of the disk drive is closed, spring 62 mounted thereon is urged against the cartridge to in turn urge the cartridge firmly against the stop 86 in order to accurately position the cartridge in the "Y" direction or in the direction of insertion of the cartridge into the drive.

Finally, as seen in FIG. 28 located between the elements of guide strip 338, is a door opening rail 354 which is loosely received in a groove 78 of the cartridge. As is more fully described elsewhere, as the cartridge is inserted into the drive, the door opening rail 354 trips or causes the cam or tab 74 of the cartridge door 68 to rotate clockwise as the door opening rail 354 is received into the door opening groove 78 in order to open the cartridge door 68 preparatory to the heads being actuated into the cartridge through the cartridge door and unloaded onto the disk.

As can be seen in FIG. 28, the clearances on all sides of the cartridge relative to all sides of the cartridge receiver are relatively small. Also due to the fact that the door of cartridge when opened is positioned at the rearward end of the cartridge receiver, distally located from the door 56 of the disk drive 50, that contamination from environmental sources is greatly reduced. This is due to the fact that the paths from the door 56 of the disk drive 50 to the door 68 of the cartridge 52 are quite long and narrow thereby providing a significant barrier to the infiltration of environmental contaminates into the inside of the cartridge.

Removable Cartridge With Imbedded Interlocking Mechanism

Figure 22:
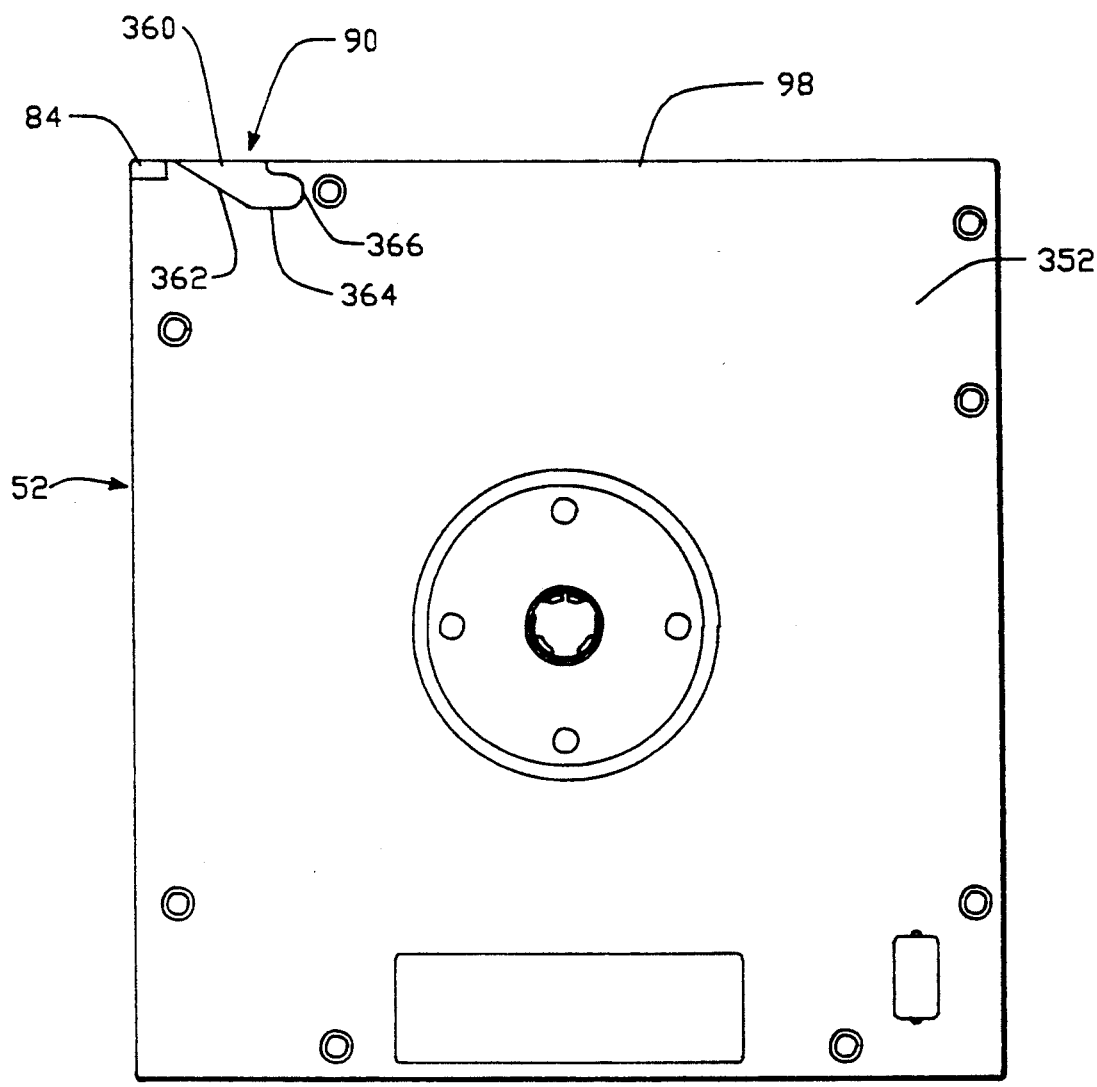
FIG. 22 depicts a bottom view of the cartridge of the invention of FIG. 21.
Figure 23:
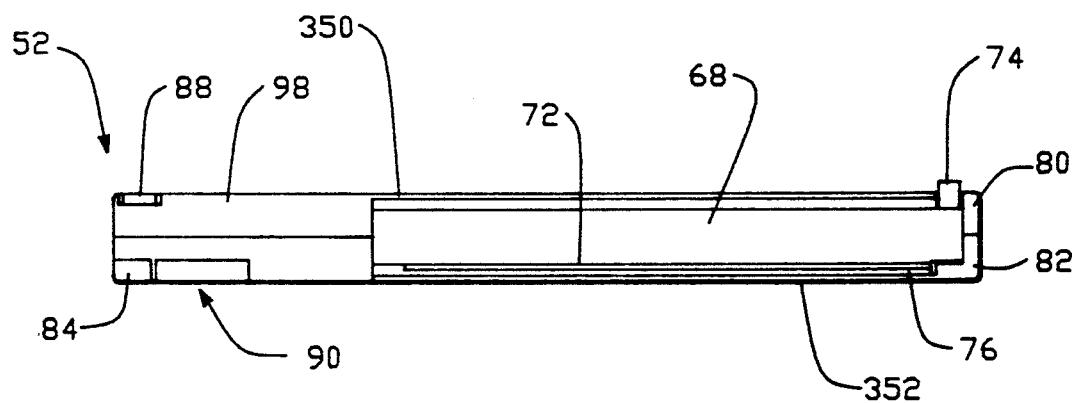
FIG. 23 depicts a door end or front view of the cartridge of the invention of FIG. 21 with the door in a closed position.

As can be seen in FIG. 22, in the lower half 82 of the cartridge housing 70 and more particularly disposed in the lower surface 352 is an interlocking recess 90. Interlocking recess 90 along with recess 84 are opened to the front face 98 of the cartridge 52 which front face 98 additionally mounts the cartridge door 68. It is in the interlocking recess 90 that the cartridge engaging ejector pin 108 is received in order to lockingly position the cartridge into the disk drive. As can be seen in FIG. 22, the interlocking recess 90 is essentially a groove which extends in a direction which is perpendicular to or across the direction of insertion of the cartridge into the drive. In particular, the interlocking recess 90 includes an opening 360 which communicates with the front face 98. Extending from the opening 360 is a ramp surface 362. Extending from the ramp surface 362 is a flat surface 364 which is also directed substantially perpendicular to or across the direction of insertion of the cartridge into the drive. The ramp surface ends in a semi-circular cavity or stop 366 which is positioned somewhat sidewardly from the opening 360 in a direction which is perpendicular to or across the direction of insertion of the cartridge into the drive. With the cartridge inserted into the drive, the ejection pin 108 comes to a final resting position in the stop 366 after having entered the opening 360 and travelled along the ramp surface 362. Thus, the ejector mechanism 106 is urged from the uncocked position of FIG. 6 to the cocked position of FIG. 7, with the pin 108 received in the semi-circular stop 336, the cartridge is locked into the drive and prevented from being withdrawn. It is additionally noted that in this embodiment depicted, the interlocking recess 90 is located below the guide groove 88 which is located on and incorporated into the upper surface 350 of the upper half 80 of the cartridge. The advantages of having these two features closely spaced are found in improved dimensional accuracy and a lesser effect from thermal expansion. Other relationships between these two features are possible and come within the spirit of the invention.

Removable Cartridge With Hub Chuck

In order to satisfy the present form factor requirement, the hub chuck 238 of the present embodiment is preferably of a one-piece construction, having two integrally formed springs and two datum surfaces. This arrangement allows for a very thin cartridge configuration and a drive with very low height and small spindle motor shaft. Further, the chuck 238 can be inexpensively made.

In a preferred embodiment, the hub chuck 238 is formed from a single piece of material which can include, for example, phosphorous bronze. The chuck is circular and has stamped therein a central bore 378 and a lip 380 upstanding therefrom. Formed on the central bore and lip are datum 382 and datum 384. Datum 382 and 384 are provided with lead-in chamfers which assists in the seating of the hub chuck 238 onto the spindle shaft of the spindle motor. In a preferred embodiment, these datum can be chromed or otherwise plated in order to increase the hardness of the surface.

Additionally formed in the hub chuck 238 are first and second beam springs 386, 388. These beam springs are elongate and include adjacently deposed free ends 390, 392 respectively, which form part of the circular bore 378. Free ends 390, 392 have bosses 392, 393 with lead-in chamfers.

Figure 31A:
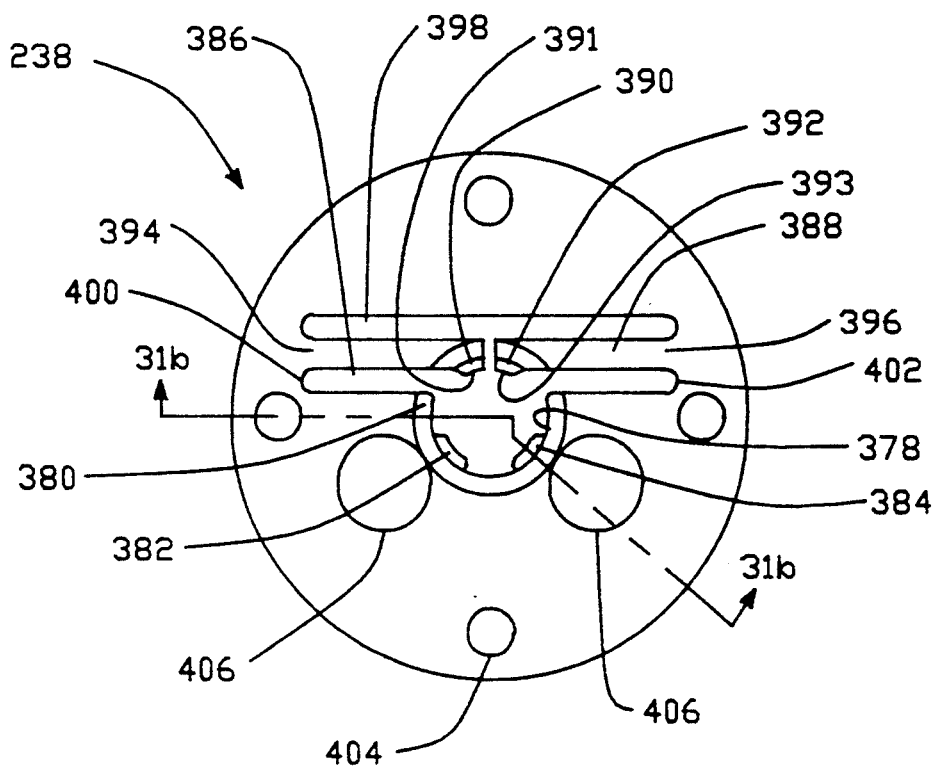
FIG. 31a depicts a plan view of an embodiment of the chuck for the hub of the cartridge of the invention.
Figure 31B:
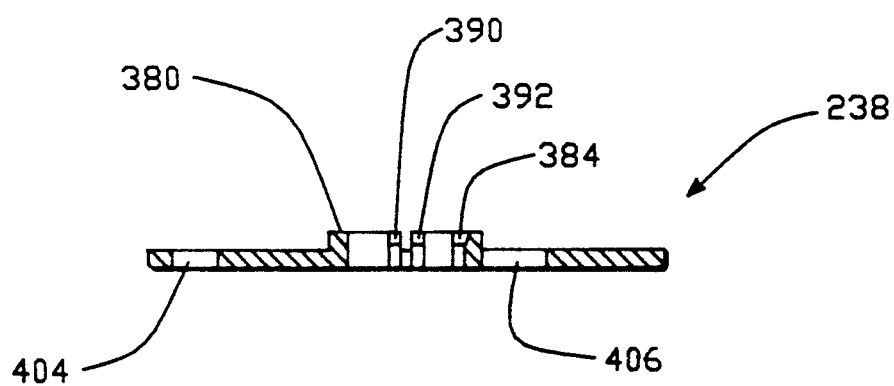
FIG. 31b depicts a cross-sectioned view of FIG. 31a taken at line 31b—31b.

The first and second beam springs 386, 388 additionally have fixed ends 394, 396 which are secured to the remainder of the chuck 238. As can be seen in FIG. 31a, slots 398, 400 and 402 have been machined or stamped or otherwise formed into the chuck 238 in order to define the first and second beam springs 386, 388.

FIG. 31a further depicts mounting holes such as mounting holes 404 which are used to mount the chuck 238 to the hub. The chuck 238 is retained between the hub 104 and magnetic coupling armature 244 (FIG. 10) with, in a preferred embodiment, rivets or an adhesive bonding. Further balancing holes 406 are provided in the chuck 238 in order to balance the material removed to form the first and second beam springs 386, 388. In the embodiment shown in FIG. 31a, it is evident that the first and second datum 382, 384 and the free ends 390, 392 of the first and second beam springs 386, 388 form a triangle and thus essentially three points for holding the chuck onto the spindle of the spindle motor. The lead-in chamfers assist in guiding the chuck 238 onto the spindle of the spindle motor as the motor is lifted into engagement with the cartridge. As previously indicated, as the spindle of the spindle motor engages the chuck 238, the hub and particularly ring 255 thereof, is first pushed up against the inside top of the cartridge against a ring 257 which was downwardly dependent from the inside surface of the upper half 80 of the cartridge housing. When the hub comes in contact with the ring 257 this prevents the hub and disk from becoming cocked or skewed in the cartridge and thus prevents the disk from touching the inside of the housing, potentially damaging the disk. Substantially simultaneously the spindle shaft penetrates the chuck, the hub is pulled down on the spindle motor by the hub clamp magnet and the spindle motor stops against the underside of the base plate.

Cartridge Door Spring Retention and Stiffening Mechanism

As previously indicated, it is important that the cartridge door 68 be provided in the appropriate open position and preferably moved to an opened position which is 90 degrees from the closed position in order that the door does not interfere with the positioning of the actuator arm and the heads past the door 68 through the port 76 (FIG. 25) formed in the front of the cartridge 52 preparatory to unloading the heads onto the disk. In order to accomplish this, the door must be made as thin as possible so that the effective opening of the port 76 can be as large as possible and the door must be made in a manner so that it will not bow in the open position again in order to maximize the effective opening of the port 76. Further, it is necessary that whatever mechanism is used to bias the door to a closed position not interfere with the effective opening of the port 76.

To accomplish these objectives, the present invention provides for the positioning of a torsion spring 412 in a groove 414 molded into the door. The groove is sufficiently large in order to allow the torsion spring 412 to be freely placed therein. The back of the door 68 includes a recess 416 which is designed to receive a stiffening plate 418 with a stiffening lip 417, which in a preferred embodiment is comprised of a metallic material with the door in a preferred embodiment comprised of a plastic material including polycarbonate. The stiffening plate 418 is adhered to the door with an appropriate bonding agent well known in the trade. Not only does the stiffening plate 418 retain the torsion spring 412 in the groove 414, but additionally it stiffens the door 68 so that it does not bow in the middle, interfering with the placement of the heads inside the cartridge relative to the disk.

Figure 24:
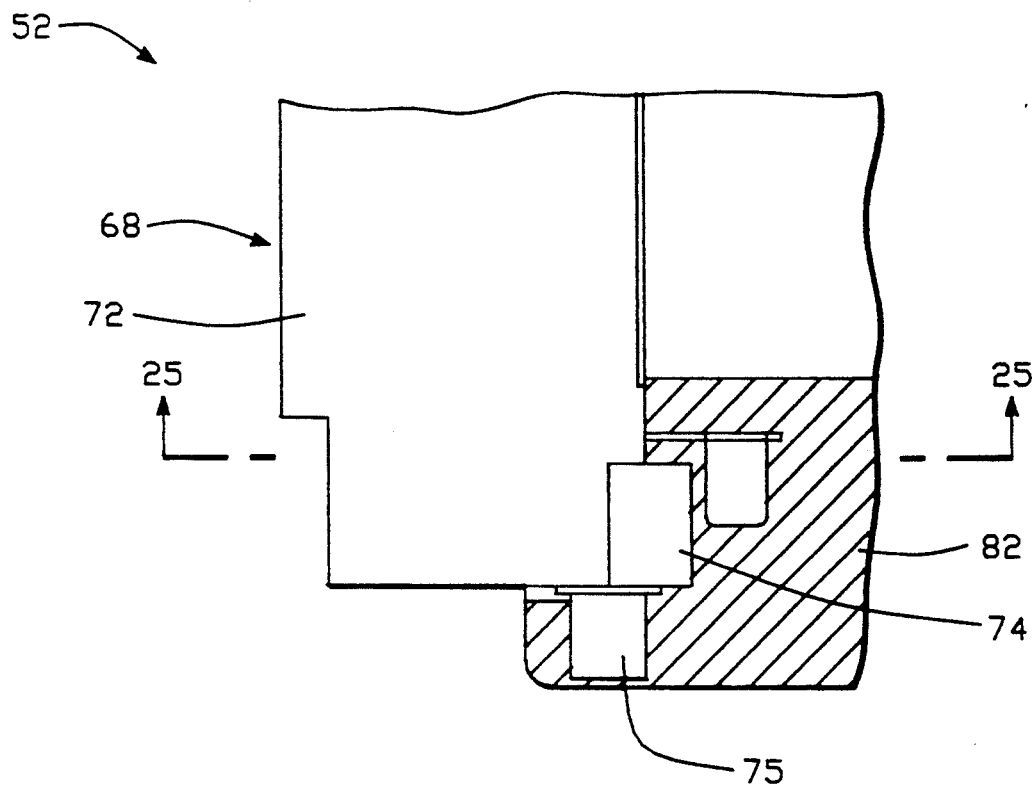
FIG. 24 depicts a partially broken-away and sectioned view of an embodiment of the cartridge door of the invention affixed to the housing of the cartridge of FIGS. 3 and 4 with the door in an open position.
Figure 25:
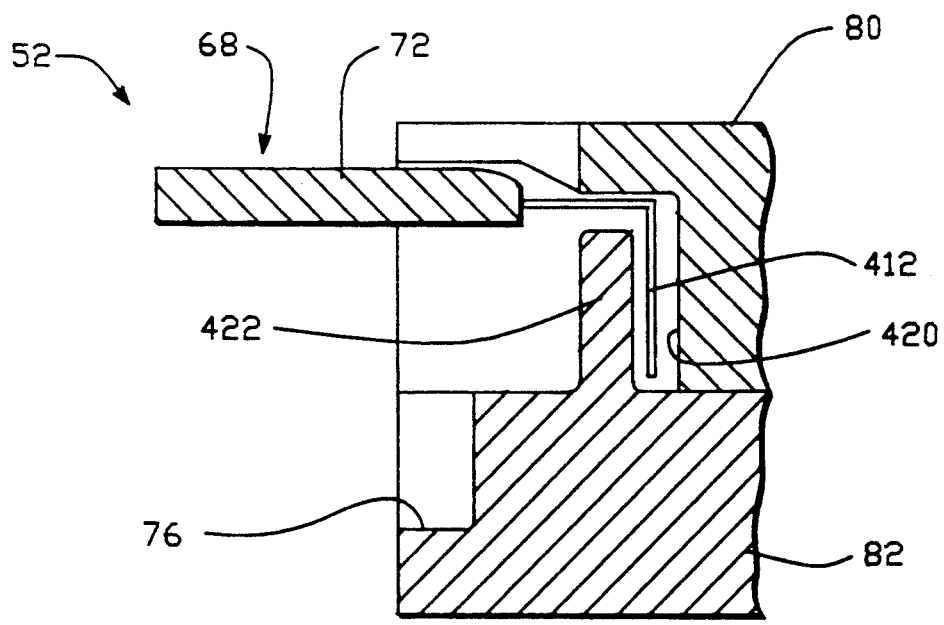
FIG. 25 depicts a cross-sectioned broken-away view through line 25—25 of FIG. 24.

As can be seen in the figures and in particular, FIGS. 24 through 27, the portion of the torsion spring 412 which is located in the door 68 is substantially L-shaped and can twist in the groove in order to store energy as the door is urged to an open position as shown in FIG. 25. The stored energy is used to close the door during the removal of a cartridge from the drive.

Figure 26:
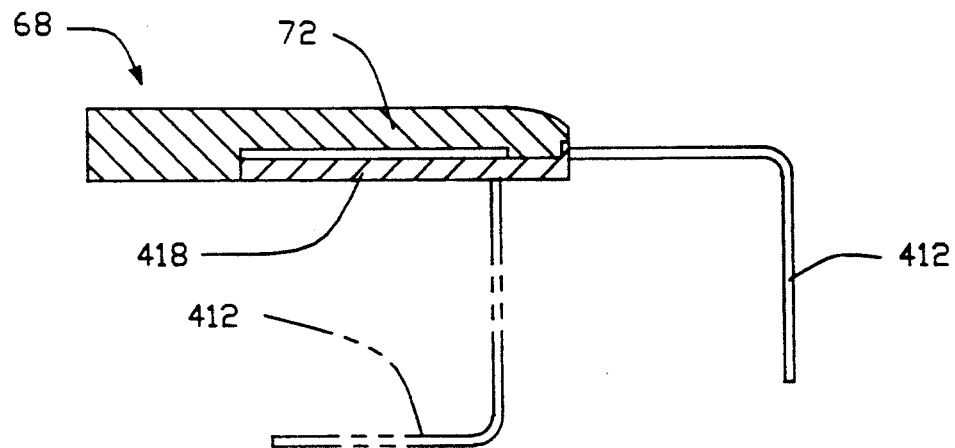
FIG. 26 depicts a cross-sectioned view of the cartridge door of FIG. 24 of the invention with the torsional spring shown in two positions.
Figure 27:
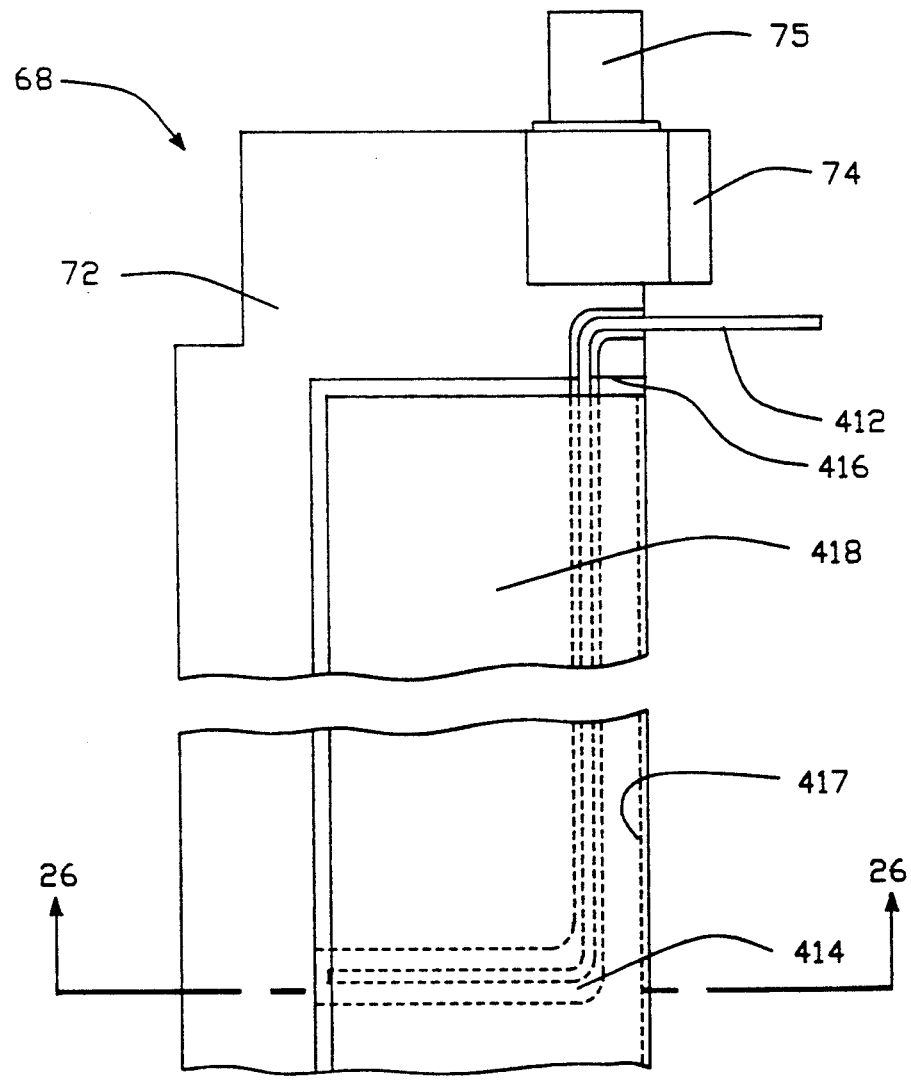
FIG. 27 depicts the bottom view of the cartridge door of FIG. 24 of the invention.

The other end of the torsion spring is additionally L-shaped and is retained in the cartridge housing itself. This retention is accomplished by a capture cavity 420 which is formed in the upper half 80 of the cartridge and a key 422 which is formed in the lower half 82 of the cartridge. When the upper half and the lower half are mated, the torsion spring is captured between the capture cavity 420 and the key 422 as shown in FIG. 25. FIG. 26 depicts the torsion spring 412 in a rest position (dotted lines) and in a position where it has been twisted (solid lines) in order to store energy as the door is opened. Further, FIGS. 24 and 27 show the main portion of the cartridge door 68 along with the cam or tab 74 and the pivot shaft 75.

Imbedded Servo System with Servo Address Mark with Robustness in the Presence of Media Defects The disk of the present drive is configured in a preferred embodiment into fifty-six wedges, each wedge having a servo field (with servo pattern 500) and with a data field on each side of the servo field. Of these wedges, one is an index wedge with fifty-five being non-index wedges. In order to provide for 40 megabytes of information on the disk, the disk among other things has approximately 1028 tracks or cylinders (average track pitch 1600 TPI) on each of the surfaces. Each track is divided into a first and a second band as shown in FIG. 33. FIG. 32 shows the write current waveform which is used in order to place head centering servo information in the servo fields of each wedge of each track. The write current provides for a direction of magnetization or transition as shown in FIG. 33.

The possible transitions in the servo patterns caused by the write current are 312.5 nanoseconds apart. This results in a 3.200 megahertz clock which is the servo clock. This frequency assumes a rotation of 3246.7532 revolutions per minute or a rotational period of 18.4800 milliseconds. This gives 59,136 servo clocks (SCLKS) per revolution. As each revolution is divided into fifty-six wedges, each wedge has 1056 servo clock periods with 932 SCLKS for the data fields and the rest for the servo fields.

Figure 34A:
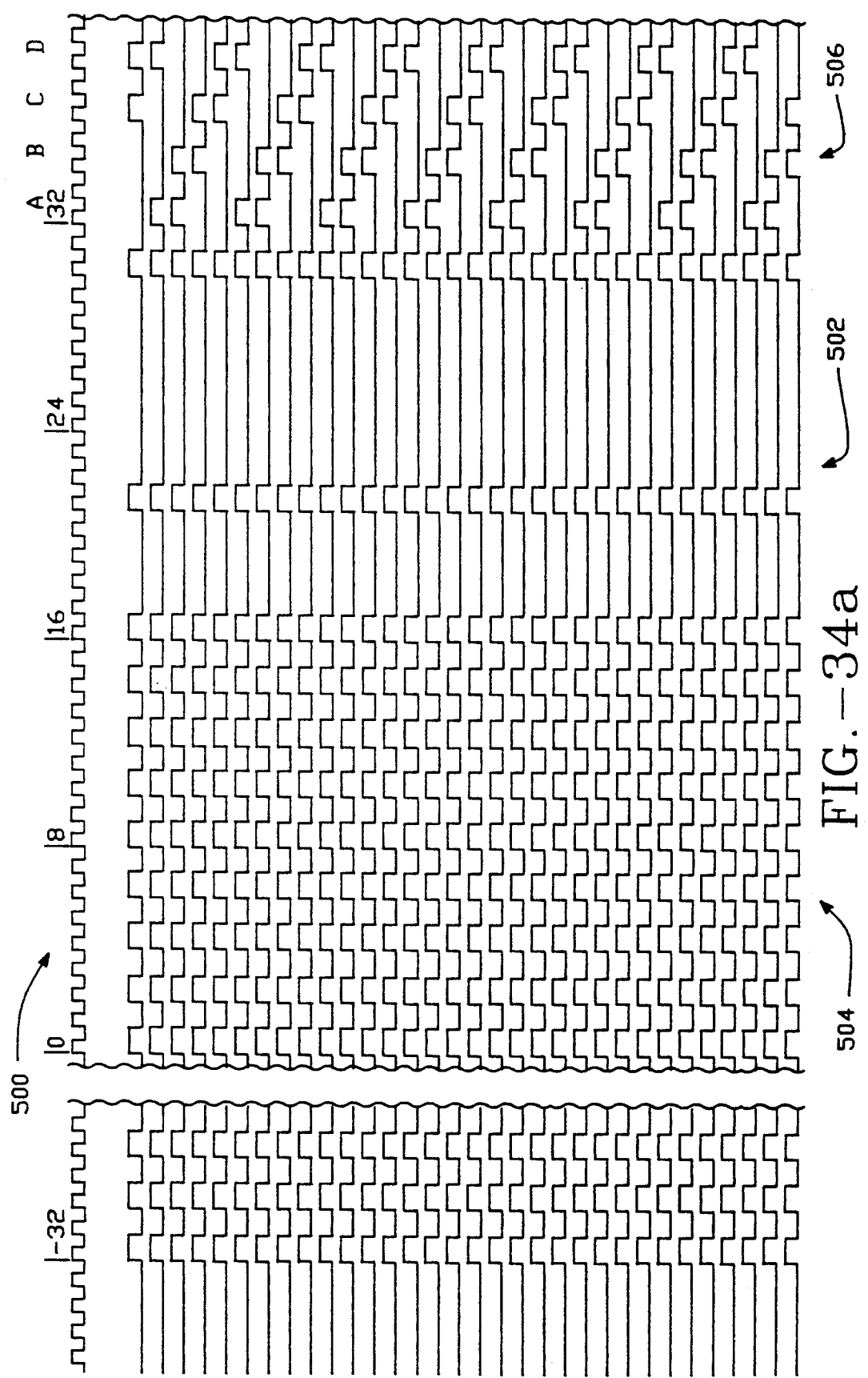
FIGS. 34a-34b are a depiction of the waveform for a servo pattern of an embodiment of the invention.

The head centering information ("analog") section which is depicted in FIG. 33 (506 in FIG. 34a) of the servo field accounts for head centering. The analog section has four types of bands. These include even.0, even.5, odd.0 and odd.5 bands. The bands for track zero and track one are depicted. Track zero, being an even track, has bands 0.0 and 0.5 and track one being an odd track, has bands 1.0 and 1.5 (FIG. 33). The head centering information 506 is thirty-two SCLKS periods long with a pattern of eight SCLKS long which repeats four times during the analog section. There are two periods of "A" transitions followed by two periods of "C" transitions which are followed by two periods of "B" transitions followed by two periods of "D" transitions. Through appropriately circuitry known in the art, the "A" and "B" transitions which straddle track zero are read, amplified and compared in order to determine where the head or transducer is relative to track zero and to adjust the position of the head relative to the track zero. With respect to track one, the "A" and "B" transitions are read and compared in order to determine where the head is with respect to track one and to reposition the head with respect to track one. The same procedure is used in order to center and adjust the head relative to any track on the disk.

| Type of Band: | | | | |
|---|---|---|---|---|
| EVEN.0 | A | C | | |
| EVEN.5 | | C | B | |
| ODD.0 | | | B | D |
| ODD.5 | A | | | D |

Further it is noted that a zoned recording scheme is used with lower density recording on the outer tracks and higher density on the inner tracks. The servo fields from are radially aligned track-to-track due to the fact that the placement of the servo fields can be adjusted as each servo field is located between first and second data fields associated with and located on each side of each of the servo fields.

In the present removable cartridge disk drive and also in fixed disk drive, the servo fields share the same disk surfaces as user data fields. Servo patterns 500 are regularly spaced around the disk with space for user data in between. These servo patterns 500 include a servo address mark (SAM) 502. This is a pattern that cannot occur in the user data fields or in the remainder of the servo pattern. Detection circuitry in the drive recognizes the SAM 502 and synchronizes to it so gates may be opened at appropriate time intervals in order to sample head centering information and track number information and thereby derive head position information from the remaining part of the servo pattern.

Figure 34B:
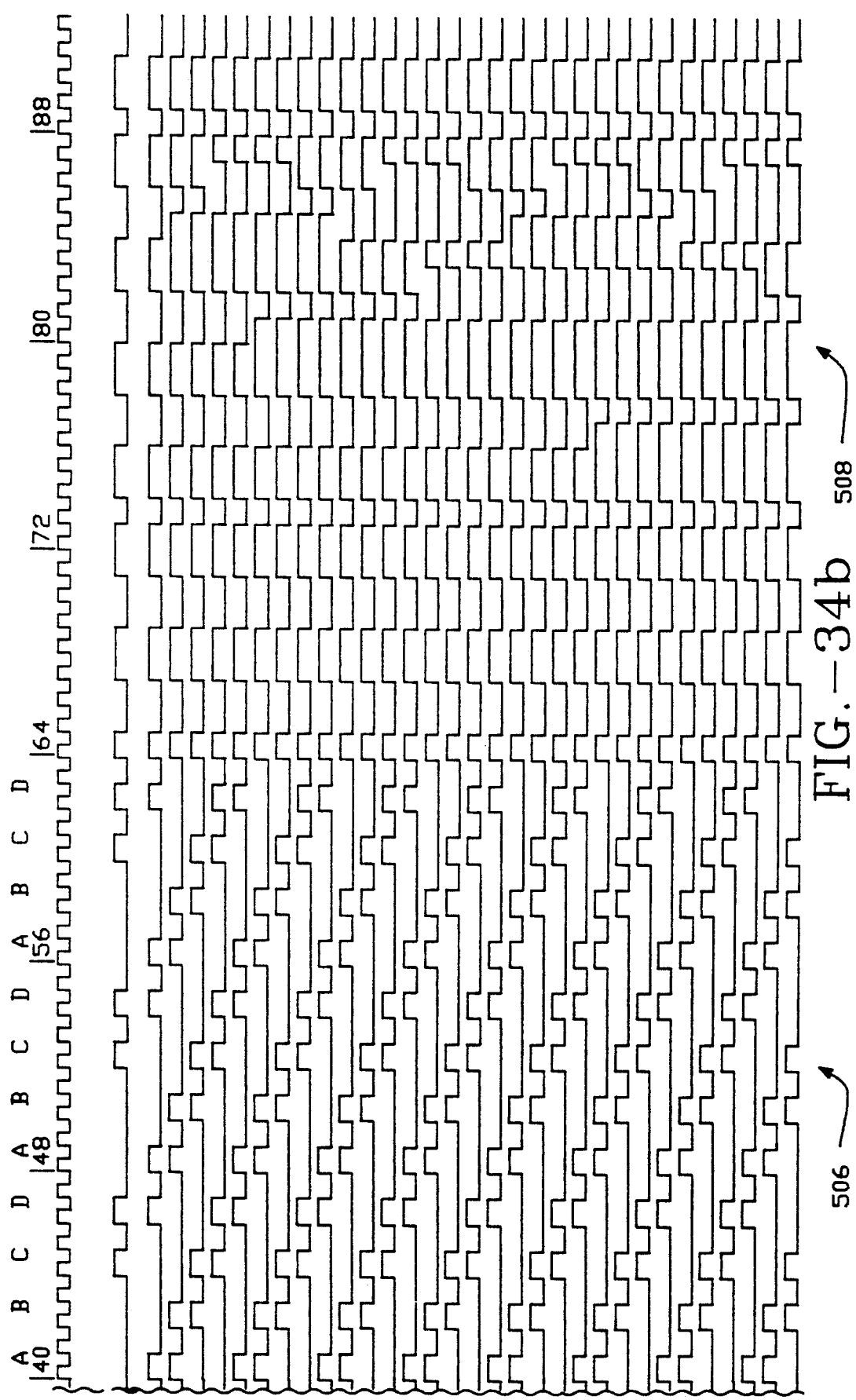

As can be seen in FIG. 34, the servo pattern 500 includes the automatic gain control (AGC) pattern 504, followed by the SAM 502 which is followed by the head centering information 506 and the track numbering information 508. The AGC 504 has a transition at each interval.

The track number information field 508 is encoded in all 11-bit gray code. Two SCLK periods are used for each bit of gray code. A transition is in the first period if the gray bit is a 1 and the transition is the second period if the gray bit is a 0. The most significant bit (G10) is first and the least significant bit (G0) is last in time. The binary track number determines the gray code bits by the following rule. Gn is the exclusive "or" of Bn with Bn+1 where Gn is the nth gray bit code and Bn is the nth bit of the binary track number and Bn+1 is the next more significant bit of the binary track number. B11 is assumed to be 0.

Most if not all embedded servo disk drives have servo address marks. These SAMs use a gap which is longer than any that can occur in normal user data fields. In many drives as in the present device, after a SAM is detected, the drive uses a timer (counter) to wait until it is almost time for the next SAM before the drive starts looking for the next SAM.

The present invention uses a novel SAM in order to provide for robustness in the presences of holes in the magnetic recording material (media defects). These holes can look like SAMs. Thus, an object of this invention is to make a SAM 502 that is distinguishable from media defects and detectable in the presence of media defects.

This invention uses information about polarity of the detected transitions 510 and two main gaps 514, 516 of different lengths that are each generally longer than media defects. Every transition 510 is the opposite polarity of the one before it. In the servo pattern 500 magnetic transitions are only allowed at regularly spaced intervals 512 or multiplies of such intervals 512. But not every possible interval has a transition. In a preferred embodiment, in the area before and after the SAM 502, that is in the AGC area 504 and the head centering information area 506, two transitions that are an even number of intervals away from each other are of the same polarity. Further, any transitions that are located an odd number of intervals apart are of the opposite polarity. The place where this predefined "rule" is violated is in the SAM 502. It is also noted that the "rule" is violated in the track number information area 518 (grey code area) but that this is of no concern as it is several microseconds from the SAM and is located after the SAM is detected and synchronization to the SAM has been accomplished.

If a media defect wipes out transitions in the region before or after the SAM 502, the resulting gap in transitions will not look like a gap in the SAM 502 because of the polarity of the pulses read around the defect gap will not match the polarity of pulses read around a gap in the SAM in accordance with the above established "rule".

The SAM 502 of a preferred embodiment of the invention, is fourteen intervals wide and has two major gaps 514, 516. Gap 514 is four intervals long and gap 516 is eight intervals long. In addition, there is a gap 518, one interval in length, between gaps 514 and 516. The transitions around each main gap 514,516 are an even number of locations apart from each other. This is to make the magnetic transitions around the main gap 514, 516 violate the transition polarity "rule" established above. Also two main gaps 514, 516 have different lengths so said gaps 514, 516 do not look alike. This further adds to the robustness and reduces the possibility of falsely detecting a SAM.

Figure 35A:
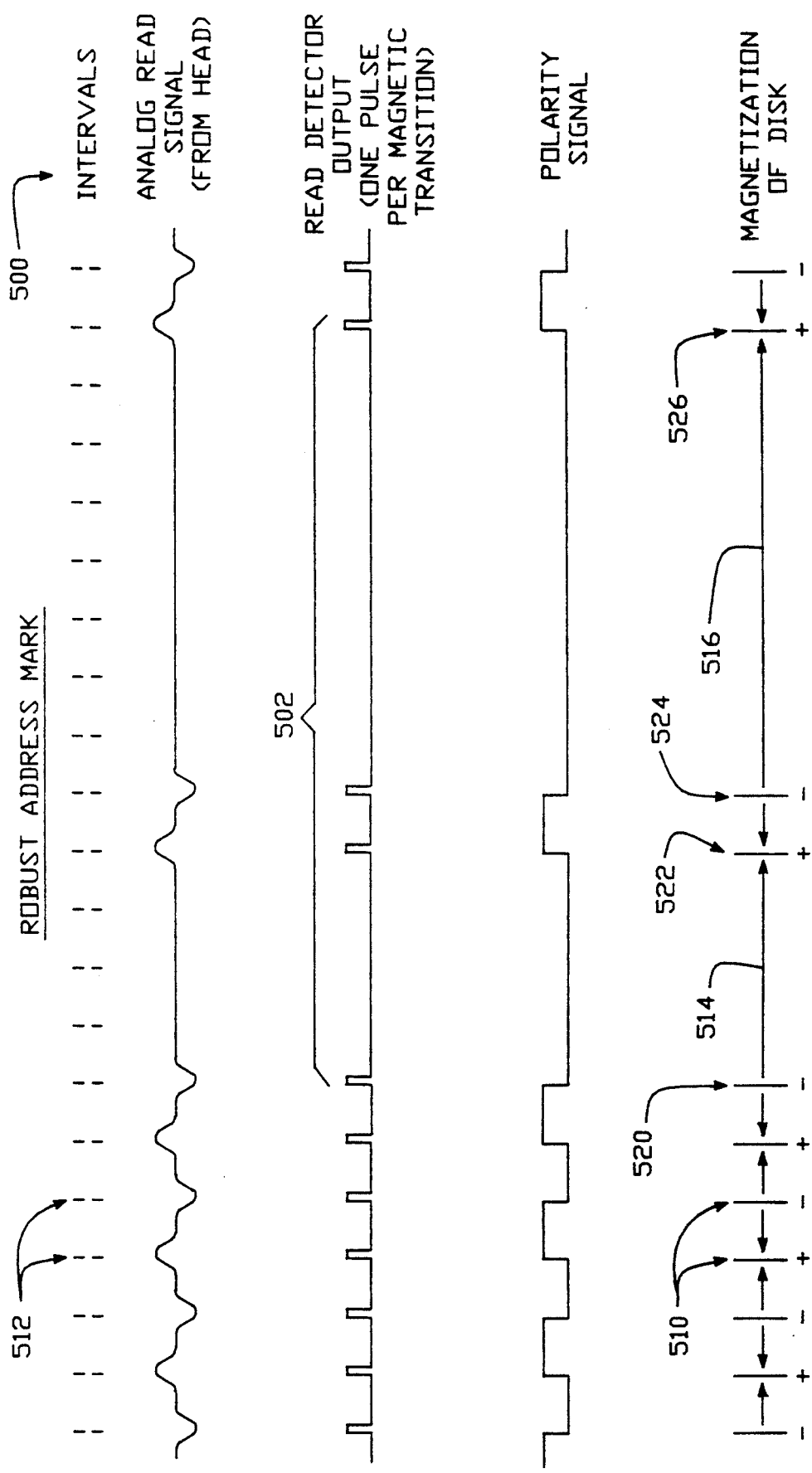
FIG. 35a is an enlargement of the waveforms for the servo address mark (SAM) of the servo pattern.

In viewing FIG. 35a, it can be seen that in a preferred embodiment, in the AGC 504 that the transitions alternate between positive and negative polarity. In the AGC 504, thus the rule that transitions of the same polarity are spaced even intervals apart (2, 4, 6, etc.) and that transitions of different polarity are spaced odd intervals apart (1, 3, 5, etc.) is maintained. Further, in the area of the head centering information 506 as can be seen partially in FIG. 35 and also in FIG. 34, the "rule" as defined for the AGC area 504 is also maintained. In the area of the SAM 502, this rule is not maintained. As indicated above, the SAM is fourteen intervals long. A SAM has four transitions. The first transition is identified by the number 520 and is of negative polarity in the example of FIG. 35a. It is also to be understood that transition 520 could be of position polarity with the other transitions accordingly change to the opposite of what they are presently denoted in FIG. 35.

The second transition 522 in the SAM 502 is of positive polarity and is located, as indicated above, four intervals from the first transition 520. Thus, as transitions 520 and 522 are of differing polarity, and as they are spaced an even number of intervals apart, they violate the "rule" established for the AGC and the head centering information. Transition 522, as can be seen in FIG. 35a, is located between the fourth and the fifth interval of the SAM 502.

The third transition 524 is of negative polarity and is located between the fifth and the sixth interval of the SAM as is shown in FIG. 35a. The fourth transition 526 of the SAM is located eight intervals from the third transition 524. The fourth transition 526 is of positive polarity, thus violating the "rule" of the AGC that an odd number of intervals is to be located between transitions (transitions 524, 526) of different polarities.

A transition detector, such as by way of example, a pulse read detector with a hystersis comparator, can then decide if it has seen (1) a SAM if it sees the first main gap 514 or the second main gap 516 or (2) the long gap that results from a media defect which wipes out transitions.

As can be seen in FIG. 35b, the SAM detection routine is depicted. This SAM detection routine includes a first step, presented by block 530, of providing a counter for counting from the last identified SAM and beginning to look for the next SAM just before the counter indicates that the appropriate number of intervals or the appropriate amount of time has passed and thus that the next SAM should be appearing. Once a counter has indicated that the next SAM should be appearing, a detector (block 532), for example the detector of the variety described hereinabove, begins to detect the presence of and polarity of the transitions. Simultaneously, the intervals between the transitions are counted (block 534) and an association is made and stored between the count of the intervals and the polarity of the transitions (block 536). This association is compared with the known pattern for the AGC, the SAM and the head centering information (block 538). It is to be understood that such a detection scheme can be implemented with detection hardware, counters and the like which are well known in the art.

Embedded Servo System With Repetitive Runout Correction

On disk drives, such as drive 50, the recording and playback heads or transducers must follow nominally circular tracks with great precision. Imbalance and errors in disk centering and disk tilt, due to the reception of the hub chuck of the cartridge 52 onto the spindle motor, cause these tracks to deviate from being perfectly circular. Imperfect reception of the disk in the plane of the magnetic clamp of the spindle motor, so that the disk is not exactly centered on the spindle of the spindle motor, causes error known as "once-around" error or runout. With this error, the disk can be seen to wobble, in the plane of the magnetic clamp, in and out relative to the spindle motor. This once-around error repeats once each time the disk revolves one time. Imperfect reception of the disk so that it is not entirely received in the plane of the magnetic clamp, but is tilted, causes error known as "twice-around" error runout. With this error, the disk can be seen to wobble up and down relative to the plane of the magnetic clamp. This twice-around error repeats twice over one revolutions of the disk. The feedback servo loops reduces the repetitive components, but the degree to which it can reduce such components is limited by structural resonances, sampling rates, and other factors which place limits on servo bandwidth. This invention relates to a technique for correcting for the repeatable (once-around and twice-around) components of disk runout which is not subject to these limitations. This allows cartridge disk drives to reduce tracking errors to levels similar to fixed disk drives and therefore to match the track densities and servo performance of fixed disk drives. This novel aspect as well as the other novel aspects of drive 50 and cartridge 52 allow the disk to contain 40 megabytes of information and greater amounts (with 1600 TPI and greater) in the above specified 2½ inch form factors.

Embedded servo cartridge disk drives have a servo system which corrects for both repeatable and non-repeatable tracking errors. Non-repeatable tracking errors (or runout) are caused by such factors as non-repeatable bearing runout, random external force disturbances on the actuator, and random external forces applied to the disk drive. Repeatable runout occurs as a result of repeatable bearing runout, imbalance of the rotating hub assembly and disk, and disk clamping errors. The latter is composed of both of the above centering and tilt components which give rise to repeatable tracking error components at once the rotation frequency (once-around error) and at twice the rotation frequency (twice-around error). Despite great efforts to minimize these errors mechanically, disk clamping errors are usually quite large in cartridge (removable media) disk drives. This error component is usually not present to any significant degree in fixed (non-removable media) disk drives.

Tracking errors which repeat cannot be adequately attenuated using classical feedback servo approaches in cartridge disk drives with higher track densities. Thus, the use of a classical servo approach can place a fundamental limit on drive performance by limiting the number of tracks which can be squeezed on each disk, while still allowing adequate margins for tracking error. Fixed disk drives do not have this problem as the media is clamped in place prior to writing servo information and is never removed or shifted on the spindle.

This invention takes advantage of the repeatable nature of these tracking errors to suppress these components on removable drive to levels where, after normal feedback servo correction, the servo tracking errors are as low as on fixed disk drives. The net result is reduced tracking error and the achievement of fixed drive performance on a removable cartridge disk drive.

This invention uses a microprocessor to analyze and produce a correction function for the repeatable components of the tracking error. This correction is done independently of the feedback servo loop and minimizes the tracking error which the servo loop must attenuate resulting in better overall tracking accuracy. Since this technique uses feedforward instead of feedback correction, it is not limited by factors which traditionally limit the performance of closed loop feedback servo systems such as structural resonances, sample rate limitations, and other dynamic stability constraints, and allows for performance levels similar to fixed disk drives.

At power on, when the cartridge is changed, and at times during normal operation (such as for example, when the disk drive temperature rises resulting in weaker magnetic fields in the voice coil actuator motor, and thus resulting in the requirement for greater actuating currents from the servo system 550), the repeatable runout of the disk is analyzed by a microprocessor using Fourier Transform techniques, and in a preferred embodiment, Discrete Fourier Transform (DFT) techniques. The error is decomposed into real and imaginary parts which represents both amplitude and phase information of once-around and twice-around repeatable tracking error components. These correspond to two frequency bins of a DFT, which in this embodiment occur at about 60 Hz (once-around errors) and 120 Hz (twice-around errors). Based on this, a correction function table or alternatively, a runout error correction signal table is generated and stored in RAM and is used to output correction forces to the actuator independent of the action of the closed-loop feedback servo system. In this way the repeatable components of runout are reduced to levels similar to a fixed disk drive even before the action of the closed-loop feedback servo system. The residual errors which the closed-loop servo system is left to act upon and reduce are now the same for a cartridge disk drive as for a similar fixed disk drive. This eliminates the servo tracking error disadvantage otherwise inherent in cartridge verses fixed disk drives and which can limit the relative overall capacity and performance of cartridge verses fixed disk drives.

Figure 36:
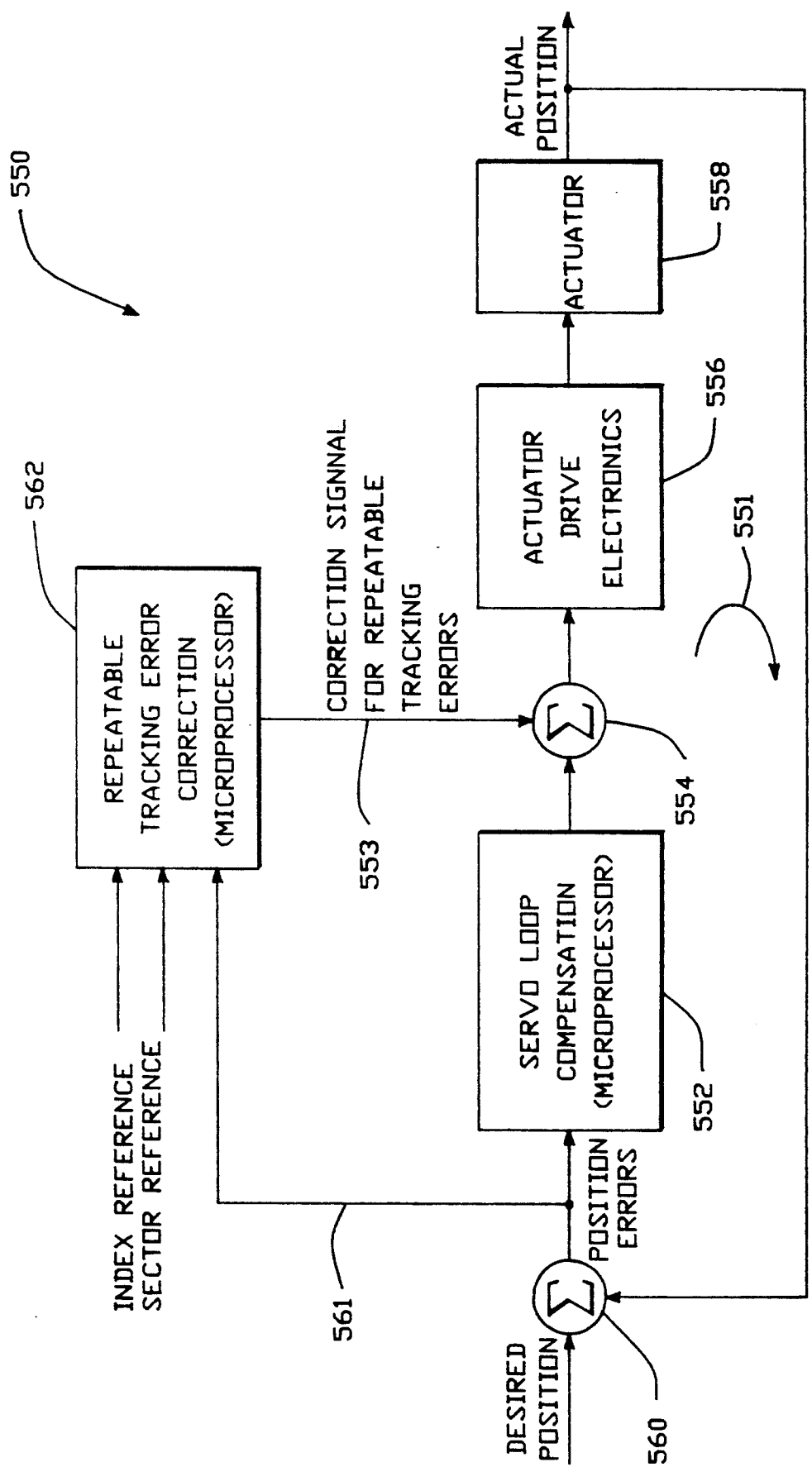
FIG. 36 is a schematic of an embodiment for servo loop compensation and for repetitive correction for the invention.

FIG. 36 shows an overall block diagram of the servo system 550. A microprocessor 552 is used to implement feedback servo loop compensation. (This could also be implemented by a microprocessor along with external compensation components, or entirely with external compensation as is known in the art).

The block 562 labeled "Repeatable Tracking Error Correction" is the new element introduced by this invention. A microprocessor (which in this case can be the same microprocessor used for feedback servo loop compensation) is used to analyze and perform a Fourier Transform, and in a preferred embodiment, a Discrete Fourier Transform (DFT) on the position error signal (PES) during initial startup and subsequent calibration periods. The index and servo sector reference signals provide the timing information needed to do the DFT and the inverse DFT. Once the repeatable error components have been analyzed and stored, an inverse DFT is performed at each servo sector and a feedforward correction signal is generated and output to the actuator driver in addition to, and independent from, the control signal generated by the normal feedback servo loop compensation.

More specifically, the schematic FIG. 36 depicts a servo system 550 of the invention which includes both a feedback loop 551 and a feedforward line 553. Feedback loop 551 includes an microprocessor 552 which provides for the feedback servo loop compensation calculation. Additionally, feedback loop 551 includes summing point 554, actuator driver 556 and the actuator (for example a voice coil motor) 558 which causes the head to seek to the actual desired position. The signal from the actuator 558 is then feed back to a summing point 560 which sums the actual position of the head as implemented by the actuator 558 and as determined by the head in reading the servo patterns on the disk and the desired position signal. The error signal is then provided to the microprocessor 552 which outputs an appropriate correction signal, generally as a current in order to drive the actuator driver 556.

The feedforward compensation for correcting for repeatable track error is performed by the microprocessor 562. As indicated above, in a preferred embodiment, the functions of the microprocessor 560 and of the microprocessor 552 are performed by the same microprocessor at different times.

With respect to the feedforward line 553, it is highly advantageous to initially drive the actuator as close as possible to the desired location before attempting to correct the location with feedback servo loop compensation. Accordingly, the feedforward compensation afforded by microprocessor 562 provides a feedforward correction signal to summing point 554, which in combination with the feedback correction signal from microprocessor 552, provides a current to the actuator driver 556 in order to drive and position the actuator 558. The microprocessor 562 creates and stores a runout table as described in FIGS. 37a through 37d in order to apply the runout correction. With inputs including an index reference and a sector reference, in addition to input from the summing point 560 over line 561, the repeatable tracking error correction microprocessor 562 in conjunction with building the runout table, can provide a current signal to summing point 554 in order to drive the actuator 558. It is noted that line 561 is used to make measurements in order to build the runout table, and that after the table is built, that microprocessor 562 can disable this line.

FIGS. 37a-37d are flow charts of the microprocessor firmware (Exhibit A is a copy of the firmware code listing) used to perform the DFT on the repeatable runout during calibration time, generate the correction function and to do the inverse DFT as part of the processing to generate a runout table for the error correction signal.

During the calibration phase the once-around and twice-around runouts are measured by doing the DFT at each servo sector or "wedge". In the present embodiment, there are 56 servo sectors (one index sector and 55 non-index sectors). These runout measurements are converted to frequency domain measurements by the DFT which resolves the measurement into real and imaginary parts containing both amplitude and phase information of the once-around and twice-around components of runout tracking error. These are stored in the microprocessor 562 as oncereal (once-around real components), onceim (once-around imaginary components), twicereal (twice-around real components) and twiceim (twice-around imaginary components).

Runout tables (stored in RAM for example) are then generated by multiplying the DFT by a complex number which takes into account the actuator characteristics and amplifier gains so as to correct for the measured repeatable runout error when applied to the actuator as an independent forcing function. These forcing functions are stored as L1RE, L1IM, L2RE, and L2IM which are DFT representations of the once-around and twice-around runout correction functions (FIG. 37d). Disk clamp centering, disk tilt, disk thickness, and actuator geometries make the repeatable runout errors dependant on the position in the actuator stroke and on which surface of the disk is being used. For this reason a different table is generated for each surface. A correction function is also applied which is dependant on the track number and which compensates for variations in geometries between the disk and the actuator over the stroke. This is the variable "target" in the flowchart where target is dependant on position in the stroke and represents the desired track.

Specifically referring to the flow charts in FIGS. 37a through 37d, a preferred embodiment of the invention is implemented as follows.

Figure 37A:
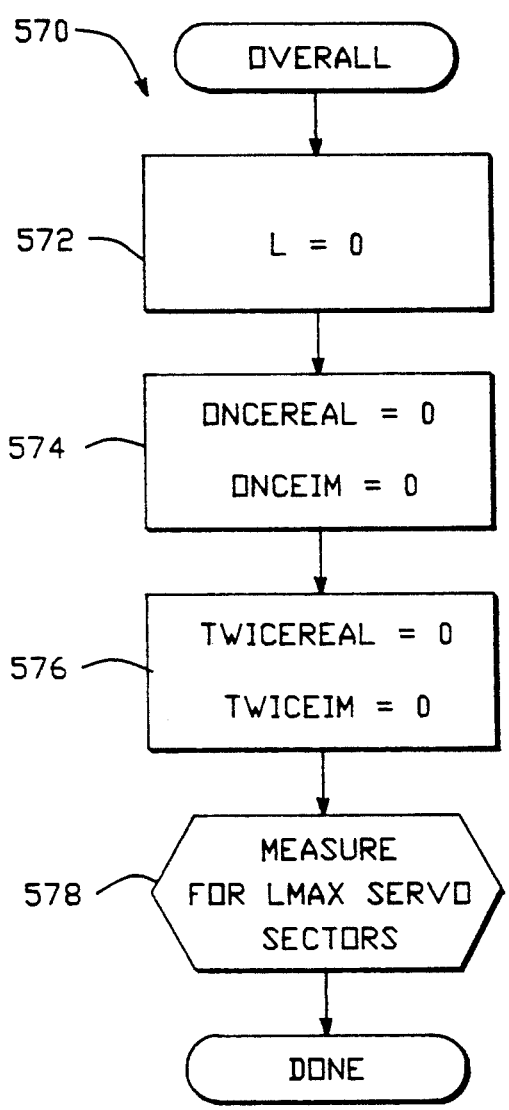

In FIG. 37a, the overall structure of the process performed by the microprocessor 562 is set out. In this structure 570, the operation is initiated by setting all variables equal to zero. The variables include "L" which is the number of sectors, which in a preferred embodiment, is 56. The variables also include the once-around real (ONCEREAL) component of the complex number performed by the Fourier Transform and the once-around imaginary (ONCEIM) component of the Fourier Transform. These are set to zero in block 574. The next variables which are set to zero are the twice-around real component (TWICEREAL) of the Fourier Transform and the twice-around imaginary component (TWICEIM) of the Fourier Transform. Then measurements are taken at every servo sector until the last servo sector (LMAX) is measured at block 578. Thus, structure 570 of FIG. 37a indicates that structure 580 of FIG. 37b should be performed 56 times or LMAX times.

Figure 37B:
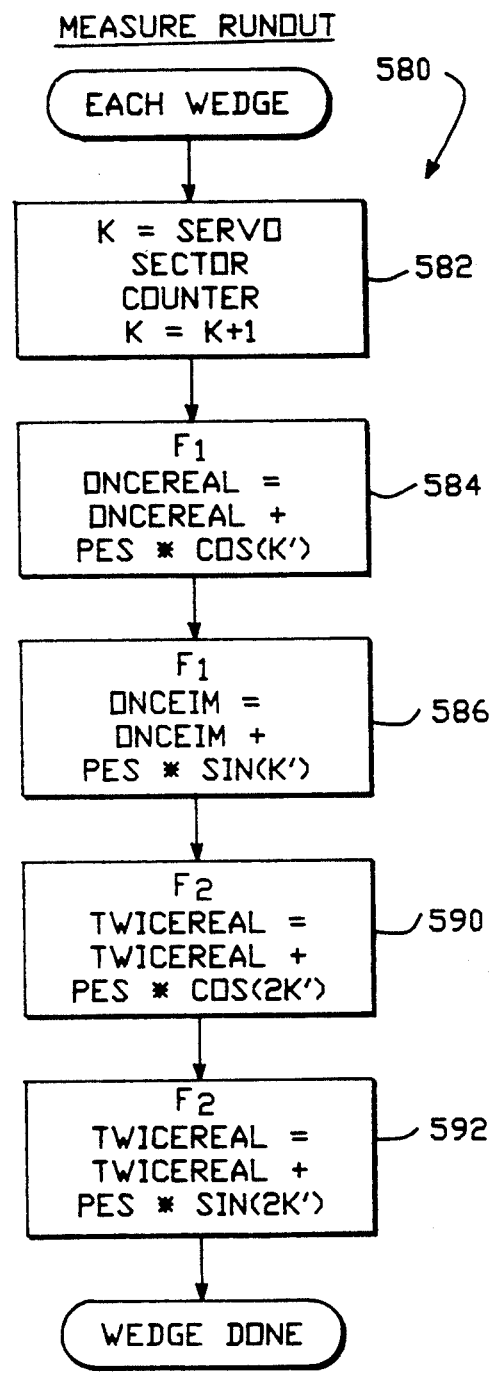

For each servo sector (i.e. at each of the 56 wedges described in a preferred embodiment about the disk) a once-around and twice-around runout measurement is made by the microprocessor 562 according to the structure 580 (FIG. 37b). In structure 580, block 582 includes a counter for stepping between successive wedges in order to perform the measurements. Block 584 includes a measurement and calculation for the once-around real component of the runout error. In this block 584, the once-around real component is equal to the previously calculated once-around real component for the particular track on which the specific servo section or wedge is located, plus the position error signal (PES) times the COS (K') where K' is equal to $2\pi K/N$.

The DFTs are listed below with $F_1$ for the once-around errors (about 60 Hz) and $F_2$ for the twice-around errors (about 120 Hz). It is the COS portion of $F_1$ that is performed in block 584.

$$F_1 = \frac{1}{M} \sum_{K=0}^{M-1} PES_K \left[ \cos \frac{2\pi K}{N} - i \sin \frac{2\pi K}{N} \right]$$

-continued $$F_2 = \frac{1}{M} \sum_{K=0}^{M-1} PES_K \left[ \cos2\frac{2\pi K}{N} - i\sin2\frac{2\pi K}{N} \right]$$

where
M = number of measurements per revolution of the disk
N = number of the wedges
M = 2N
K = the number of wedges (integers 0, 1, 2, 3 . . . )

Block 586 calculates the imaginary component of the once-around runout correction in the same manner except that SIN (K') (the Sin portion of $F_1$) is utilized. As with block 584, block 590 calculates the twice-around real component of the runout error by adding the previously calculated runout error for the other subsequent wedges in the track to the position error signal, PES, times COS (K') (which symbolically represents the COS portion of $F_2$). Similarly block 592 performs the same calculation with the position error signal multiplied by the SIN (K') (which symbolically represents the Sin portion of $F_2$). The structure 580 is then performed for each servo on the track and a summation of all of the runout correction errors is made so that for each track there is a once-around real value, a once-around imaginary value, a twice-around real value, and a twice-around imaginary value.

Figure 37C:
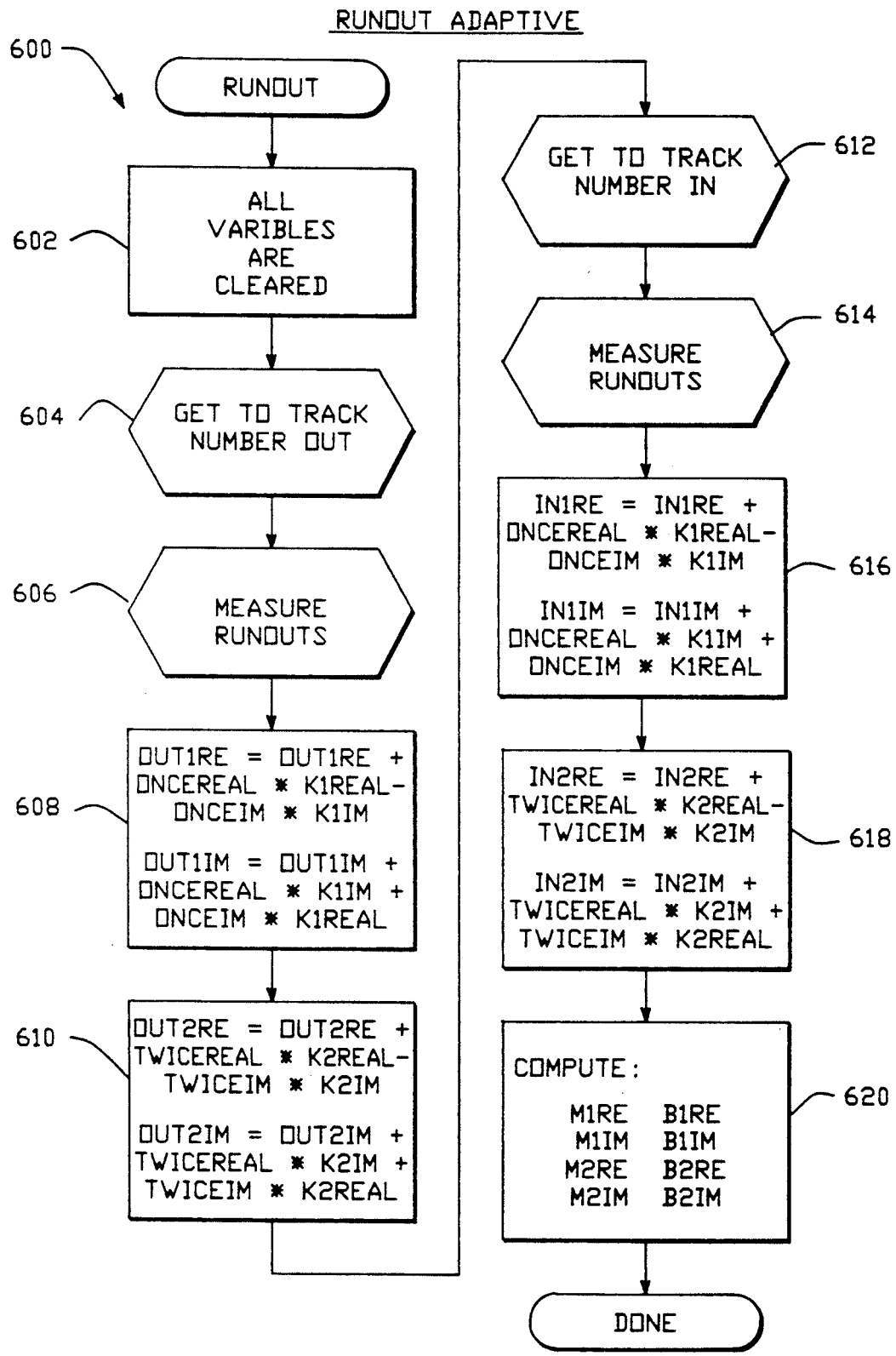

In FIG. 37c, complex correction functions, including real and imaginary parts, are generated based on the measure runout structure 580 of FIG. 37b. In FIG. 37c, the runout adaptive structure 600 is performed by first clearing all of the variables in block 602 and then having the head actuated to an outer track as provided for by block 604. The outer track can be an outer most track or a track which is outwardly of an inner track which is specified in block 62. Block 606 that the measure runout structure 580 of FIG. 37b is then implemented in order to provide the four complex values for each track which are calculated by the structure 580. Once these values are calculated, then the function of block 608 is implemented. In block 608 for the outer track, a once-around real correction function is generated and thereafter stored in block 620 under the value M1RE. The outer once-around real correction function (OUT1RE) in block 608 is generated by adding any previous once-around outer correction function for that track to the sum of the once-around value calculated in block 584 times a constant K1REAL minus the once-around imaginary value calculated in block 586 times a constant M1IM. The constant M1REAL and M1IM depend on the characteristics of the drive as outlined above. These values, as well as K2REAL and K2IM listed below, can be calculated from known mathematical relationships for the drive configuration, but practically they are empirically determine with an emulator as is known in the art. The OUT1RE function can be performed as many times as desired for each track and summed in order to increase the accuracy for the final OUT1RE value for each track.

Similarly an outer track once-around imaginary function (OUT1IM) is calculated in block 608 and this value is stored in block 620 as M1IM. In block 610, twice-around real and imaginary correction functions for the outer track (OUT2RE, OUT2IM) are calculated and stored respectively as M2RE and M2IM in block 620. In block 610, the functions calculated in the structure of 580 in FIG. 37b are multiplied by the constant K2REAL and K2IM, which again are constant values determined by the specific structure of the disk drive as set out above. In block 612, the head is actuated to a track which is inwardly of the track measured in block 604, and then in block 614, the runout algorithm of structure 580 is performed on the inner track. Block 616 and 618 are similar to block 608 and 610, but are performed for the inner track. These blocks result in the storing of values in blocks 620 which include B1RE, B1IM, B2RE and B2IM, which stand for inner track once-around real and imaginary correction functions and inner track twice-around real and imaginary correction functions, respectively.

It is to be understood that the value of block 620 can be computed and stored in complex, slope-intercept form in order to simply the calculation of the flow charts of FIGS. 37a–32d as is known in the art.

It is also to be noted that alternatively instead of making calculations for an outer track and an inner track and then scaling between said tracks as set forth in FIG. 37d (blocks 632, 634) that the measurement for a single track can be made for block 620 and then other values for blocks 632, 634 can be scaled from the values for the single track.

A structure 630 shown in FIG. 37d then makes the correction functions which are complex values having real and imaginary components of blocks 620 and builds a runout table for each track on the disk. It is to be understood that alternatively, instead of building a runout table that it is possible to have the calculations contemplated in FIG. 37d done in real time and on the fly. The runout table of FIG. 37d is constructed for each individual track and each individual sector on the track. In blocks 632 and 634 the once-around real and imaginary components and twice-around real and imaginary components are calculated for each track and each sector on the track by scaling between the values of the inner track and the outer track or by scaling from a single track, preferably a middle track, as calculated in the runout adaptive structure 600 in FIG. 37c. As can be seen block 632 for the once around real component for any particular track and sector, this is calculated by multiplying the once-around real component of the correction factor as stored in block 620 by the target which is a mathematical representation of the track and sector and adding thereto a base value which is the real component of the correction function stored in block 62 for the inner track. In other words, the base value is the inner track value and thereto is added a scale mount which is equivalent to a portion of the outer value in order to calculate the value for a track which falls between the correction function for the inner track and the outer track. The same process is accomplished for the imaginary once-around component in block 620. Similarly, the same scaling function is accomplished for the twice-around real and imaginary components for each sector in each track by block 634. Block 638 emphases that the calculations of block 632 and 634 are accomplished for each of the sectors in each track. Again, scaling can occur from a single, preferably, middle track, if desired.

In blocks 640 and 644, the inverse of the discrete Fourier Transform is performed in order to transform the correction functions of blocks 632, 634 for each sector on each track into, in a preferred embodiment, a current signal to be provided to the actuator driver 556 in FIG. 36. Blocks 640 and 644 cause the runout table to be generated. This is accomplished by adding the once-around current value as calculated in block 640 to the twice-around current value as calculated in block 644. In block 640, the value which is denoted by FEED(L) is equivalent to the complex value L1RE calculated in block 632 times the COS (K') (which is symbolically used to represent the inverse DFT) in order to perform the inverse Fourier Transform as previously discussed. To this value is added L1IM times SIN(K') (which is symbolically used to represent the inverse DFT). In block 644, the twice-around correction functions L2RE and L2IM are used in the same manner as the once-around correction functions are used in block 640, in order to calculate the error correction signal which is a combination of the FEED(L) value calculated in block 640 plus that calculated in block 644 for each sector on each track. These calculations result in runout tables of current values which are used to drive the actuator 558.

Limited Copyright Waiver

A portion of the disclosure of this patent document (Exhibit A, Code Listing) contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

Copyright 1991 Iota Memories Corporation

Industrial Applicability

The operation of the disc drive 50 and removable cartridge 52 of the invention are as disclosed hereinabove. From the above, it is evident that the present invention provides for a disk drive and cartridge which fits into the 2½ inch disk, 17.5 millimeter high drive housing form factor and affords a storage capacity per cartridge of at least 40-megabytes. The present invention provides for reduced power consumption and safety interlocking mechanisms to prevent damage to the drive and cartridge, and also infinite storage capabilities.

Other aspects and objects of the invention can be obtained from a review of the appended claims and figures.

It is to be understood that other embodiments of the present invention can be fashioned and come within the spirit and scope of the invention as claimed.

What is claimed is:

1. An integral apparatus for a disk drive which has a transducer mounted onto a movable actuator arm which disk drive is adapted for receiving a removable cartridge having a door which is positionable in an open and in a closed position and containing a disk for storing data, comprising:
    an integral member having:
    means adapted for selectably ensuring that the door of the cartridge is properly opened should the door position reach a predefined threshold and for preventing the further reception of the cartridge into the disk drive should the door position not reach the predefined threshold; and
    ramp means for receiving the actuator arm in order to ramp the transducer off of the disk; and
    means adapted for holding an air filter for filtering air that flows past the disk.

2. The integral apparatus of claim 1 including:
    said ensuring means and said ramp means are integral onto a projection which extends from the air filter holding means.

3. The integral apparatus of claim 2 including:
    said projection is bifurcated into a first end and a second end which is spaced from the first end;
    said first end includes said ensuring means and the second means includes the ramp means.

4. The integral apparatus of claim 3 including:
    said ensuring means includes a door stop integral with a door ramp, said door stop for preventing the further reception of the cartridge into the disk drive should the door position not have reached a predefined threshold and the door ramp for urging the door from the predefined threshold.

5. The integral apparatus of claim 4 including:
    said door stop includes a stop surface which is substantially perpendicular to the direction of travel of the cartridge into the disk drive and the door ramp includes a ramped surface which extends rearwardly and outwardly of the stop surface.

6. The integral apparatus of claim 3 including:
    said first end is disposed substantially parallel to the direction of reception of the cartridge; and
    said second end is disposed substantially perpendicularly to the actuator arm with the actuator arm received on the ramp means.

7. The integral apparatus of claim 3 including the disk drive has an actuator for moving the actuator arm substantially radially across the disk, said integral member further comprising:
    said first end is disposed substantially parallel to the direction of reception of the cartridge; and
    said second end is disposed substantially perpendicularly to the actuator arm with the actuator arm received on the ramp means.

8. The integral apparatus of claim 1 including:
    said ensuring means includes a door stop integral with a door ramp, said door stop for preventing the further reception of the cartridge into the disk drive should the door position not have reached a predefined threshold and the door ramp for urging the door from the predefined threshold.

9. The integral apparatus of claim 8 including:
    said door stop includes a stop surface which is substantially perpendicular to the direction of travel of the cartridge into the disk drive and the door ramp includes a ramped surface which extends rearwardly and outwardly of the stop surface.

10. The integral apparatus of claim 1 further including:
    a curved air filter with a concave surface and a convex surface;
    said means adapted for holding said air filter additionally for directing the concave surface toward the cartridge.

11. The integral apparatus of claim 1 further including:
    means for absorbing energy from an uncontrolled unloading of the actuator arm onto the ramp means.

12. The integral apparatus of claim 11 further including:
    said energy absorbing means mounted onto the integrated member adjacent to the air filter holding means and distally from said ramp means.

13. The integral apparatus of claim 1 including:

said integral member includes a means for diverting the flow of air from the area of the disk toward the filter.

14. The integral apparatus of claim 13 including said diverting means includes:
a planar member which extends toward and in the plane of the disk.

15. The integral apparatus of claim 1 with the actuator arm having an element extending outwardly of the transducer, said apparatus further including:
said ramp means located on the integral onepiece member so as to be adapted to engage the element extending outwardly of the transducer.

16. The integral apparatus of claim 1 further including:
said integral member includes an electro-static discharge drain.

17. The integral apparatus of claim 1 further including:
said integral member being comprised of a material that allows the integral member to be an electrostatic discharge drain.

18. An integral apparatus for a disk drive which has a transducer mounted onto a movable actuator arm which disk drive is adapted for receiving a removable cartridge having a door which is positionable in an open and in a closed position and containing a disk for storing data, comprising:
an integral member having:
means adapted for selectably ensuring that the door of the cartridge is properly opened should the door position reach a predefined threshold and for preventing the further reception of the cartridge into the disk drive should the door position not reach the predefined threshold; and
ramp means for receiving the actuator arm in order to ramp the transducer off of the disk.

19. The integral apparatus of claim 18 including:
said ensuring means and said ramp means are integral onto a projection which extends from a base.

20. The integral apparatus of claim 19 including:
said projection is bifurcated into a first end and a second end which is spaced from the first end;
said first end includes said ensuring means and the second means includes the ramp means.

21. The integral apparatus of claim 20 including:
said ensuring means includes a door stop integral with a door ramp, said door stop for preventing the further reception of the cartridge into the disk drive should the door position not have reached a predefined threshold and the door ramp for urging the door from the predefined threshold.

22. The integral apparatus of claim 21 including:
said door stop includes a stop surface which is substantially perpendicular to the direction of travel of the cartridge into the disk drive and the door ramp includes a ramped surface which extends rearwardly and outwardly of the stop surface.

23. The integral apparatus of claim 20 including:
said first end is disposed substantially parallel to the direction of reception of the cartridge; and
said second end is disposed substantially perpendicularly to the actuator arm with the actuator arm received on the ramp means.

24. The integral apparatus of claim 20 including the disk drive has an actuator for moving the actuator arm substantially radially across the disk, said integral member further comprising:
said first end is disposed substantially parallel to the direction of reception of the cartridge; and
said second end is disposed substantially perpendicularly to the actuator arm with the actuator arm received on the ramp means.

25. The integral apparatus of claim 18 including:
said ensuring means includes a door stop integral with a door ramp, said door stop for preventing the further reception of the cartridge into the disk drive should the door position not have reached a predefined threshold and the door ramp for urging the door from the predefined position.

26. The integral apparatus of claim 25 including:
said door stop includes a stop surface which is substantially perpendicular to the direction of travel of the cartridge into the disk drive and the door ramp includes a ramped surface which extends rearwardly and outwardly of the stop surface.

27. The integral apparatus of claim 18 further including:
means for absorbing energy from an uncontrolled unloading of the actuator arm onto the ramp means.

28. The integral apparatus of claim 27 further including:
said integral member having a means adapted for holding an air filter for filtering air that flows past the disk; and
said energy absorbing means mounted onto the integral member adjacent to the air filter holding means and distally from said ramp means.

29. The integral apparatus of claim 18 with the actuator arm having an element extending outwardly of the transducer, said apparatus further including:
said ramp means located on the integral member so as to be adapted to engage the element extending outwardly of the transducer.

30. The integral apparatus of claim 18 further including:
said integral member includes an electro-static discharge drain.

31. The integral apparatus of claim 18 further including:
said integral member being comprised of a material that allows the member to be an electro-static discharge drain.

32. An integral apparatus for a disk drive which has a transducer mounted onto a movable actuator arm which disk drive is adapted for receiving a removable cartridge having a door which is positionable in an open and in a closed position and containing a disk for storing data, comprising:
an integral member having:
means adapted for selectably ensuring that the door of the cartridge is properly opened and for preventing the reception of the cartridge into the disk drive should the door not be properly opened; and
ramp means for receiving the actuator arm in order to ramp the transducer off of the disk; and
means adapted for holding an air filter for filtering air that flows past the disk.

33. An integral apparatus for a disk drive which has a transducer mounted onto a movable actuator arm which disk drive is adapted for receiving a removable cartridge having a door which is positionable in an open and in a closed position and containing a disk for storing data, comprising:
an integral member having:
means adapted for selectably ensuring that the door of the cartridge is properly opened and for preventing the reception of the cartridge into the disk drive should the door not be properly opened; and
ramp means for receiving the actuator arm in order to ramp the transducer off of the disk.

* * * * *